United States Patent
Cirik et al.

(10) Patent No.: US 12,160,898 B2
(45) Date of Patent: Dec. 3, 2024

(54) ACCESS PROCEDURES IN WIRELESS COMMUNICATIONS

(71) Applicant: Comcast Cable Communications, LLC, Philadelphia, PA (US)

(72) Inventors: Ali Cagatay Cirik, Chantilly, VA (US); Esmael Hejazi Dinan, McLean, VA (US); Hua Zhou, Vienna, VA (US); Hyoungsuk Jeon, Centreville, VA (US); Alireza Babaei, Fairfax, VA (US); Kyungmin Park, Vienna, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/176,573

(22) Filed: Mar. 1, 2023

(65) Prior Publication Data

US 2023/0217502 A1    Jul. 6, 2023

Related U.S. Application Data

(63) Continuation of application No. 16/733,316, filed on Jan. 3, 2020, now Pat. No. 11,632,803.
(Continued)

(51) Int. Cl.
*H04W 74/0833*    (2024.01)
*H04L 1/1822*    (2023.01)
(Continued)

(52) U.S. Cl.
CPC ....... *H04W 74/0833* (2013.01); *H04L 1/1822* (2013.01); *H04L 1/1864* (2013.01); *H04W 72/04* (2013.01); *H04W 74/0836* (2024.01)

(58) Field of Classification Search
CPC ......... H04W 74/0836; H04W 74/0833; H04W 72/04
See application file for complete search history.

(56) References Cited

U.S. PATENT DOCUMENTS 8,737,336 B2 * 5/2014 Lohr ..................... H04L 1/1854
370/329
10,833,813 B2   11/2020 Lei
11,632,803 B2 *  4/2023 Cirik .................... H04L 1/1822
370/329

(Continued)

FOREIGN PATENT DOCUMENTS

WO    2017/136458 A2    8/2017
WO    2018204863 A1    11/2018
WO    2019/195563 A1   10/2019

OTHER PUBLICATIONS

R2-1818187 3GPP TSG-RAN WG2 Meeting #104, Spokane, USA, Nov. 12-16, 2018, Source: Potevio, Title: Analysis of RA issues related with LBT.
(Continued)

*Primary Examiner* — Raj Jain
(74) *Attorney, Agent, or Firm* — Banner & Witcoff, Ltd.

(57) ABSTRACT

Wireless communications for random access procedures are described. A wireless device may send one or more messages as part of a random access procedure. The wireless may re-send a first message of the one or more messages a redundancy value equal to zero if the random access procedure is a two-step random access procedure. The wireless may re-send the first message of the one or more messages the redundancy value equal to zero if the wireless device falls back to a four-step random access procedure.

30 Claims, 34 Drawing Sheets

Related U.S. Application Data

(60) Provisional application No. 62/787,926, filed on Jan. 3, 2019.

(51) Int. Cl.
  H04L 1/1829 (2023.01)
  H04W 72/04 (2023.01)
  H04W 74/0836 (2024.01)

(56) References Cited

U.S. PATENT DOCUMENTS

| | | | |
|---|---|---|---|
| 2012/0170525 A1* | 7/2012 | Sorrentino | H04L 5/0051 370/329 |
| 2018/0110074 A1 | 4/2018 | Akkarakaran et al. | |
| 2018/0176961 A1 | 6/2018 | Babaei et al. | |
| 2018/0255586 A1 | 9/2018 | Einhaus et al. | |
| 2018/0270634 A1* | 9/2018 | Kim | H04W 72/54 |
| 2018/0279376 A1 | 9/2018 | Dinan et al. | |
| 2019/0075589 A1 | 3/2019 | Jeon et al. | |
| 2019/0132857 A1 | 5/2019 | Babaei et al. | |
| 2019/0174472 A1* | 6/2019 | Lee | H04W 72/23 |
| 2019/0320467 A1* | 10/2019 | Freda | H04W 74/004 |
| 2019/0386792 A1* | 12/2019 | Chen | H04L 1/1819 |
| 2020/0221504 A1 | 7/2020 | Cirik et al. | |
| 2020/0295884 A1* | 9/2020 | Bergström | H04L 1/189 |
| 2021/0136661 A1 | 5/2021 | Frenger et al. | |
| 2023/0217502 A1* | 7/2023 | Cirik | H04W 74/0833 370/329 |
| 2024/0080888 A1* | 3/2024 | Golitschek Edler von Elbwart | H04L 1/1819 |

OTHER PUBLICATIONS

R2-1818258 3GPP TSG-RAN WG2 Meeting #104, Spokane, USA, Nov. 12-16, 2018, Source: vivo, Title: Enhance RACH with Additional Transmission Opportunities.
R2-1818259 3GPP TSG-RAN WG2 Meeting #104, Spokane, USA, Nov. 12-16, 2018, Source: vivo, Title: Counter for Preamble Transmission Attempt.
R2-1818260 3GPP TSG-RAN WG2 Meeting #104, Spokane, USA, Nov. 12-16, 2018, Source: vivo, Title: RAN2 impacts of 2-step RACH.
R2-1818356 3GPP TSG-RAN WG2 Meeting #104, Spokane, USA, Nov. 12-16, 2018, Source: LG Electronics Inc., Title: Fast preamble transmission in NR-U.
R2-1818503 3GPP TSG-RAN WG2 Meeting #104, Spokane, USA, Nov. 12-16, 2018, Source: Qualcomm Incorporated, Title: Further details on RACH for NR-U.
R2-1818504 3GPP TSG-RAN WG2 Meeting #104, Spokane, USA, Nov. 12-16, 2018, Source: Qualcomm Incorporated, Ericsson, Charter Communications, Interdigital, ZTE, Apple, Title: TP for 2-step RACH in NR-U.
May 24, 2020—European Extended Search Report—EP 20150254.9.
3GPP TS 36.321 V15.3.0 (Sep. 2018); Technical Specification; 3rd Generation Partnership Project; Technical Specification Group Radio Access Network; Evolved Universal Terrestrial Radio Access (E-UTRA); Medium Access Control (MAC) protocol specification (Release 15).
Jun. 1, 2021—European Office Action—EP 20150254.9.
Jan. 11, 2023—EP Office Action—EP App No. 20150254.9.
"Wireless Technology Evolution Transition from 4G to 5G," Chapter 3, 3GPP Releases 14 to 16, 5G Americas Whitepaper, Oct. 2018.
R1-1814380 3GPP TSG-RAN WG1 Meeting #95, Spokane, USA, Nov. 12-16, 2018, Source: Samsung, Title: CR to 38.213 capturing the RAN1#94bis and RAN1#95 meeting agreements.
R1-1814400 3GPP TSG-RAN WG1 Meeting #95, Spokane, USA, Nov. 12-16, 2018, Source: Huawei, Title: Combined CR of all essential corrections to 38.212 from RAN1#94bis and RAN1#95.
3GPP TS 38.213 V15.3.0 (Sep. 2018); Technical Specification; 3rd Generation Partnership Project; Technical Specification Group Radio Access Network; NR; Physical layer procedures for control (Release 15).
R1-1814395 3GPP TSG-RAN WG1 Meeting #95, Spokane, USA, Nov. 12-16, 2018, Source: Nokia, Title: Combined CR of all essential corrections to 38.214 from RAN1#94bis and RAN1#95.
3GPP TS 38.214 V15.3.0 (Sep. 2018); Technical Specification; 3rd Generation Partnership Project; Technical Specification Group Radio Access Network; NR; Physical layer procedures for data (Release 15).
3GPP TS 38.321 V15.3.0 (Sep. 2018); Technical Specification; 3rd Generation Partnership Project; Technical Specification Group Radio Access Network; NR; Medium Access Control (MAC) protocol specification (Release 15).
3GPP TS 38.331 V15.3.0 (Sep. 2018), Technical Specification, 3rd Generation Partnership Project; Technical Specification Group Radio Access Network; NR; Radio Resource Control (RRC) Protocol Specification (Release 15).
R2-1818749 3GPP TSG-RAN WG2 Meeting #104, Spokane, USA, Nov. 12-16, 2018, Source: Samsung, Title: Miscellaneous corrections.
R2-1816261 3GPP TSG-RAN WG2 Meeting #104, Spokane, USA, Nov. 12-16, 2018, Source: OPPO, Title: Enhancements of 4-steps RACH in NR-U and the corresponding TP.
R2-1816262 3GPP TSG-RAN WG2 Meeting #104, Spokane, USA, Nov. 12-16, 2018, Source: OPPO, Title: 3-steps RACH procedure for NR-U.
R2-1816263 3GPP TSG-RAN WG2 Meeting #104, Spokane, USA, Nov. 12-16, 2018, Source: OPPO, Title: 2-steps RACH procedure for NR-U.
R2-1816312 3GPP TSG-RAN WG2 Meeting #104, Spokane, USA, Nov. 12-16, 2018, Source: Samsung, Title: Random Access Response Reception in NR-U.
R2-1816435 3GPP TSG-RAN WG2 Meeting #104, Spokane, USA, Nov. 12-16, 2018, Source: Motorola Mobility, Lenovo, Title: Modifications to RACH procedure due to LBT.
R2-1816478 3GPP TSG-RAN WG2 Meeting #104, Spokane, USA, Nov. 12-16, 2018, Source: MediaTek Inc., Title: LBT for Random Access in NR-U.
R2-1816604 3GPP TSG-RAN WG2 Meeting #104, Spokane, USA, Nov. 12-16, 2018, Source: Huawei, HiSilicon, Title: timers and counters for two-steps RACH.
R2-1816605 3GPP TSG-RAN WG2 Meeting #104, Spokane, USA, Nov. 12-16, 2018, Source: Huawei, HiSilicon, Title: consideration on 2-step RACH parameters and grant.
R2-1816606 3GPP TSG-RAN WG2 Meeting #104, Spokane, USA, Nov. 12-16, 2018, Source: Huawei, HiSilicon, Title: Consideration on UE ID for 2-step RACH.
R2-1816607 3GPP TSG-RAN WG2 Meeting #104, Spokane, USA, Nov. 12-16, 2018, Source: Huawei, HiSilicon, Title: Consideration on grant size for 2-step RACH.
R2-1816616 3GPP TSG-RAN WG2 Meeting #104, Spokane, USA, Nov. 12-16, 2018, Source: Huawei, HiSilicon, Title: Four-step RACH procedure for NR-U.
R2-1816617 3GPP TSG-RAN WG2 Meeting #104, Spokane, USA, Nov. 12-16, 2018, Source: Huawei, HiSilicon, Title: Two-step RACH procedure for NR-U.
R2-1816618 3GPP TSG-RAN WG2 Meeting #104, Spokane, USA, Nov. 12-16, 2018, Source: Huawei, HiSilicon, Title: Impact of LBT on counters and windows for 4-step RACH.
R2-1816685 3GPP TSG-RAN WG2 Meeting #104, Spokane, USA, Nov. 12-16, 2018, Source: MediaTek Inc., Title: 2-step RACH msgA and msgB contents.
R2-1816687 3GPP TSG-RAN WG2 Meeting #104, Spokane, USA, Nov. 12-16, 2018, Source: MediaTek Inc., Title: 2-step RACH msgB addressing and HARQ.
R2-1816688 3GPP TSG-RAN WG2 Meeting #104, Spokane, USA, Nov. 12-16, 2018, Source: MediaTek Inc., Title: Random access backoff and timers in NR-U.
R2-1816696 3GPP TSG-RAN WG2 Meeting #104, Spokane, USA, Nov. 12-16, 2018, Source: Intel Corporation, Title: Random access procedure for NR-u.

(56) References Cited

OTHER PUBLICATIONS

R2-1816697 3GPP TSG-RAN WG2 Meeting #104, Spokane, USA, Nov. 12-16, 2018, Source: Intel Corporation, Title: Further consideration of 2-step CBRA.

R2-1816769 3GPP TSG-RAN WG2 Meeting #104, Spokane, USA, Nov. 12-16, 2018, Source: Convida Wireless, Title: NR-U LBT Impact on Preamble Transmission Counting.

R2-1816776 3GPP TSG-RAN WG2 Meeting #104, Spokane, USA, Nov. 12-16, 2018, Source: InterDigital, Title: Random access in NR-Unlicensed.

R2-1816829 3GPP TSG-RAN WG2 Meeting #104, Spokane, USA, Nov. 12-16, 2018, Source: ZTE, Title: Considerations on 4-step RACH procedure for NR-U.

R2-1816831 3GPP TSG-RAN WG2 Meeting #104, Spokane, USA, Nov. 12-16, 2018, Source: ZTE, Title: LBT putcome indication.

R2-1816832 3GPP TSG-RAN WG2 Meeting #104, Spokane, USA, Nov. 12-16, 2018, Source: ZTE, Title: Considerations on RAR window size for NR-U.

R2-1817064 3GPP TSG-RAN WG2 Meeting #104, Spokane, USA, Nov. 12-16, 2018, Source: ZTE Corporation, Sanechips, Title: Msg2 payload contents for 2-step RACH.

R2-1817075 3GPP TSG-RAN WG2 Meeting #104, Spokane, USA, Nov. 12-16, 2018, Source: Sony, Title: Considerations on initial access procedures for NR unlicensed.

R2-1817192 3GPP TSG-RAN WG2 Meeting #104, Spokane, USA, Nov. 12-16, 2018, Source: Nokia, Nokia Shanghai Bell, Title: 2-step RACH resource assignment and fall-back operation for NR-U.

R2-1817195 3GPP TSG-RAN WG2 Meeting #104, Spokane, USA, Nov. 12-16, 2018, Source: Nokia, Nokia Shanghai Bell, Title: Network control of 2-step CBRA procedure.

R2-1817276 3GPP TSG-RAN WG2 Meeting #104, Spokane, USA, Nov. 12-16, 2018, Source: Fujitsu, Title: On CFRA in NR-U.

R2-1817319 3GPP TSG-RAN WG2 Meeting #104, Spokane, USA, Nov. 12-16, 2018, Source: Spreadtrum Communications, Title: Random Access Procedure in NR-U.

R2-1817473 3GPP TSG-RAN WG2 Meeting #104, Spokane, USA, Nov. 12-16, 2018, Source: Apple Inc., Title: RACH Enhancements in NR-U.

R2-1817756 3GPP TSG-RAN WG2 Meeting #104, Spokane, USA, Nov. 12-16, 2018, Source: Qualcomm Incorporated, Ericsson, Charter Communications, Interdigital, ZTE, Apple, Title: TP for 2-step RACH in NR-U.

R2-1817758 3GPP TSG-RAN WG2 Meeting #104, Spokane, USA, Nov. 12-16, 2018, Source: Qualcomm Incorporated, Title: Further details on RACH for NR-U.

R2-1817777 3GPP TSG-RAN WG2 Meeting #104, Spokane, USA, Nov. 12-16, 2018, Source: Motorola Mobility, enovo, Title: Diversity in RACH transmissions.

R2-1817966 3GPP TSG-RAN WG2 Meeting #104, Spokane, USA, Nov. 12-16, 2018, Source: Ericsson, Title: Discussions on RACH enhancements for NR-U.

R2-1817968 3GPP TSG-RAN WG2 Meeting #104, Spokane, USA, Nov. 12-16, 2018, Source: Ericsson, Title: Handling of RA counters and timers in NR-U.

R2-1818098 3GPP TSG-RAN WG2 Meeting #103bis, Spokane, USA, Nov. 12-16, 2018, Source: LG Electronics Inc., Title: 2-Step RACH procedure for NR-U.

R2-1818100 3GPP TSG-RAN WG2 Meeting #104, Spokane, USA, Nov. 12-16, 2018, Source: LG Electronics Inc., Title: Enhanced RACH procedure for NR-U.

R2-1818128 3GPP TSG-RAN WG2 Meeting #104, Spokane, USA, Nov. 12-16, 2018, Source: CMCC, Title: Discussion on UE ID for msgA.

R2-1818138 3GPP TSG-RAN WG2 Meeting #104, Spokane, USA, Nov. 12-16, 2018, Source: CMCC, Title: The content of the two messages of 2-step RACH for NR-U.

R2-1815257 3GPP TSG-RAN WG2 Meeting #104, Spokane, USA, Nov. 12-16, 2018, Source: CMCC, Title: Consideration of RACH procedure in NR-U system.

R2-1818162 3GPP TSG-RAN WG2 Meeting #104, Spokane, USA, Nov. 12-16, 2018, Source: Institute for Information Industry (III), Title: Considerations on Common 2-Step RACH.

* cited by examiner

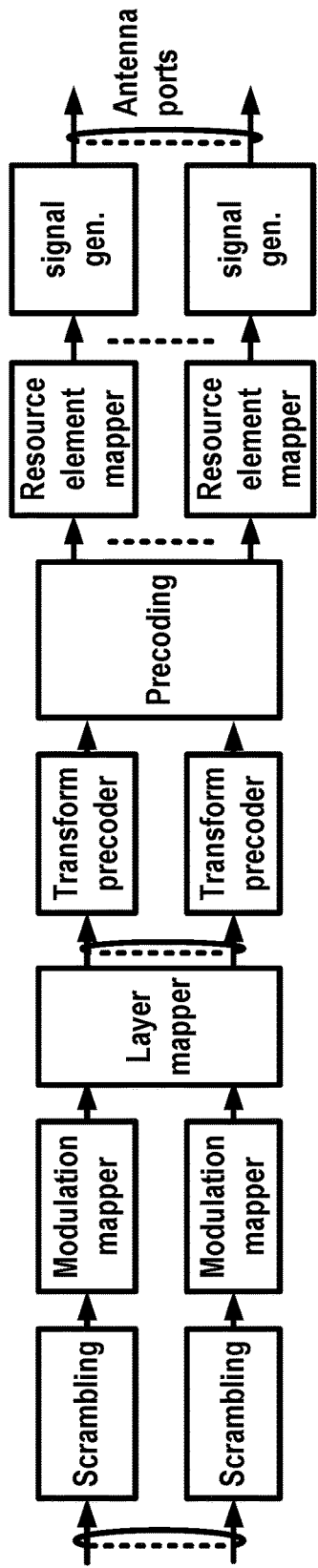
FIG. 4A
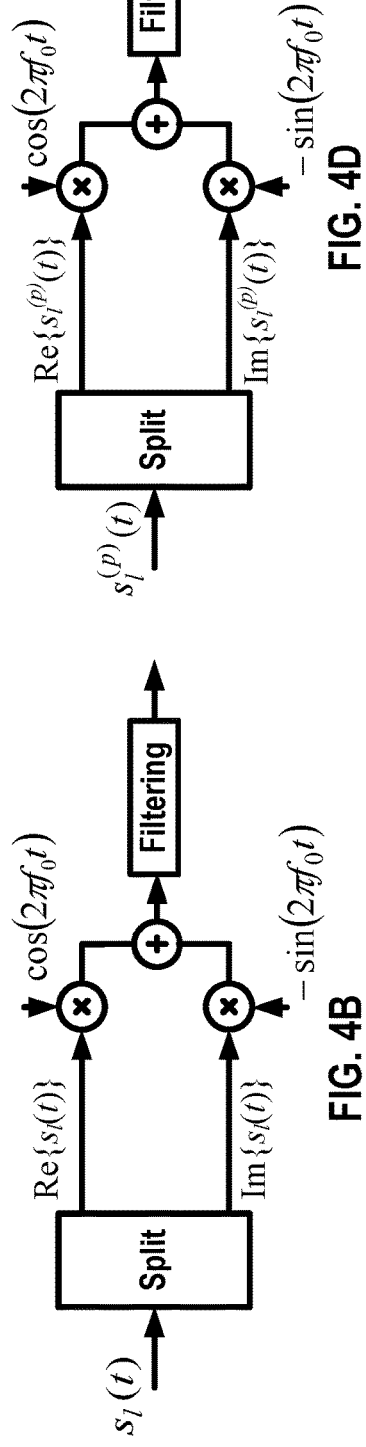
FIG. 4B
FIG. 4D
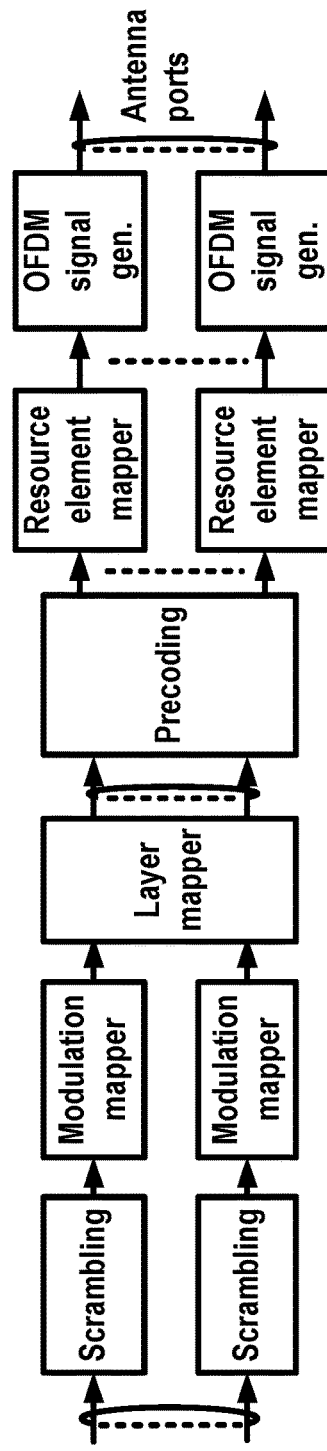
FIG. 4C

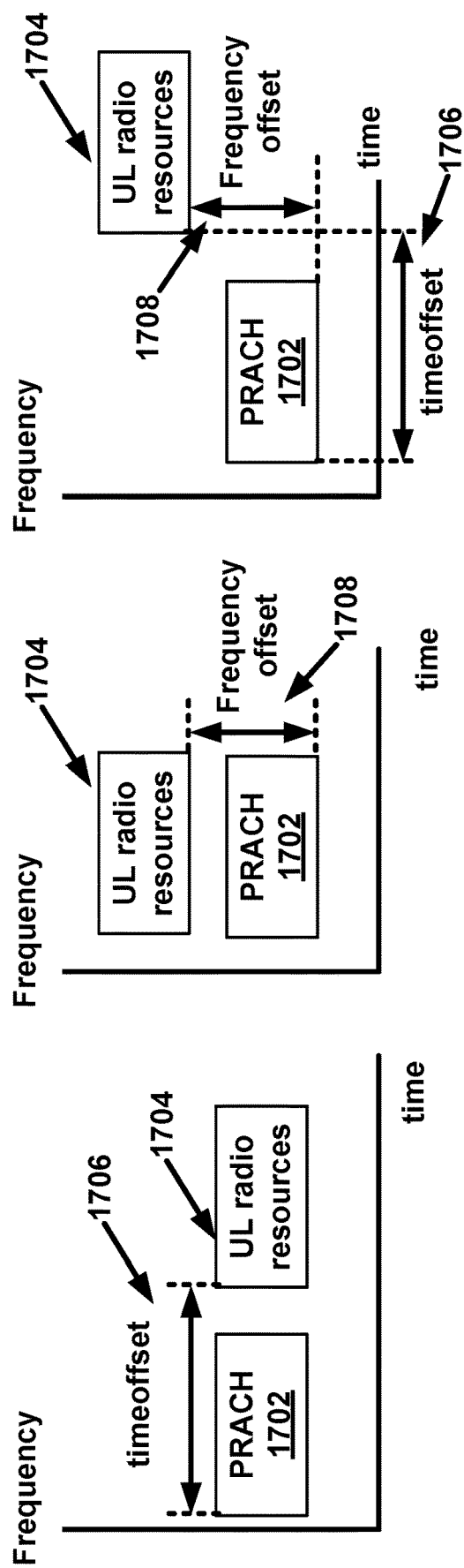

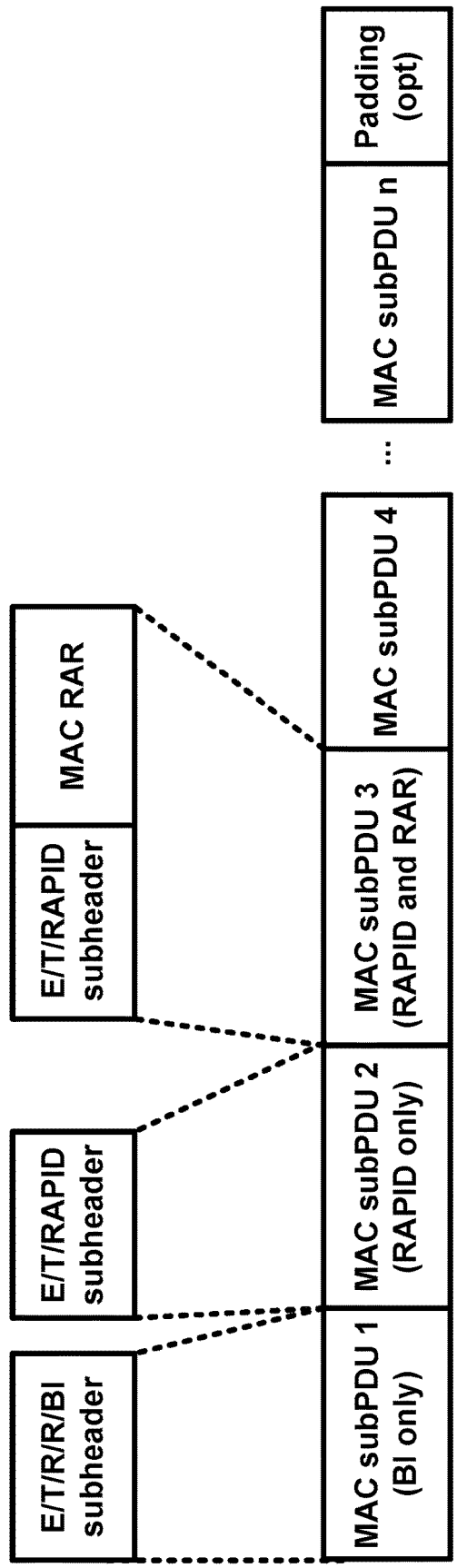
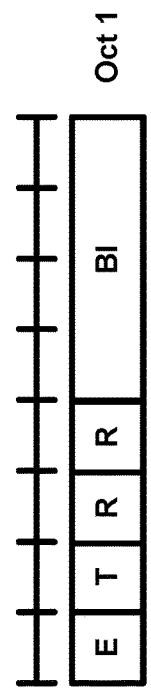
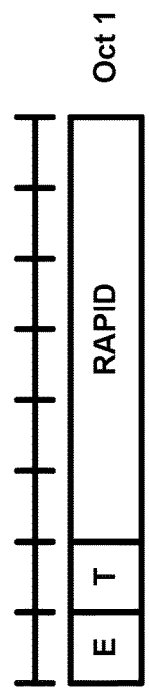
FIG. 18A
FIG. 18B
FIG. 18C

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |
| First field | 4 |
| Second field | 4 |

ACCESS PROCEDURES IN WIRELESS COMMUNICATIONS

CROSS-REFERENCE TO RELATED APPLICATIONS

This application is a continuation of and claims priority to U.S. patent application Ser. No. 16/733,316, filed Jan. 3, 2020, which claims the benefit of U.S. Provisional Application No. 62/787,926, filed Jan. 3, 2019, each of which is hereby incorporated by reference in its entirety.

BACKGROUND

Various procedures may be used to establish communication between devices. A wireless device may send (e.g., transmit) a message to a base station as part of an access procedure (e.g., a random access procedure). The wireless device may not receive a response to the message. The wireless device may determine to perform a new random access resource selection procedure, which may lead to undesirable outcomes, such as unsuccessful or delayed communications.

SUMMARY

The following summary presents a simplified summary of certain features. The summary is not an extensive overview and is not intended to identify key or critical elements.

A base station may send (e.g., transmit) one or more downlink control signals and/or messages to a wireless device. The one or more downlink control signals and/or messages may indicate a fixed redundancy version (RV) sequence to use for re-sending (e.g., re-transmitting) one or more transport blocks during an access procedure (e.g., a two-step random access procedure). A wireless device may re-send (e.g., re-transmit) the one or more transport blocks based on the fixed RV sequence, for example, if the random access procedure is a contention-free random access procedure. The wireless device may re-send (e.g., re-transmit) the one or more transport blocks with an RV equal to zero (0), for example, if the random access procedure is a contention-based random access procedure. The wireless device may re-send (e.g., re-transmit) a transport block with the RV equal to zero (0), for example, if the random access procedure is a two-step random access procedure or a four-step random access procedure. Using a fixed RV sequence may reduce latency and/or avoid misalignment between the wireless device and the base station The wireless device may perform one or more listen-before-talk (LBT) procedures on one or more uplink grants, for example, before sending/re-sending (e.g., transmitting/re-transmitting) one or more transport blocks in an unlicensed band. The wireless device may start (e.g., commence) a contention resolution timer, for example, based on or in response to the one-or-more LBT procedures failing. The wireless device may perform a random access selection, for example, based on or in response to the one-or-more LBT procedures failing. A wireless device may send/re-send (e.g., transmit/re-transmit) the one or more transport blocks based on a fixed RV sequence, for example, based on the random access selection. The wireless device may send/re-send (e.g., transmit/re-transmit) the one or more transport blocks with an RV equal to zero (0). Using a fixed RV sequence and/or fallback procedures if LBT procedures fail may reduce latency and/or avoid misalignment between the wireless device and the base station.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 17A, FIG. 17B, and FIG. 17C show examples of radio resource allocations of an RA resource and one or more associated radio resources.

FIG. 18A, FIG. 18B, and FIG. 18C show examples of an RA response (RAR), a MAC subheader with backoff indicator (BI), and a MAC subheader with a random access preamble identifier (RAPID), respectively.

DETAILED DESCRIPTION

Figure 1:
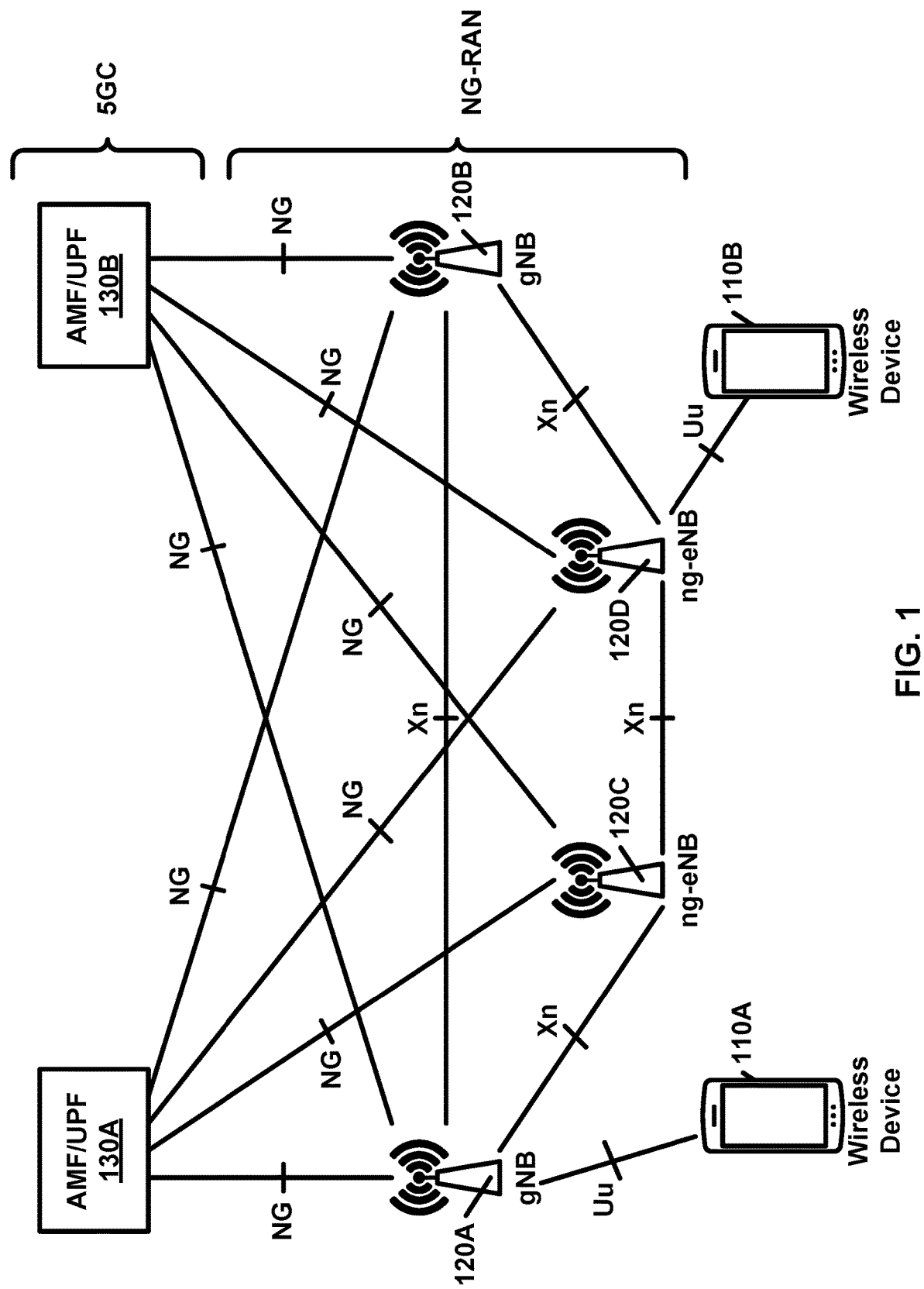
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to access procedures in communication systems.

The following acronyms are used throughout the drawings and/or descriptions, and are provided below for convenience although other acronyms may be introduced in the detailed description:

| | |
|---|---|
| 3GPP | 3rd Generation Partnership Project |
| 5GC | 5G Core Network |
| ACK | Acknowledgement |
| AMF | Access and Mobility Management Function |
| ARQ | Automatic Repeat Request |
| AS | Access Stratum |
| ASIC | Application-Specific Integrated Circuit |
| BA | Bandwidth Adaptation |
| BCCH | Broadcast Control Channel |
| BCH | Broadcast Channel |
| BFR | Beam Failure Recovery |
| BLER | Block Error Rate |
| BPSK | Binary Phase Shift Keying |
| BSR | Buffer Status Report |
| BWP | Bandwidth Part |
| CA | Carrier Aggregation |
| CC | Component Carrier |
| CCCH | Common Control CHannel |
| CDMA | Code Division Multiple Access |
| CN | Core Network |
| CORESET | Control Resource Set |
| CP | Cyclic Prefix |
| CP-OFDM | Cyclic Prefix-Orthogonal Frequency Division Multiplex |
| C-RNTI | Cell-Radio Network Temporary Identifier |
| CS | Configured Scheduling |
| CSI | Channel State Information |
| CSI-RS | Channel State Information-Reference Signal |
| CQI | Channel Quality Indicator |
| CSS | Common Search Space |
| CU | Central Unit |
| DC | Dual Connectivity |
| DCCH | Dedicated Control Channel |
| DCI | Downlink Control Information |
| DL | Downlink |
| DL-SCH | Downlink Shared CHannel |
| DM-RS | DeModulation Reference Signal |
| DRB | Data Radio Bearer |
| DRX | Discontinuous Reception |
| DTCH | Dedicated Traffic Channel |
| DU | Distributed Unit |
| EPC | Evolved Packet Core |
| E-UTRA | Evolved UMTS Terrestrial Radio Access |
| E-UTRAN | Evolved-Universal Terrestrial Radio Access Network |
| FDD | Frequency Division Duplex |
| FPGA | Field Programmable Gate Arrays |
| F1-C | F1-Control plane |
| F1-U | F1-User plane |
| gNB | next generation Node B |
| HARQ | Hybrid Automatic Repeat reQuest |
| HDL | Hardware Description Languages |
| IE | Information Element |
| IP | Internet Protocol |
| LCH | Logical Channel |
| LCID | Logical Channel Identifier |
| LTE | Long Term Evolution |
| MAC | Medium Access Control |
| MCG | Master Cell Group |
| MCS | Modulation and Coding Scheme |
| MeNB | Master evolved Node B |
| MIB | Master Information Block |
| MME | Mobility Management Entity |
| MN | Master Node |
| NACK | Negative Acknowledgement |
| NAS | Non-Access Stratum |
| NG CP | Next Generation Control Plane |
| NGC | Next Generation Core |
| NG-C | NG-Control plane |
| ng-eNB | next generation evolved Node B |
| NG-U | NG-User plane |
| NR | New Radio |
| NR MAC | New Radio MAC |
| NR PDCP | New Radio PDCP |
| NR PHY | New Radio PHYsical |
| NR RLC | New Radio RLC |
| NR RRC | New Radio RRC |
| NS SAI | Network Slice Selection Assistance Information |
| NUL | Normal Uplink |
| O & M | Operation and Maintenance |
| OFDM | Orthogonal Frequency Division Multiplexing |
| PBCH | Physical Broadcast CHannel |
| PCC | Primary Component Carrier |
| PCCH | Paging Control CHannel |
| PCell | Primary Cell |
| PCH | Paging CHannel |
| PDCCH | Physical Downlink Control CHannel |
| PDCP | Packet Data Convergence Protocol |
| PDSCH | Physical Downlink Shared CHannel |
| PDU | Protocol Data Unit |
| PHICH | Physical HARQ Indicator CHannel |
| PHY | PHYsical |
| PLMN | Public Land Mobile Network |
| PMI | Precoding Matrix Indicator |
| PRACH | Physical Random Access CHannel |
| PRB | Physical Resource Block |
| PSCell | Primary Secondary Cell |
| PSS | Primary Synchronization Signal |
| pTAG | primary Timing Advance Group |
| PT-RS | Phase Tracking Reference Signal |
| PUCCH | Physical Uplink Control CHannel |
| PUSCH | Physical Uplink Shared CHannel |
| QAM | Quadrature Amplitude Modulation |
| QCLed | Quasi-Co-Located |
| QCL | Quasi-Co-Location |
| QFI | Quality of Service Indicator |
| QoS | Quality of Service |
| QPSK | Quadrature Phase Shift Keying |
| RA | Random Access |
| RACH | Random Access CHannel |
| RAN | Radio Access Network |
| RAP | Random Access Preamble |
| RAT | Radio Access Technology |
| RA-RNTI | Random Access-Radio Network Temporary Identifier |
| RB | Resource Blocks |
| RBG | Resource Block Groups |
| RI | Rank indicator |
| RLC | Radio Link Control |
| RLM | Radio Link Monitoring |
| RRC | Radio Resource Control |
| RS | Reference Signal |
| RSRP | Reference Signal Received Power |
| SCC | Secondary Component Carrier |
| SCell | Secondary Cell |
| SCG | Secondary Cell Group |
| SC-FDMA | Single Carrier-Frequency Division Multiple Access |
| SDAP | Service Data Adaptation Protocol |

-continued

| | |
|---|---|
| SDU | Service Data Unit |
| SeNB | Secondary evolved Node B |
| SFN | System Frame Number |
| S-GW | Serving GateWay |
| SI | System Information |
| SIB | System Information Block |
| SINR | Signal-to-Interference-plus-Noise Ratio |
| SMF | Session Management Function |
| SN | Secondary Node |
| SpCell | Special Cell |
| SR | Scheduling Request |
| SRB | Signaling Radio Bearer |
| SRS | Sounding Reference Signal |
| SS | Synchronization Signal |
| SSB | Synchronization Signal Block |
| SSS | Secondary Synchronization Signal |
| sTAG | secondary Timing Advance Group |
| SUL | Supplementary Uplink |
| TA | Timing Advance |
| TAG | Timing Advance Group |
| TAI | Tracking Area Identifier |
| TAT | Time Alignment Timer |
| TB | Transport Block |
| TC-RNTI | Temporary Cell-Radio Network Temporary Identifier |
| TCI | Transmission Configuration Indication |
| TDD | Time Division Duplex |
| TDMA | Time Division Multiple Access |
| TRP | Transmission and Receiving Point |
| TTI | Transmission Time Interval |
| UCI | Uplink Control Information |
| UE | User Equipment |
| UL | Uplink |
| UL-SCH | Uplink Shared CHannel |
| UPF | User Plane Function |
| UPGW | User Plane Gateway |
| VHDL | VHSIC Hardware Description Language |
| Xn-C | Xn-Control plane |
| Xn-U | Xn-User plane |

Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide, for example, functions such as NG interface management, wireless device (e.g., UE) context management, wireless device (e.g., UE) mobility management, transport of NAS messages, paging, PDU session management, configuration transfer, and/or warning message transmission, combinations thereof, and/or the like.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
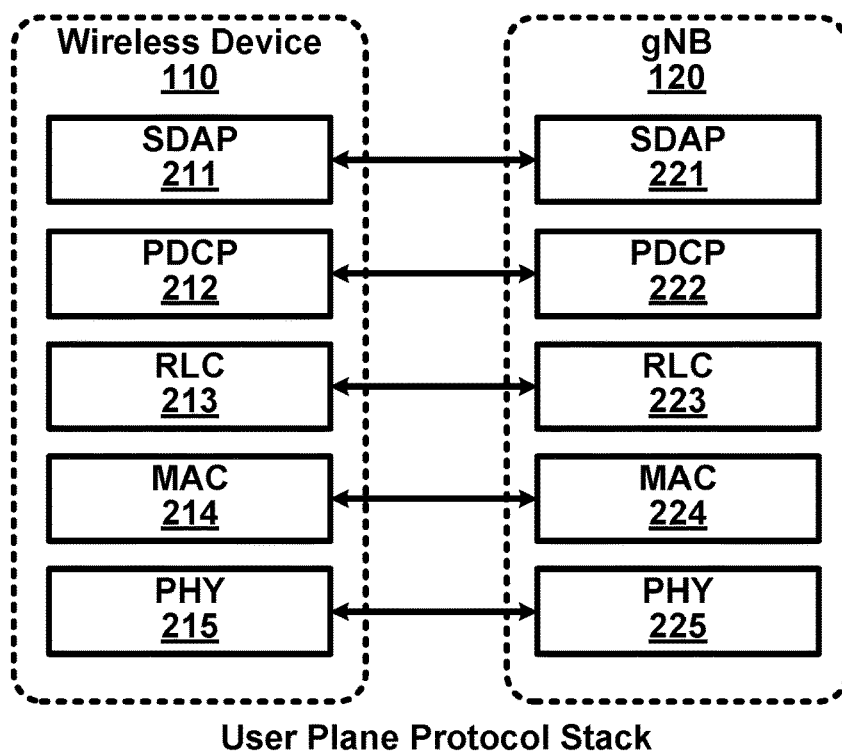
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
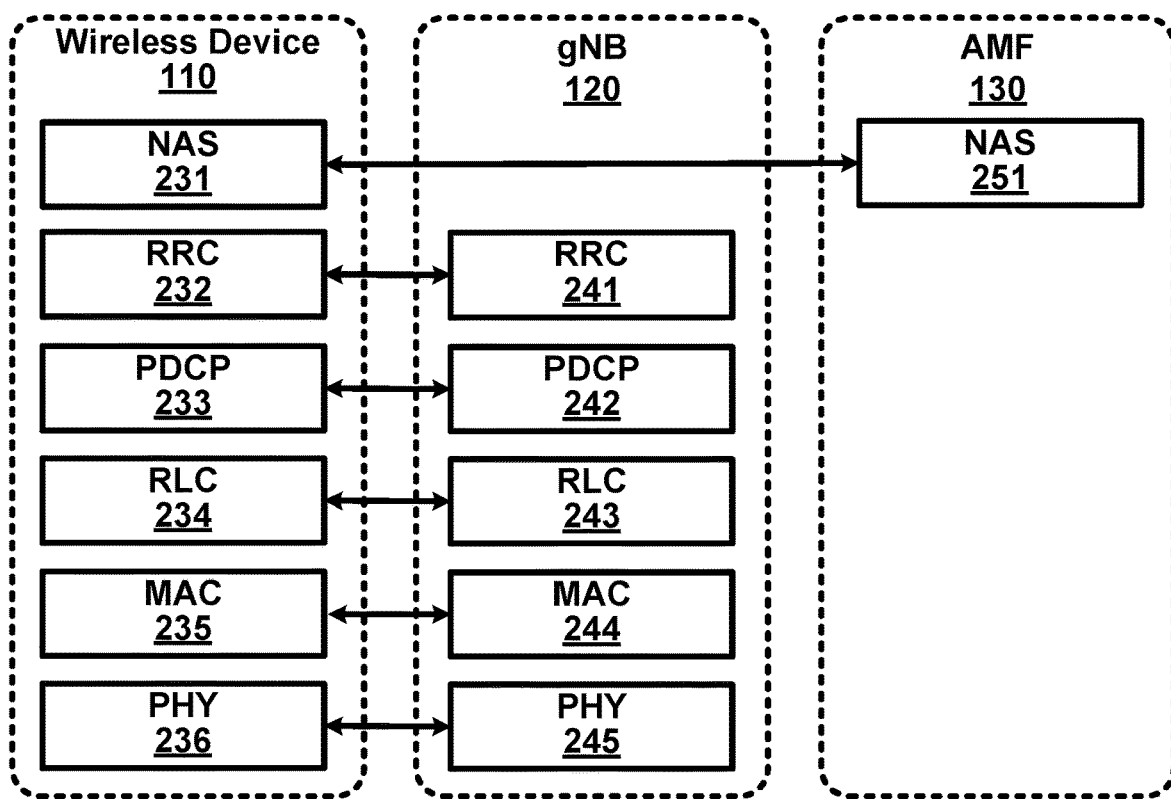
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a TB. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., TB). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
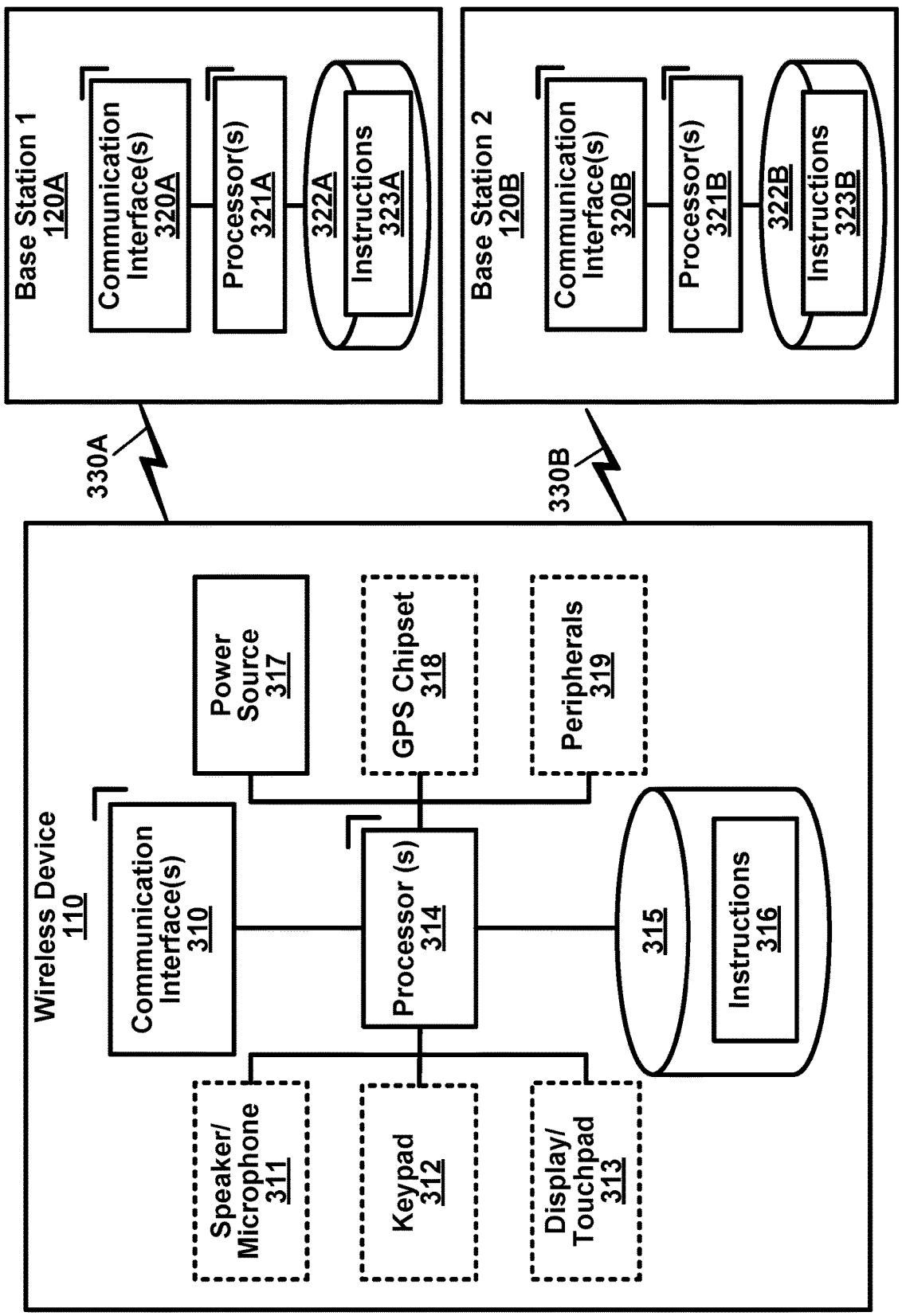
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a RA procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive TBs, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
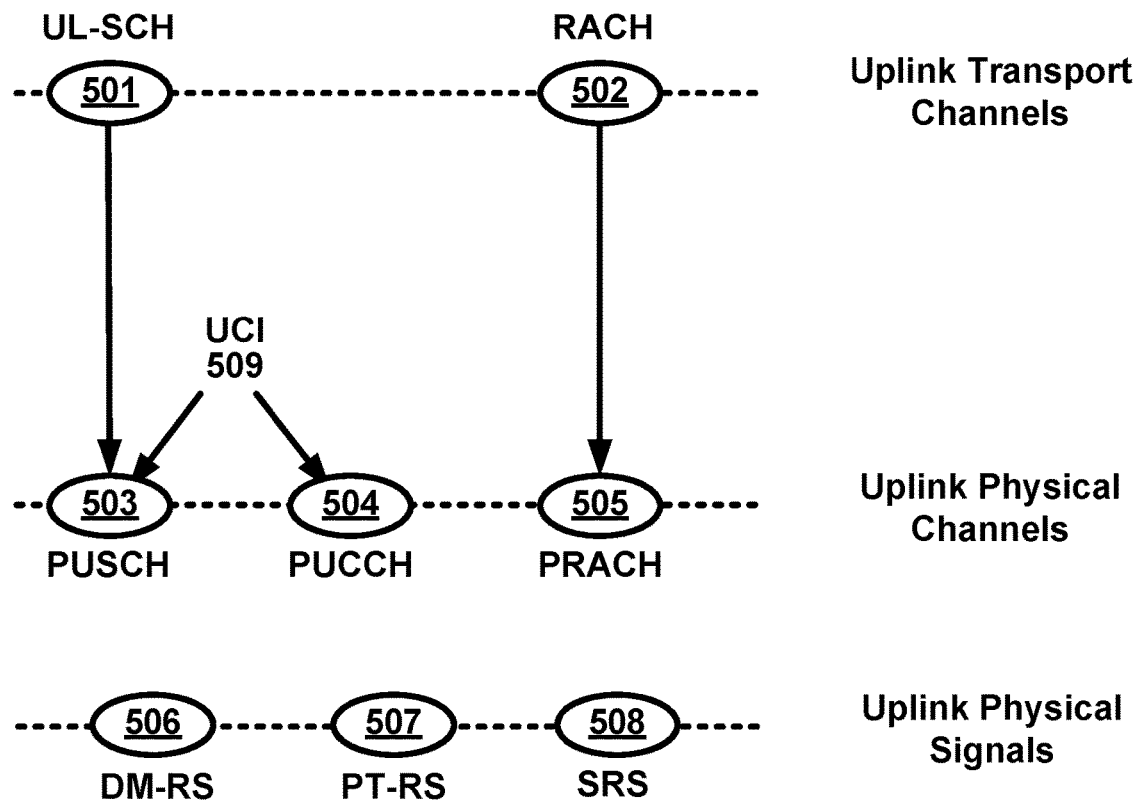
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
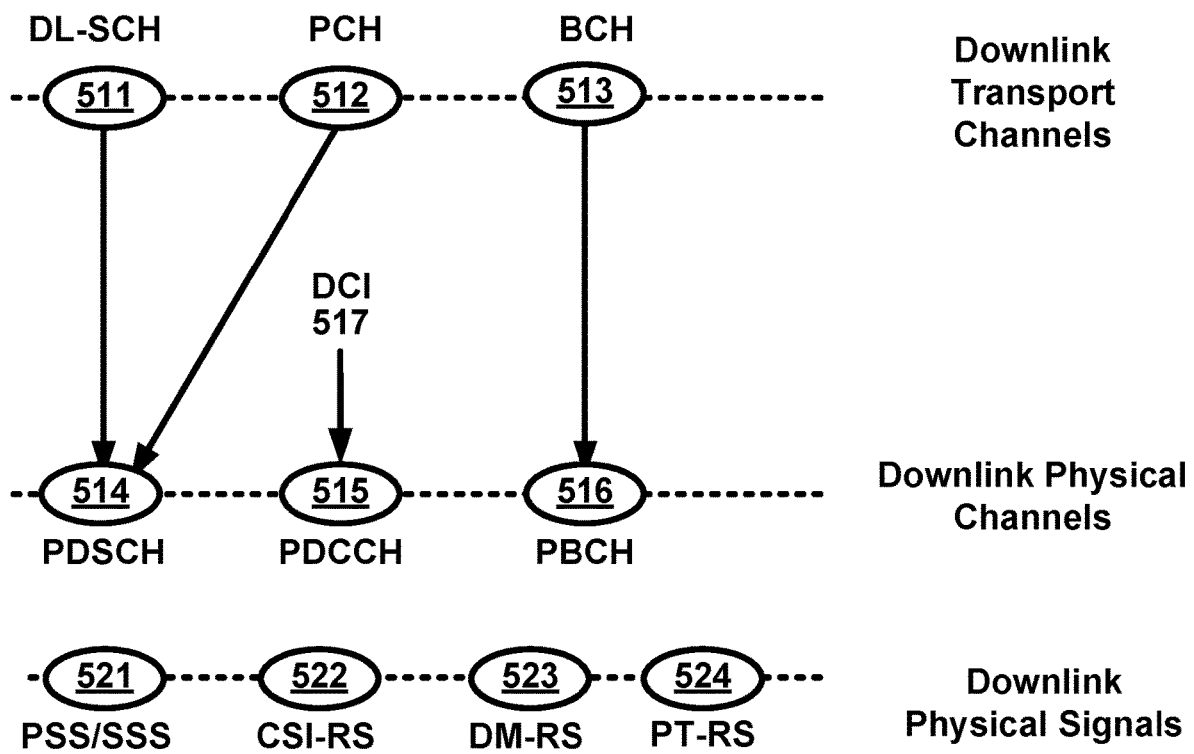
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
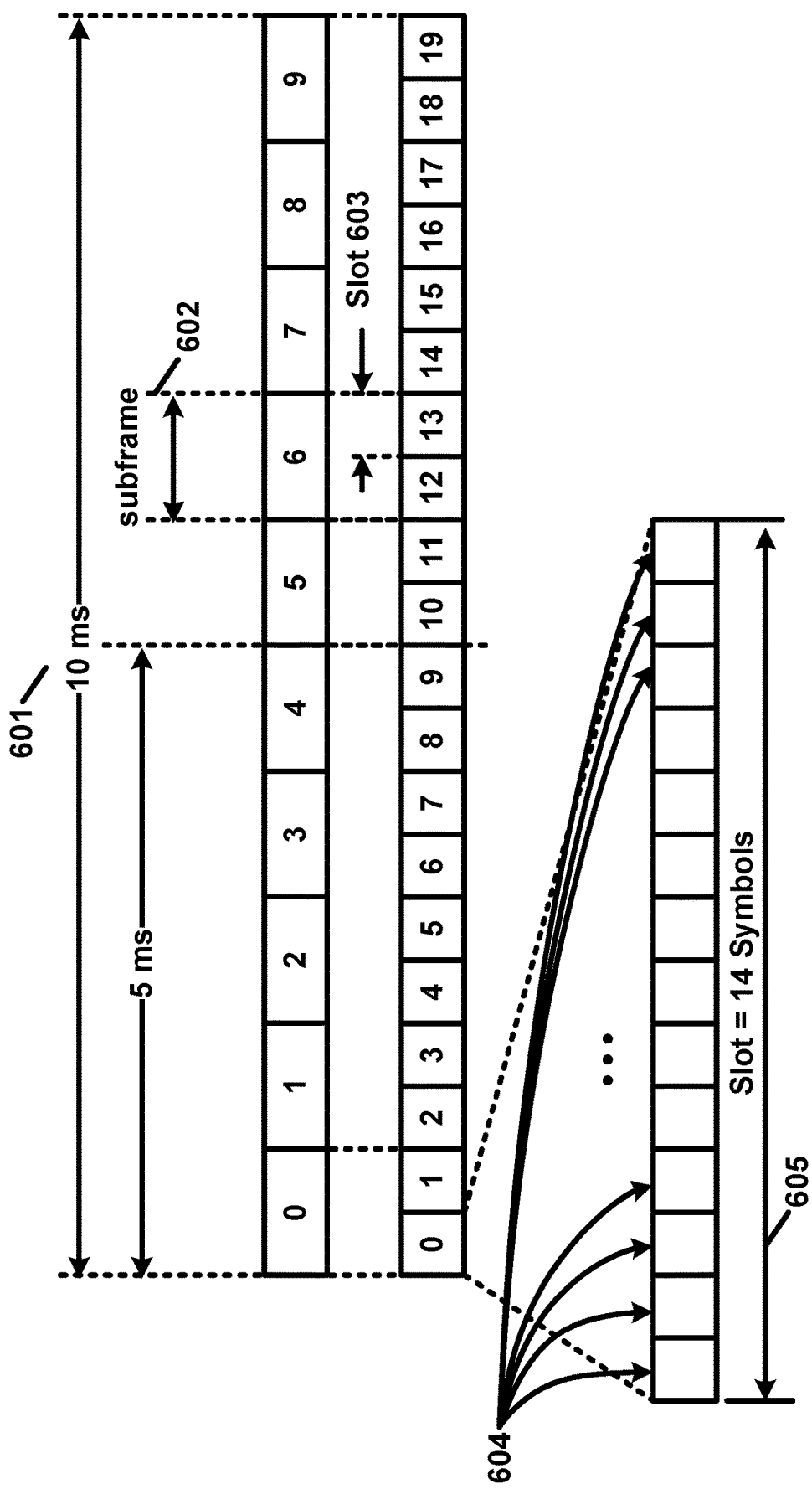
FIG. 6 shows an example transmission time and/or reception time for a carrier.

FIG. 6 shows an example transmission and/or reception time of a carrier, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame structure. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
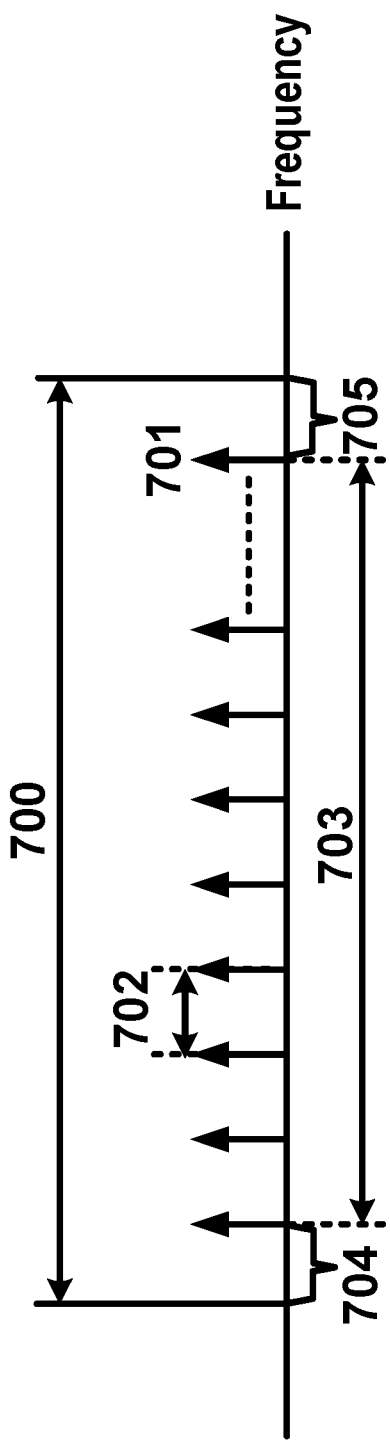
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
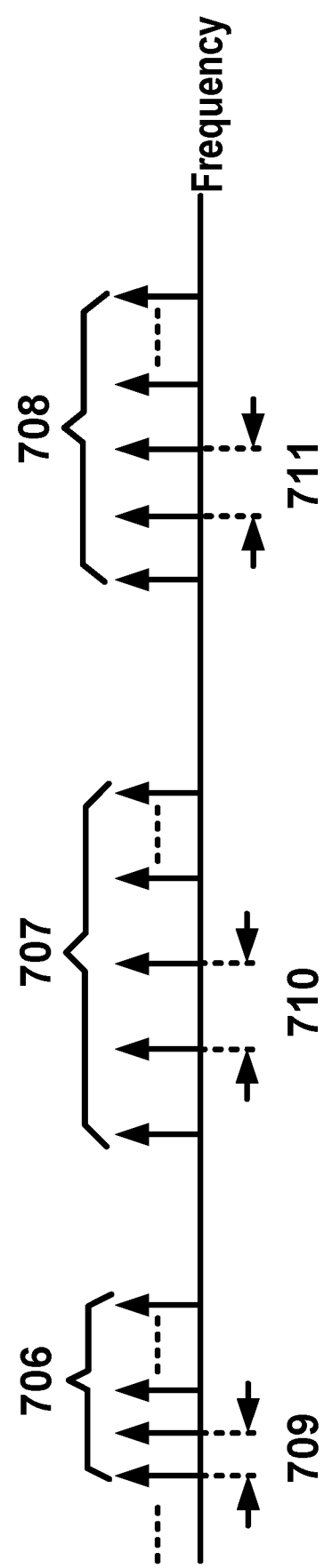

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
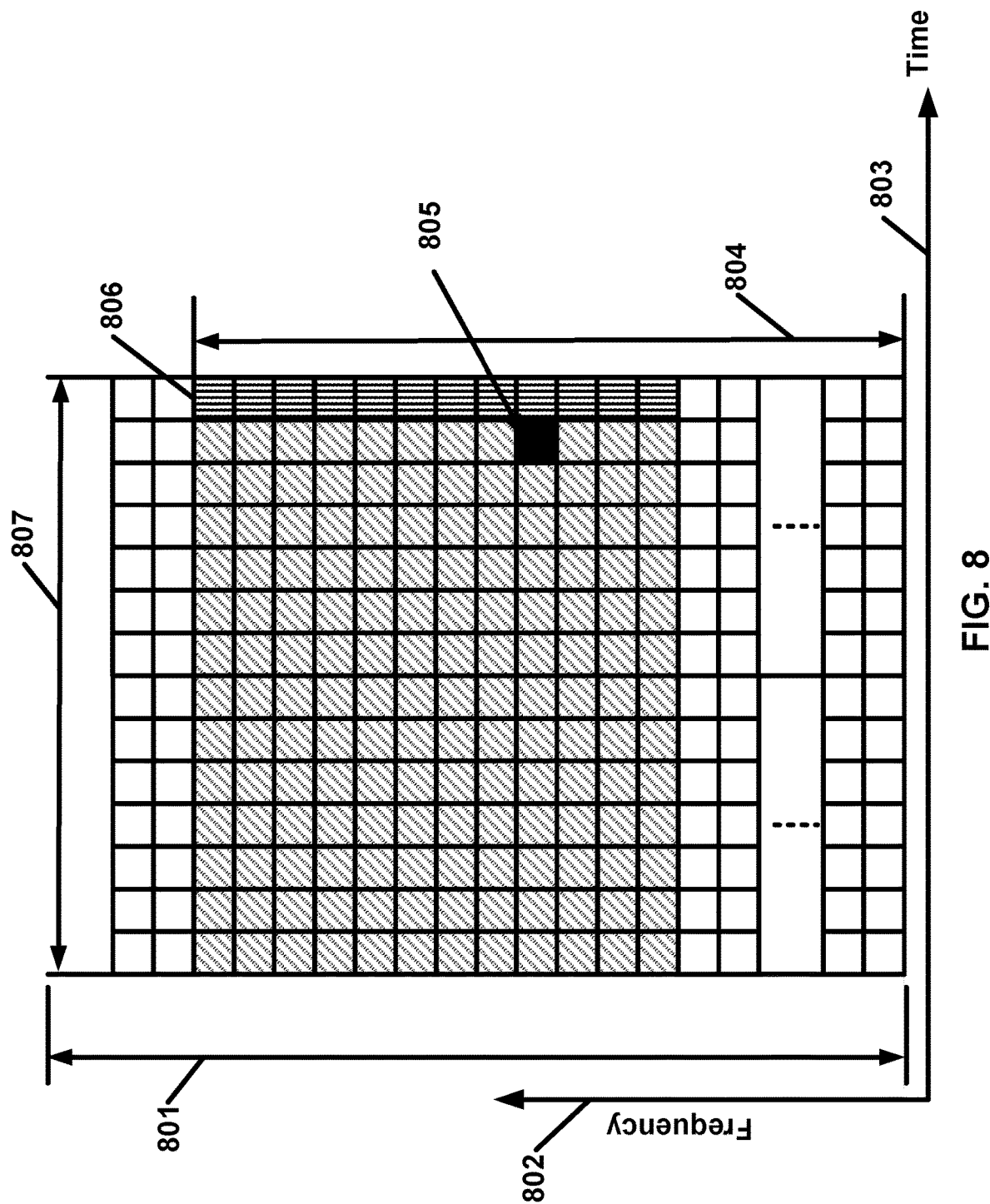
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a BWP of a carrier. A carrier may comprise multiple BWPs. A first BWP of a carrier may have a different frequency location and/or a different bandwidth from a second BWP of the carrier.

A base station may send (e.g., transmit), to a wireless device, a downlink control information comprising a downlink or uplink resource block assignment. A base station may send (e.g., transmit) to and/or receive from, a wireless device, data packets (e.g., TBs). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more TBs. The DCI may indicate a downlink assignment indicating parameters for receiving one or more TBs. The DCI may be used by the base station to initiate a contention-free RA at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
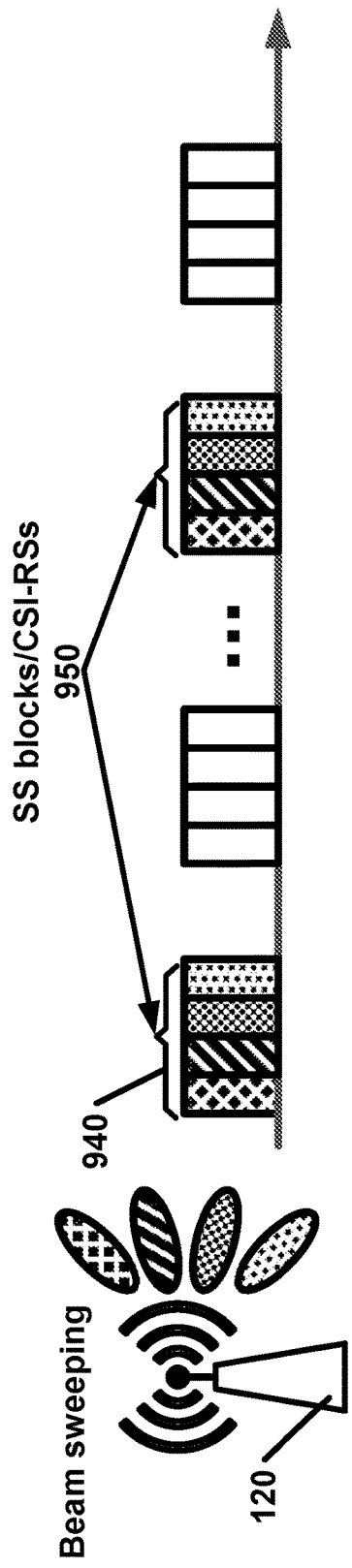
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
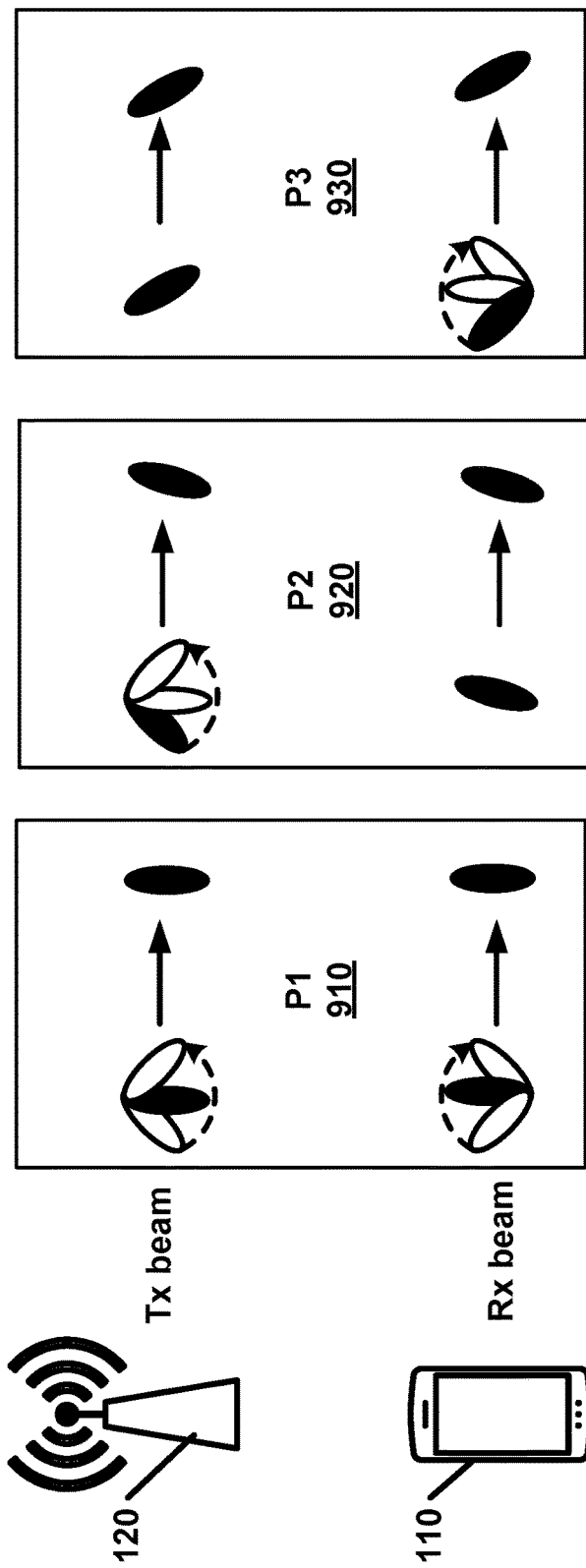
FIG. 9B shows an example downlink beam management procedure.

FIG. 9B shows an example of a beam management procedure, such as a new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
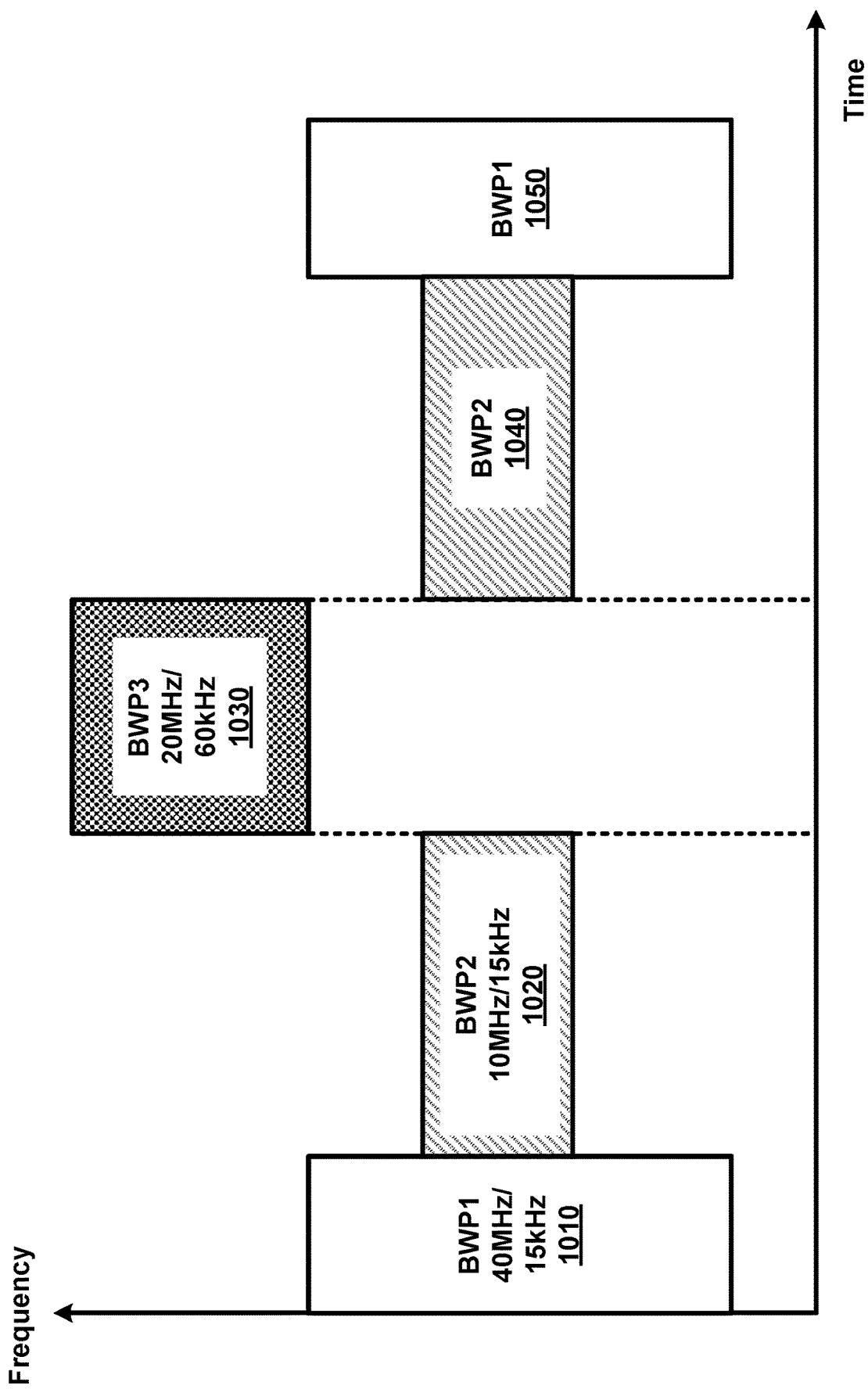
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a CORESETs for at least one common search space. For operation on the PCell, one or more higher layer parameters may indicate at least one initial UL BWP for a RA procedure. If a wireless device is configured with a secondary carrier on a primary cell, the wireless device may be configured with an initial BWP for RA procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a sub-carrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
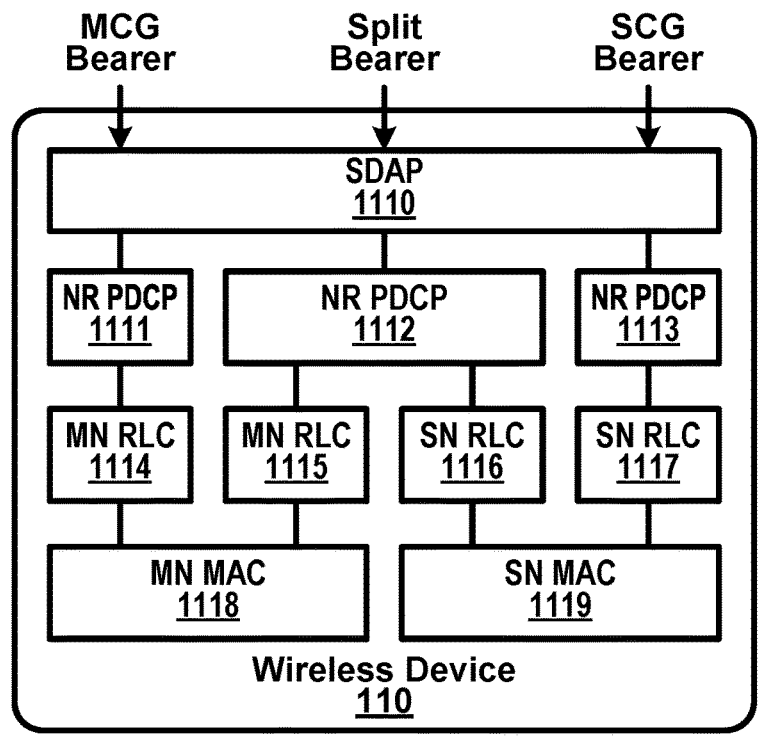
FIG. 11A and FIG. 11B show examples of multi connectivity.
Figure 11B:
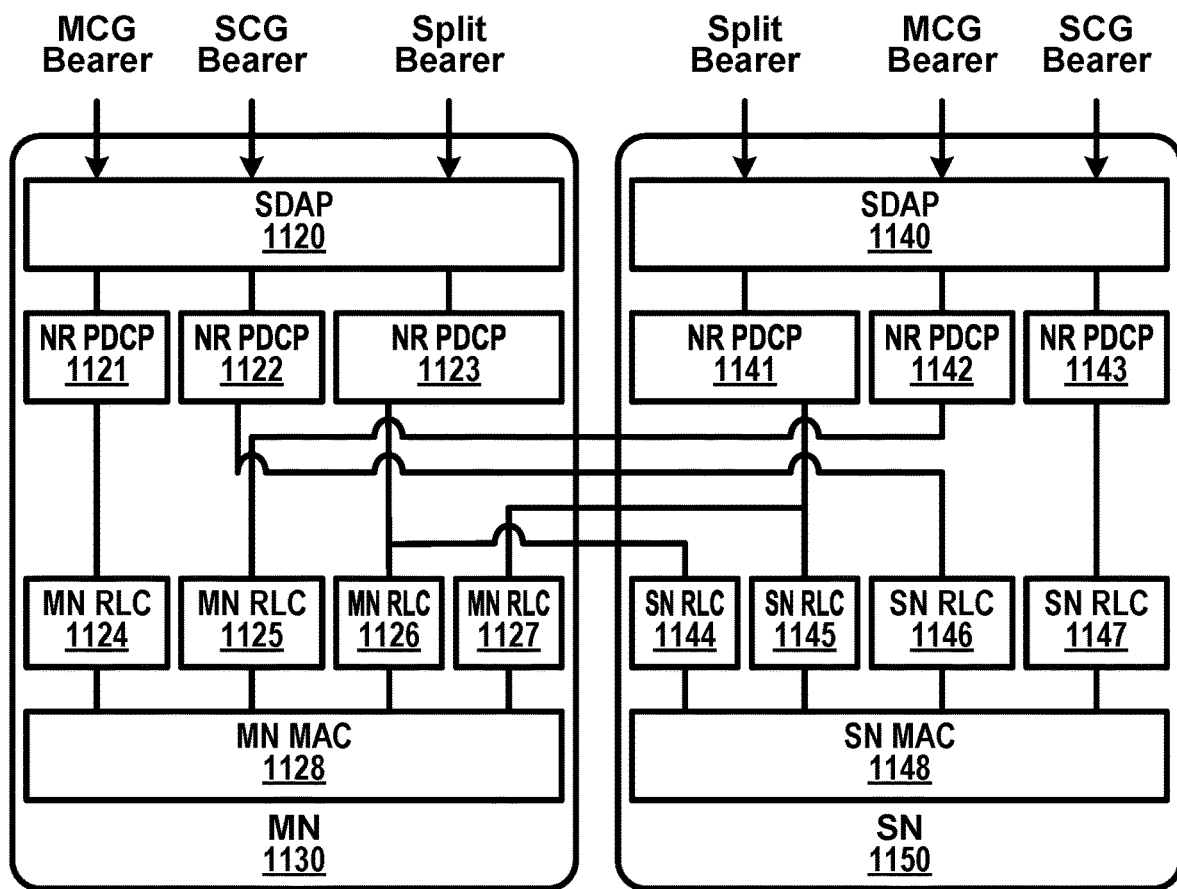

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a RA problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
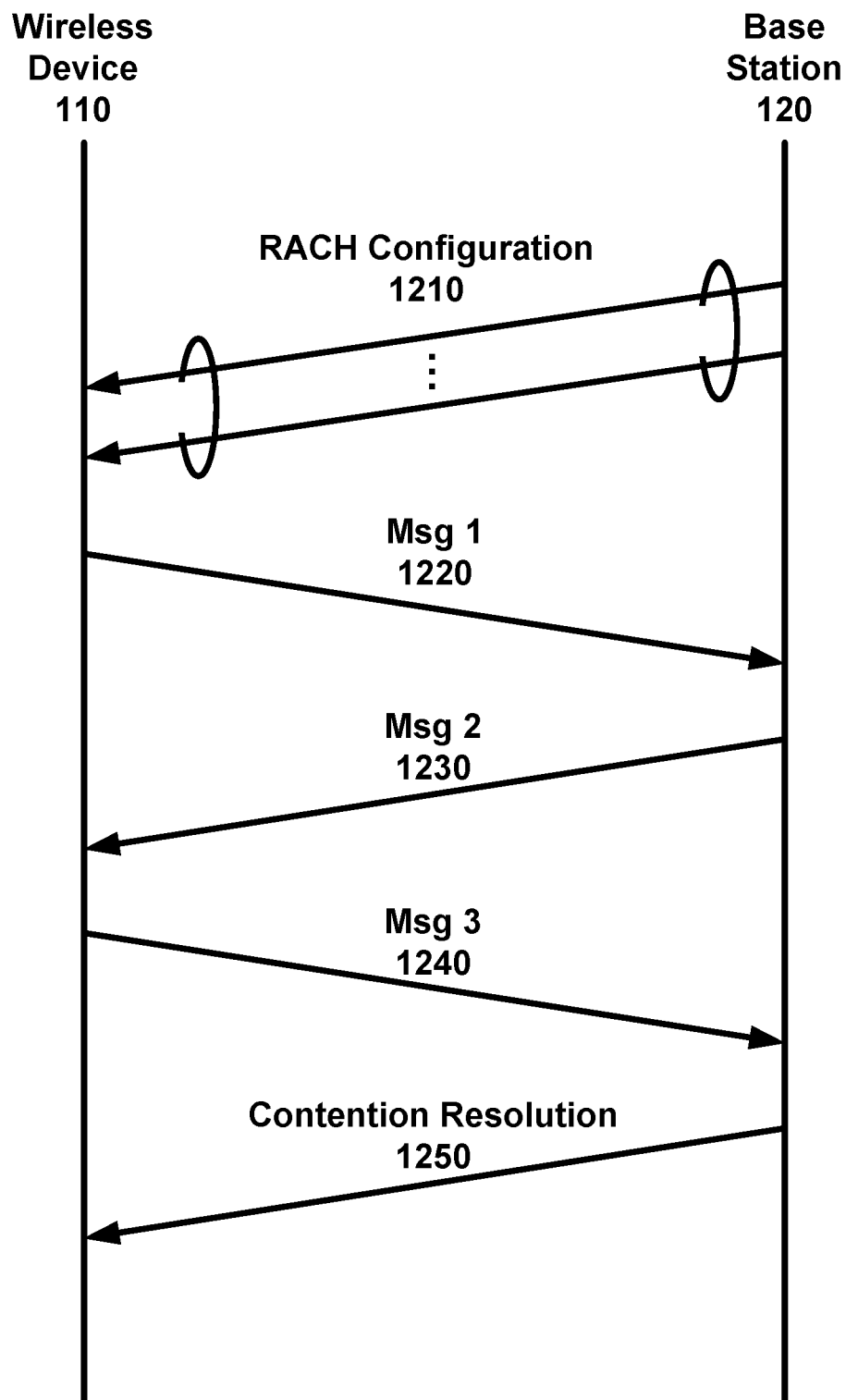
FIG. 12 shows an example of a random access procedure.

FIG. 12 shows an example of a RA procedure. One or more events may trigger a RA procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a RA procedure.

A RA procedure may comprise or be one of at least a contention based RA procedure and/or a contention free RA procedure. A contention based RA procedure may comprise one or more Msg 1 1220 transmissions, one or more Msg2 1230 transmissions, one or more Msg3 1240 transmissions, and contention resolution 1250. A contention free RA procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step RA procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step RA procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step RA procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble (RAP), initial preamble power (e.g., RAP initial received target power), an RSRP threshold for a selection of a SS block and corresponding PRACH resource, a power-ramping factor (e.g., RAP power ramping step), a RAP index, a maximum number of preamble transmissions, preamble group A and group B, a threshold (e.g., message size) to determine the groups of RAPs, a set of one or more RAPs for a system information request and corresponding PRACH resource(s) (e.g., if any), a set of one or more RAPs for a beam failure recovery request and corresponding PRACH resource(s) (e.g., if any), a time window to monitor RAR(s), a time window to monitor response(s) on a beam failure recovery request, and/or a contention resolution timer.

The Msg1 1220 may comprise one or more transmissions of a RAP. For a contention based RA procedure, a wireless device may select an SS block with an RSRP above the RSRP threshold. If RAPs group B exists, a wireless device may select one or more RAPs from a group A or a group B, for example, depending on a potential Msg3 1240 size. If a RAPs group B does not exist, a wireless device may select the one or more RAPs from a group A. A wireless device may select a RAP index randomly (e.g., with equal probability or a normal distribution) from one or more RAPs associated with a selected group. If a base station semi-statically configures a wireless device with an association between RAPs and SS blocks, the wireless device may select a RAP index randomly with equal probability from one or more RAPs associated with a selected SS block and a selected group.

A wireless device may initiate a contention free RA procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a RAP index corresponding to a selected SS block or a CSI-RS from a set of one or more RAPs for a beam failure recovery request, for example, if at least one of the SS blocks with an RSRP above a first RSRP threshold among associated SS blocks is available, and/or if at least one of CSI-RSs with a RSRP above a second RSRP threshold among associated CSI-RSs is available.

A wireless device may receive, from a base station, a RAP index via PDCCH or RRC for a contention free RA procedure. The wireless device may select a RAP index, for example, if a base station does not configure a wireless device with at least one contention free PRACH resource associated with SS blocks or CSI-RS. The wireless device may select the at least one SS block and/or select a RAP corresponding to the at least one SS block, for example, if a base station configures the wireless device with one or more contention free PRACH resources associated with SS blocks and/or if at least one SS block with a RSRP above a first RSRP threshold among associated SS blocks is available. The wireless device may select the at least one CSI-RS and/or select a RAP corresponding to the at least one CSI-RS, for example, if a base station configures a wireless device with one or more contention free PRACH resources associated with CSI-RSs and/or if at least one CSI-RS with a RSRP above a second RSPR threshold among the associated CSI-RSs is available.

A wireless device may perform one or more Msg1 1220 transmissions, for example, by sending (e.g., transmitting) the selected RAP. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected RAP via a selected PRACH occasions. The wireless device may determine a transmit power for a transmission of a selected RAP at least based on an initial preamble power and a power-ramping factor. The wireless device may determine an RA-RNTI associated with a selected PRACH occasion in which a selected RAP is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a RAR, Msg 2 1230. The wireless device may start a time window (e.g., ra-ResponseWindow) to monitor a RAR. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one RAR identified by a RA-RNTI, or for at least one response to a beam failure recovery request identified by a C-RNTI, at a time that a timer for a time window is running.

A wireless device may determine that a reception of RAR is successful, for example, if at least one RAR comprises a random access preamble identifier (RAPID) corresponding to a RAP sent (e.g., transmitted) by the wireless device. The wireless device may determine that the contention free RA procedure is successfully completed, for example, if a reception of a RAR is successful. The wireless device may determine that a contention free RA procedure is successfully complete, for example, if a contention free RA procedure is triggered for a beam failure recovery request and if a PDCCH transmission is addressed to a C-RNTI. The wireless device may determine that the RA procedure is successfully completed, and may indicate a reception of an acknowledgement for a system information request to upper layers, for example, if at least one RAR comprises a RAPID. The wireless device may stop sending (e.g., transmitting) remaining preambles (if any) after or in response to a successful reception of a corresponding RAR, for example, if the wireless device has signaled multiple preamble transmissions.

The wireless device may perform one or more Msg 3 1240 transmissions, for example, after or in response to a successful reception of RAR (e.g., for a contention based RA procedure). The wireless device may adjust an uplink transmission timing, for example, based on a timing advanced command indicated by a RAR. The wireless device may send (e.g., transmit) one or more TBs, for example, based on an uplink grant indicated by a RAR. Subcarrier spacing for PUSCH transmission for Msg3 1240 may be provided by at least one higher layer (e.g., RRC) parameter. The wireless device may send (e.g., transmit) a RAP via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same RAR comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a RA procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the RA procedure is successfully completed.

RA procedures may be used to establish communications between a wireless device and a base station associated with a cell. A four-step RA procedure (e.g., such as shown in FIG. 12 and described above) may have an associated latency. The associated latency for the four-step RA procedure may be a minimum of a quantity (e.g., fourteen or any other quantity) of transmission time intervals (TTIs). A TTI may be any transmission time interval or other time duration. A minimum latency of fourteen TTIs may comprise, for example, three TTIs after a message from step 1 1220 of a four-step RA procedure, one TTI for a message from step 2 1230 of a four-step RA procedure, five TTIs after the message from step 2, one TTI for a message from step 3 1240 of a four-step RA procedure, three TTIs after the message from step 3, and one TTI for a message from step 4 1250 of a four-step procedure (e.g., 3+1+5+1+3+1=14). The minimum latency may comprise any quantity of TTIs. Any of the above-references messages may comprise any quantity of TTIs. Reducing the number of steps in an RA procedure may reduce latency. A four-step RA procedure may be reduced to a two-step RA procedure, for example, by using parallel transmissions. A two-step RA procedure may have an associated latency. The associated latency for a two-step RA procedure may be a minimum of four TTIs and which may be less than an associated latency for a four-step RA procedure. A minimum latency of four TTIs may be a minimum of a quantity (e.g., four or any other quantity) of TTIs. A minimum latency of four TTIs may comprise, for example, three TTIs after a message from step 1 of a two-step RA procedure, and one TTI for a message from step 2 of a two-step RA procedure.

Figure 13:
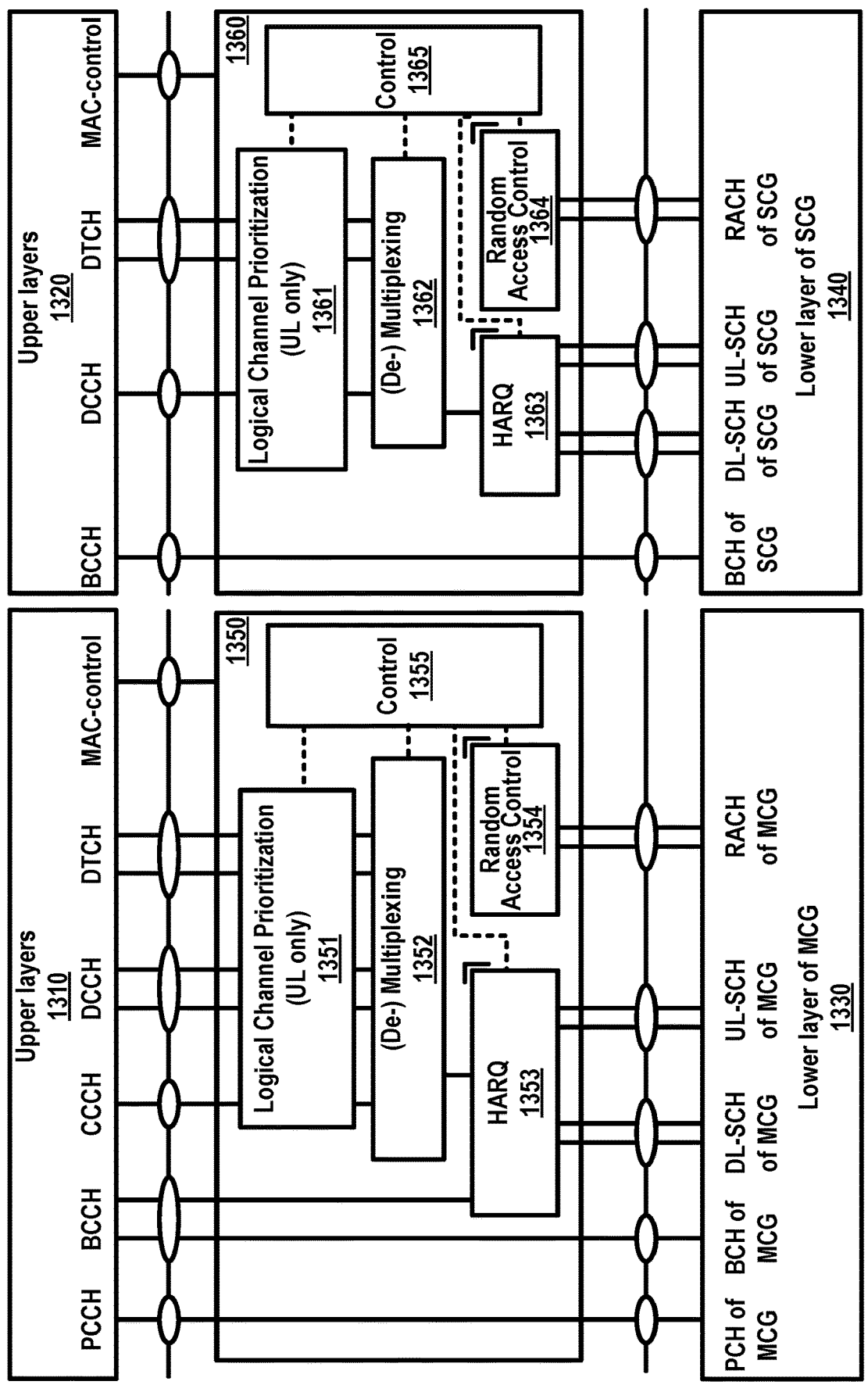
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a RA problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto TBs to be delivered to the physical layer on transport channels (e.g., in uplink), demultiplexing (e.g., (De-) Multiplexing 1352 and/or (De-) Multiplexing 1362) of MAC SDUs to one or different logical channels from TBs delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a RA process (e.g., Random Access Control 1354 and/or Random Access Control 1364).

Figure 14:
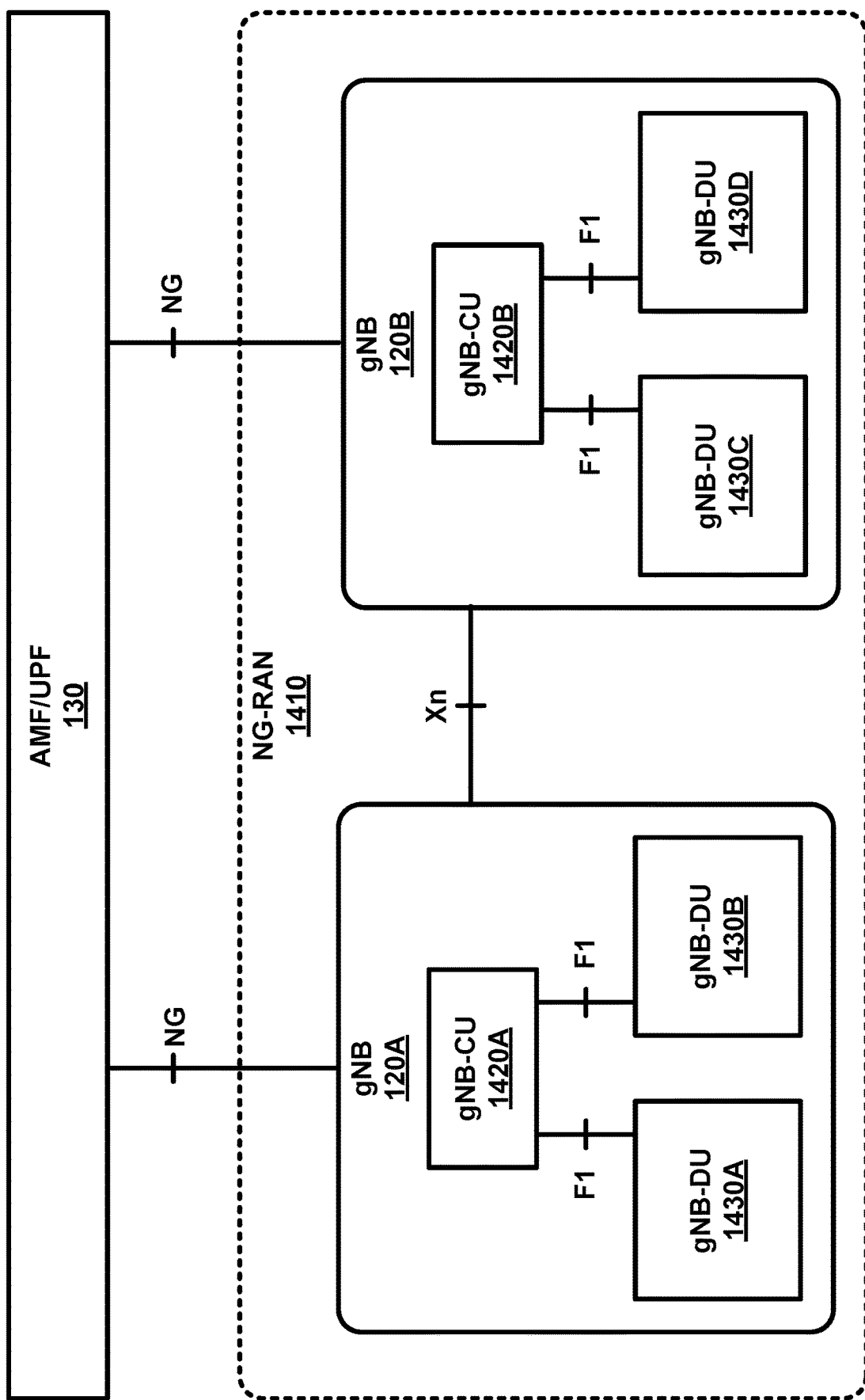
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer.

Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
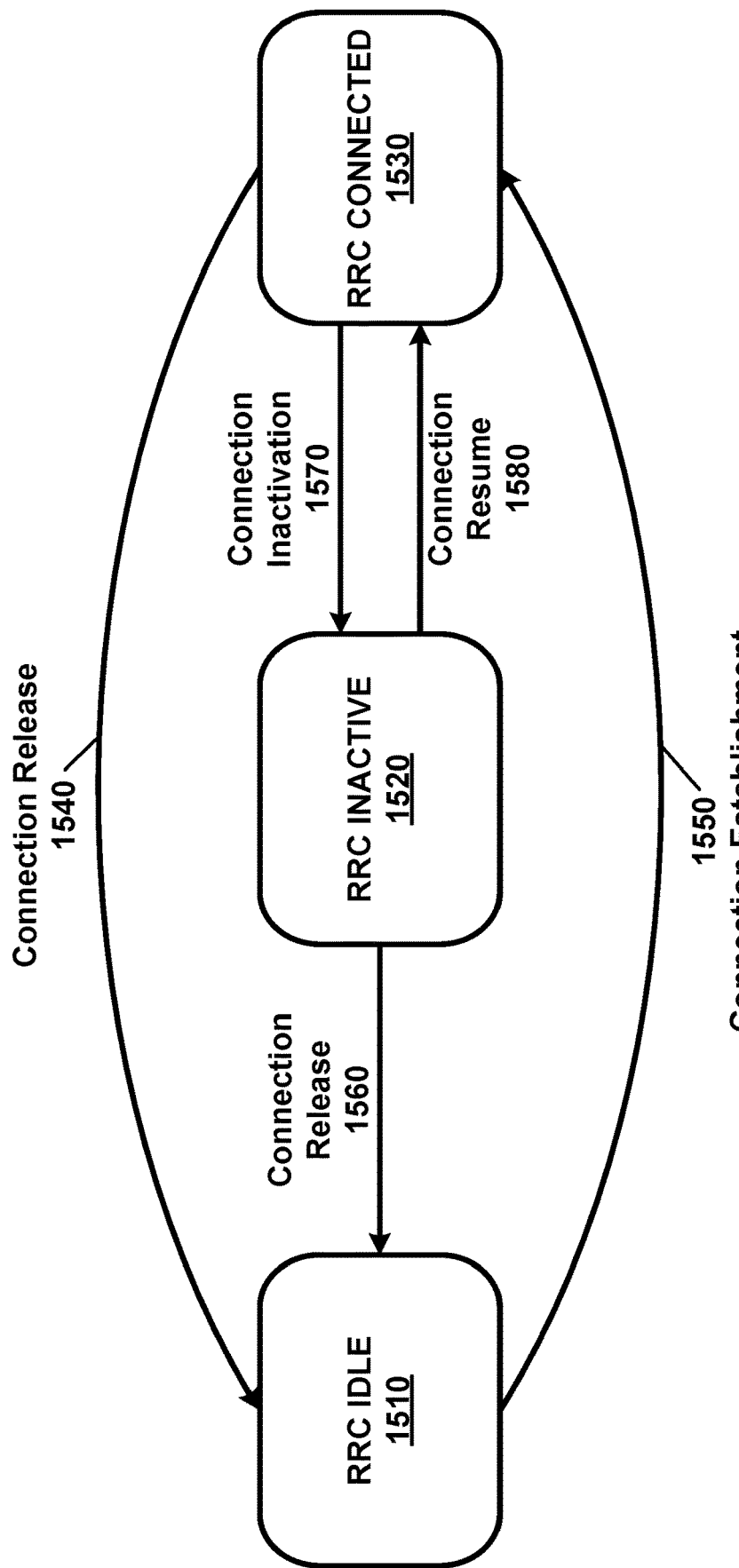
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure.

An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a RA procedure by the wireless device and/or a context retrieve procedure (e.g., UE context retrieve). A context retrieve procedure may comprise: receiving, by a base station from a wireless device, a RAP; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a RA procedure to resume an RRC connection and/or to send (e.g., transmit) one or more packets to a base station (e.g., to a network). The wireless device may initiate a RA procedure to perform an RNA update procedure, for example, if a cell selected belongs to a different RNA from an RNA for the wireless device in an RRC inactive state. The wireless device may initiate a RA procedure to send (e.g., transmit) one or more packets to a base station of a cell that the wireless device selects, for example, if the wireless device is in an RRC inactive state and has one or more packets (e.g., in a buffer) to send (e.g., transmit) to a network. A RA procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

Figure 16:
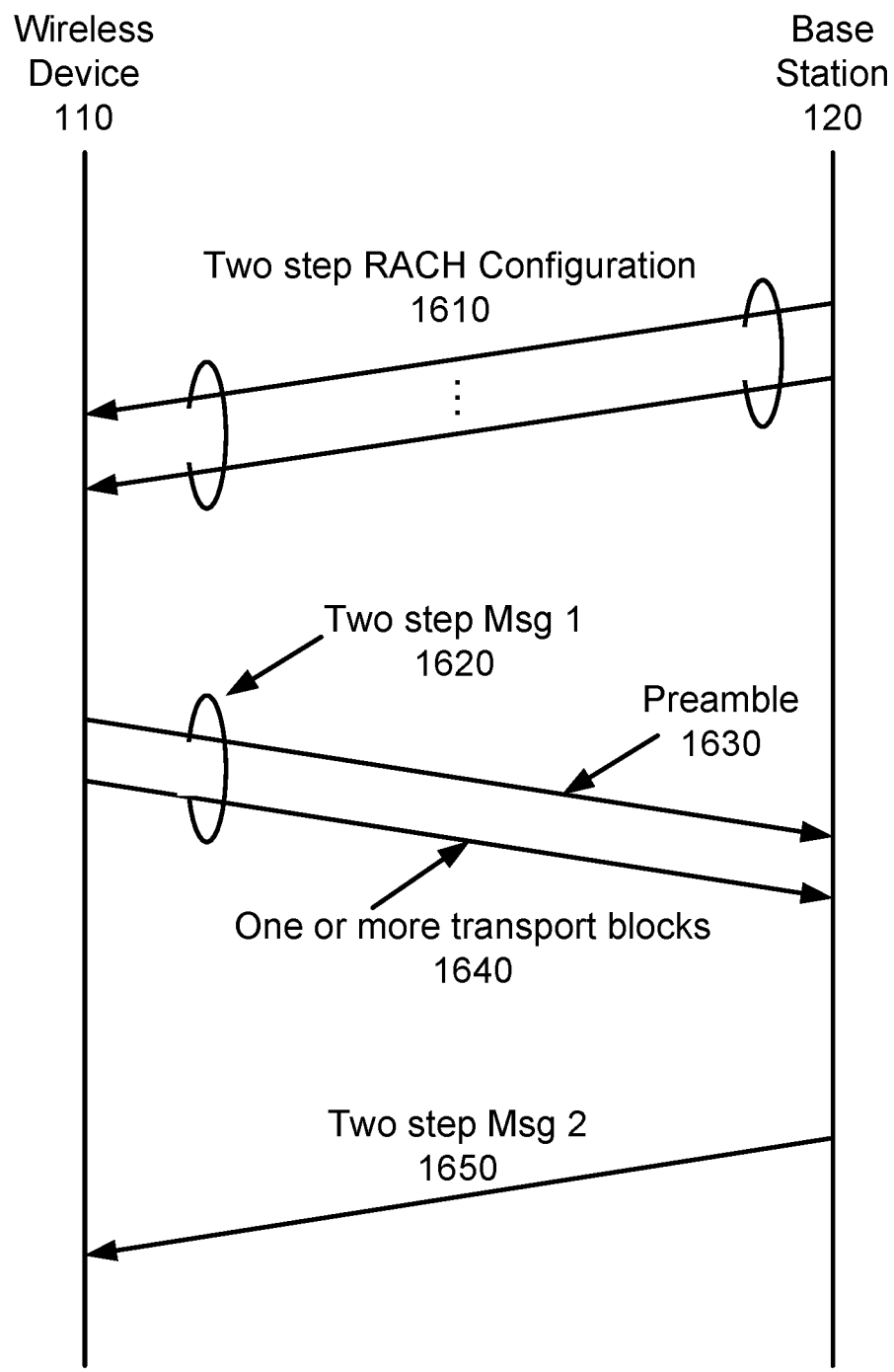
FIG. 16 shows an example of a two-step RA procedure.

FIG. 16 shows an example of a two-step RA procedure. The procedure may comprise an uplink (UL) transmission of a two-step Msg1 1620, for example, based on a two-step RACH configuration 1610 from a base station. The two-step Msg1 1620 may be referred to as message A (e.g., Msg A). The transmission may comprise a RAP transmission 1630 and one or more TBs for transmission 1640. The UL transmission may be followed by a downlink (DL) transmission of a two-step Msg2 1650 that may comprise a response (e.g., random access response (RAR)) corresponding to the uplink transmission. The two-step Msg2 1650 may be referred to as a message B (e.g., Msg B). The response may comprise contention resolution information.

A wireless device may receive (e.g., from a base station) one or more RRC messages to configure one or more parameters of a two-step RACH configuration 1610. The one or more RRC messages may be broadcasted or multicasted to one or more wireless devices. The one or more RRC messages may be wireless device-specific messages (e.g., a dedicated RRC message sent (e.g., transmitted) to a wireless device indicating RRC INACTIVE 1520 or RRC CONNECTED 1530). The one or more RRC messages may comprise parameters for sending (e.g., transmitting) a two-step Msg1 1620. The parameters may indicate one or more of following: PRACH resource allocation, preamble format, SSB information (e.g., total number of SSBs, downlink resource allocation of SSB transmission, transmission power of SSB transmission, and/or other information), and/or uplink radio resources for one or more TB transmissions.

A base station may receive (e.g., from a wireless device via a cell), a RAP transmission for UL time alignment and/or one or more TBs (e.g., delay-sensitive data, wireless device ID, security information, device information such as IMSI, and/or other information), for example, in the UL transmission of a two-step RA procedure. A base station may send (e.g., transmit) a two-step Msg2 1650 (e.g., an RAR), for example, in the DL transmission of the two-step RA procedure. The two-step Msg2 1650 (e.g., an RAR) may comprise at least one of following: a timing advance command indicating the TA value, a power control command, an UL grant (e.g., radio resource assignment, and/or MCS), a wireless device ID for contention resolution, an RNTI (e.g., C-RNTI or TC-RNTI), and/or other information. The two-step Msg2 1650 (e.g., an RAR) may comprise a preamble identifier corresponding to the preamble 1630, a positive or negative acknowledgement of a reception of the one or more TBs 1640, and/or an indication of a successful decoding of the one or more TBs 1640. A two-step RA procedure may reduce RA latency compared with a four-step RA procedure for example, by integrating a RAP transmission (such as a process to obtain a timing advance value) with one or more TB transmissions.

A base station may receive (e.g., from a wireless device via a cell) an RAP in parallel with one or more TBs, for example, in the UL transmission of a two-step RA procedure. The wireless device may acquire one or more configuration parameters for the UL transmission before the wireless device starts a two-step RA procedure (e.g., at step 1610 in FIG. 16). The one or more configuration parameters may indicate one or more of following: PRACH resource allocation, preamble format, SSB information (e.g., a number of transmitting SSBs, downlink resource allocation of SSB transmissions, transmission power of SSB transmission, and/or other information), uplink radio resources (e.g., in terms of time, frequency, code/sequence/signature) for one or more TB transmissions, and/or power control parameters of one or more TB transmissions (e.g., cell and/or wireless device specific power adjustments used for determining (e.g., calculating) received target power, inter-cell interference control parameter that may be used as a scaling factor of pathloss measurement, reference signal power to determine (e.g., calculate for) pathloss measurement, and/or one or more margins).

A wireless device may generate an RAP. A two-step RACH configuration may comprise RAP generating parameters (e.g., a root sequence) that may be employed by the wireless device to generate an RAP. The wireless device may use the RAP generating parameters to generate one or more candidate preambles and may randomly select one of the candidate preambles as the RAP. The RAP generating parameters may be SSB-specific and/or cell-specific. RAP generating parameters for a first SSB may be different from or the same as RAP generating parameters for a second SSB. A base station may send (e.g., transmit) a control message (e.g., RRC message for a handover, and/or a PDCCH order for a secondary cell addition) that comprises a preamble index indicating an RAP dedicated to a wireless device to initiate a two-step RA procedure. The one or more candidate preambles may be organized into groups that may indicate an amount of data for transmission. The amount of data may indicate one or more TBs that remain in the buffer. Each of the groups may be associated with a range of data size. A first group of the groups may comprise RAPs indicated for small data transmissions. A second group may comprise RAPs indicated for larger data transmissions. A wireless device may determine a group of RAPs by comparing one or more thresholds and an amount of data, for example, based on an RRC message comprising one or more thresholds (e.g., transmitted by a based station). The wireless device may be able to indicate a size of data the wireless device may have for transmission, for example, by sending (e.g., transmitting) an RAP from a specific group of RAPs.

In a two-step RA procedure, a wireless device may send (e.g., transmit) a RAP via a RACH resource indicated by a two-step RACH configuration. The wireless device may send (e.g., transmit) one or more TBs via an UL radio resource indicated by a two-step RACH configuration. The transmission of the RAP may be overlapped in time (e.g., partially or entirely) with the transmission of the one or more TBs. The two-step RACH configuration may indicate a portion of overlapping of radio resources between the RAP and one or more TB transmissions. The two-step RACH configuration may indicate one or more UL radio resources associated with one or more RAPs (and/or RAP groups) and/or the RACH resource. A wireless device may determine at least one UL radio resource in which the wireless device may send (e.g., transmit) one or more TBs as a part of a two-step RACH procedure, for example, based on a selection of an RAP, an RAP group, and/or an RACH resource. The one or more UL radio resources may be indicated based on a frame structure (such as shown in FIG. 6), and/or OFDM radio structure (such as shown in FIG. 8), The indication may be with respect to an SFN (e.g., SFN=0), slot number, and/or OFDM symbol number for a time domain radio resource, and/or with respect to a subcarrier number, a number of resource elements, a number of resource blocks, RBG number, and/or frequency index for a frequency domain radio resource. The one or more UL radio resources may be indicated based on a time offset and/or a frequency offset with respect to one or more RACH resources of a selected RAP. The UL transmissions may occur (e.g., in the same subframe or slot/mini-slot) in consecutive subframes (or slot/mini-slot), or in the same burst.

A PRACH resource and one or more associated UL radio resources for a two-step Msg1 may be allocated with a time offset and/or frequency offset, for example, such as provided (e.g., configured, determined, indicated, etc.) by RRC messages (e.g., as a part of RACH config.) and/or predefined (e.g., as a mapping table).

FIG. 17A, FIG. 17B, and FIG. 17C show examples of radio resource allocations of a random access resource (e.g., PRACH) 1702 and one or more associated radio resources 1704. UL radio resources may be based on a time offset 1706, a frequency offset 1708, and a combination of a time offset 1706 and a frequency offset 1708, respectively. FIG. 17A, FIG. 17B, and FIG. 17C comprise a PRACH resource 1702 and a UL radio resource 1704 that are associated with a single SSB transmission. The PRACH resource 1702 and/or the UL radio resource 1704 may be associated with a first SSB transmission of one or more SSB transmissions.

A base station may acquire a UL transmission timing, for example, by detecting an RAP sent (e.g., transmitted) PRACH resource 1702 based on the time offset 1706 and/or the frequency offset 1708. A base station may detect and/or decode one or more TBs sent (e.g., transmitted) via one or more associated UL radio resources 1704, for example, based on the UL transmission timing acquired from the RAP detection. A base station may send (e.g., transmit) one or more SSBs. Each of the one or more SSBs may have one or more associated PRACH resources 1702 and/or UL radio resources 1704 provided by (e.g., configured by, indicated by, etc.) a two-step RACH configuration. A wireless device may measure one or more SSBs. The wireless device may select at least one SSB, for example, based on measured received signal strength (and/or based on other selection rule). The wireless device may respectively send (e.g., transmit) an RAP and/or one or more TBs: via PRACH resources 1702 associated with the at least one SSB, and/or via UL radio resources 1704 associated with the PRACH resources 1702 and/or UL radio resources 1704 associated with the at least one SSB.

A base station may use the RAP transmission to adjust UL transmission time for a cell and/or to aid in channel estimation for one or more TBs. A portion of the UL transmission for one or more TBs in a two-step RACH procedure may comprise one or more of: a wireless device ID, a C-RNTI, a service request such as buffer state reporting (e.g., a buffer status report) (BSR), a user data packet, and/or other information. A wireless device in an RRC CONNECTED state may use a C-RNTI as an identifier of the wireless device (e.g., a wireless device ID). A wireless device in an RRC INACTIVE state may use a C-RNTI (if available), a resume ID, and/or a short MAC-ID as an identifier of the wireless device. A wireless device in an RRC IDLE state may use a C-RNTI (if available), a resume ID, a short MACID, an IMSI (International Mobile Subscriber Identifier), a T-IMSI (Temporary-IMSI), and/or a random number as an identifier of the wireless device.

In a two-step RACH procedure, the UL transmission may comprise one or more TBs that may be sent (e.g., transmitted) in one or more ways. First resource(s) allocated for one or more TBs may be multiplexed with second resource(s) allocated for an RAP transmission in time and/or frequency domains. One or more resources may be configured (e.g., by a base station) to be reserved for the UL transmission that may be indicated to a wireless device before the UL transmission. A base station may send (e.g., transmit) in a two-step Msg2 1650 (e.g., an RAR) that may comprise a contention resolution message and/or an acknowledgement (ACK or NACK) message of the one or more TBs, for example, based on one or more TBs sent (e.g., transmitted) by a wireless device in a two-step Msg1 1620 of a two-step RA procedure. A wireless device may send (e.g., transmit) one or more second TBs after the reception of an RAR. The wireless device may send (e.g., transmit) an indicator, such as buffer state reporting, in a two-step Msg1 1620 of a two-step RA procedure. The indicator may indicate to a base station an amount of data the wireless device to send (e.g., transmit) and/or an amount of data remains in a buffer. The base station may determine a UL grant based on the indicator. The wireless device may receive (e.g., from a base station) the UL grant to via an RAR.

A wireless device may receive two separate responses in a two-step/RA procedure: a first response for RAP transmission, and a second response for one or more TB transmission. A wireless device may monitor or continue to monitor a common search space to detect the first response with a random access RNTI generated based on time and frequency indices of a PRACH resource in which the wireless device may send (e.g., transmit) an RAP. A wireless device may monitor or continue to monitor a common search space and/or a wireless device specific search space to detect the second response. The wireless device may employ a C-RNTI (e.g., if configured) and/or a random access RNTI generated based on one or more time indices and/or one or more frequency indices of a PRACH resource in which the wireless device may send (e.g., transmit) an RAP, for example, to detect the second response. The wireless device-specific search space may be predefined and/or configured by an RRC message.

One or more events may trigger a two-step RA procedure. The one or more events may be one or more of: an initial access from RRC_IDLE, a RRC connection re-establishment procedure, a handover, a DL or a UL data arrival during RRC_CONNECTED if UL synchronization status is non-synchronized, a transition from RRC_Inactive, a beam failure recovery procedure, and/or a request for other system information. A PDCCH order, a wireless device (e.g., a MAC entity of a wireless device), and/or a beam failure indication may initiate a RA procedure.

A two-step RA procedure may be initiated based on one or more case-based procedures, services, or radio conditions. One or more wireless devices may be configured (e.g., by a base station in the cell under its coverage) to use a two-step RA procedure, for example, based on a cell identified and/or indicated as small (e.g., there may be no need for a TA). A wireless device may acquire the configuration, via one or more RRC messages (e.g., system information blocks, multicast and/or unicast RRC signaling), and/or via L1 control signaling (e.g., PDCCH order) used to initiate a two-step RA procedure.

A wireless device (e.g., a stationary or near stationary wireless device such as a sensor-type wireless device) may have a stored and/or persisted TA value. A two-step RA procedure may be initiated based on the stored and/or persisted TA value. A base station having macro coverage may use broadcasting and/or dedicated signaling to configure a two-step RA procedure with one or more wireless devices having stored and/or persisted TA values under the coverage.

A wireless device in an RRC connected state may perform a two-step RA procedure. The two-step RA procedure may be initiated if a wireless device performs a handover (e.g., network-initiated handover), and/or if the wireless device requires or requests a UL grant for a transmission of delay-sensitive data and there are no physical-layer uplink control channel resources available to send (e.g., transmit) a scheduling request. A wireless device in an RRC INACTIVE state may perform a two-step RA procedure, for example, for a small data transmission while remaining in the RRC INACTIVE state or for resuming a connection. A wireless device may initiate a two-step RA procedure, for example, for initial access such as establishing a radio link, re-establishment of a radio link, handover, establishment of UL synchronization, and/or a scheduling request if there is no UL grant.

The following description presents one or more examples of a RACH procedure. The procedures and/or parameters described in the following may not be limited to a specific RA procedure. The procedures and/or parameters described in the following may be applied for a four-step RA procedure and/or a two-step RA procedure. A RA procedure may refer to a four-step RA procedure and/or a two-step RA procedure in the following description.

A wireless device may receive (e.g., from a base station) one or more messages indicating RA parameters of a four-step RA procedure (such as shown in FIG. 12) and/or a two-step RA procedure (such as shown in FIG. 16). The one or more messages may be a broadcast RRC message, a wireless device specific RRC message, and/or a combination thereof. The one or more messages may comprise a RA configuration (e.g., at least one of: RACH-ConfigCommon, RACH-ConfigGeneric, and/or RACH-ConfigDedicated). A wireless device may receive, from a base station, a common and/or a generic random access resource configuration (e.g., at least RACH-ConfigCommon and/or RACH-ConfigGeneric), for example, based on a contention based (e.g., four-step and/or a two-step) RA procedure. A wireless device may receive, from a base station, a dedicated random access resource configuration (e.g., at least RACH-ConfigDedicated), for example, based on a contention free (four-step and/or a two-step) RA procedure.

A base station may send (e.g., transmit), to a wireless device, one or more messages indicating RA parameters. The one or more messages may be broadcast via RRC message, via wireless device specific RRC message, and/or via a combination thereof. The one or more messages may comprise at least one of a common, generic, and/or dedicated random access resource configuration (e.g., RACH- ConfigCommon, RACH-ConfigGeneric, and/or RACH-ConfigDedicated). A wireless device may receive, from a base station, a common and/or a generic random access resource configuration (e.g., RACH-ConfigCommon and/or RACH-ConfigGeneric), for example, for a contention based RA procedure. A wireless device may receive, from a base station, at least a dedicated random access resource configuration (e.g., RACH-ConfigDedicated), for example, for a contention free RA procedure.

FIGS. 18A, 18B, and 18C show, respectively, examples of an RAR, a MAC subheader with backoff indicator (BI), and a MAC subheader with a RAPID. A wireless device may receive from a base station at least one RAR as a response of Msg1 1220 (as shown in FIG. 12) or two-step Msg1 1620 (shown in FIG. 16) using an RA procedure. An RAR may be in a form of MAC PDU comprising one or more MAC subPDUs and/or (optionally) padding. FIG. 18A is an example of an RAR. A MAC subheader may be octet-aligned. Each MAC subPDU may comprise one or more of the following: a MAC subheader with BI only; a MAC subheader with RAPID only (e.g., acknowledgment for SI request); a MAC subheader with RAPID and MAC RAR. FIG. 18B shows an example of a MAC subheader with BI. A MAC subheader with BI may comprise one or more header fields (e.g., E/T/R/R/BI) as shown in FIG. 18B and described below. A MAC subPDU with BI may be placed at the beginning of the MAC PDU, if included. MAC subPDU(s) with RAPID only, and/or MAC subPDU(s) with RAPID and MAC RAR, may be placed anywhere after a MAC subPDU with BI and, before padding as shown in FIG. 18A. A MAC subheader with RAPID may comprise one or more header fields (e.g., E/T/RAPID) as shown in FIG. 18C. Padding may be placed at the end of the MAC PDU, if present. Presence and length of padding may be implicit, for example, based on TB size, and/or a size of MAC subPDU(s).

A field (e.g., an E field) in a MAC subheader may indicate an extension field that may be a flag indicating if the MAC subPDU (including the MAC subheader) is the last MAC subPDU or not in the MAC PDU. The E field may be set to "1" to indicate at least one more MAC subPDU follows. The E field may be set to "0" to indicate that the MAC subPDU including this MAC subheader is a last MAC subPDU in the MAC PDU. A field (e.g., a T field) may be a flag indicating whether the MAC subheader contains a RAPID or a BI (e.g., one or more backoff values may predefined and BI may indicate one of backoff value). The T field may be set to "0" to indicate the presence of a field (e.g., a BI field) in the subheader. The T field may be set to "1" to indicate the presence of a RAPID field in the subheader. A field (e.g., an R field) may indicate a reserved bit that may be set to "0." A field (e.g., a BI field) may indicate an overload condition in the cell. A size of the BI field may be 4 bits. A field (e.g., a RAPID field) may be a RAPID field that may identify and/or indicate the transmitted RAP. A MAC RAR may not be included in the MAC subPDU, for example, based on the RAPID in the MAC subheader of a MAC subPDU corresponding to one of the RAPs configured for an SI request.

There may be one or more MAC RAR formats. At least one MAC RAR format may be employed in a four-step or a two-step RA procedure.

Figure 19:
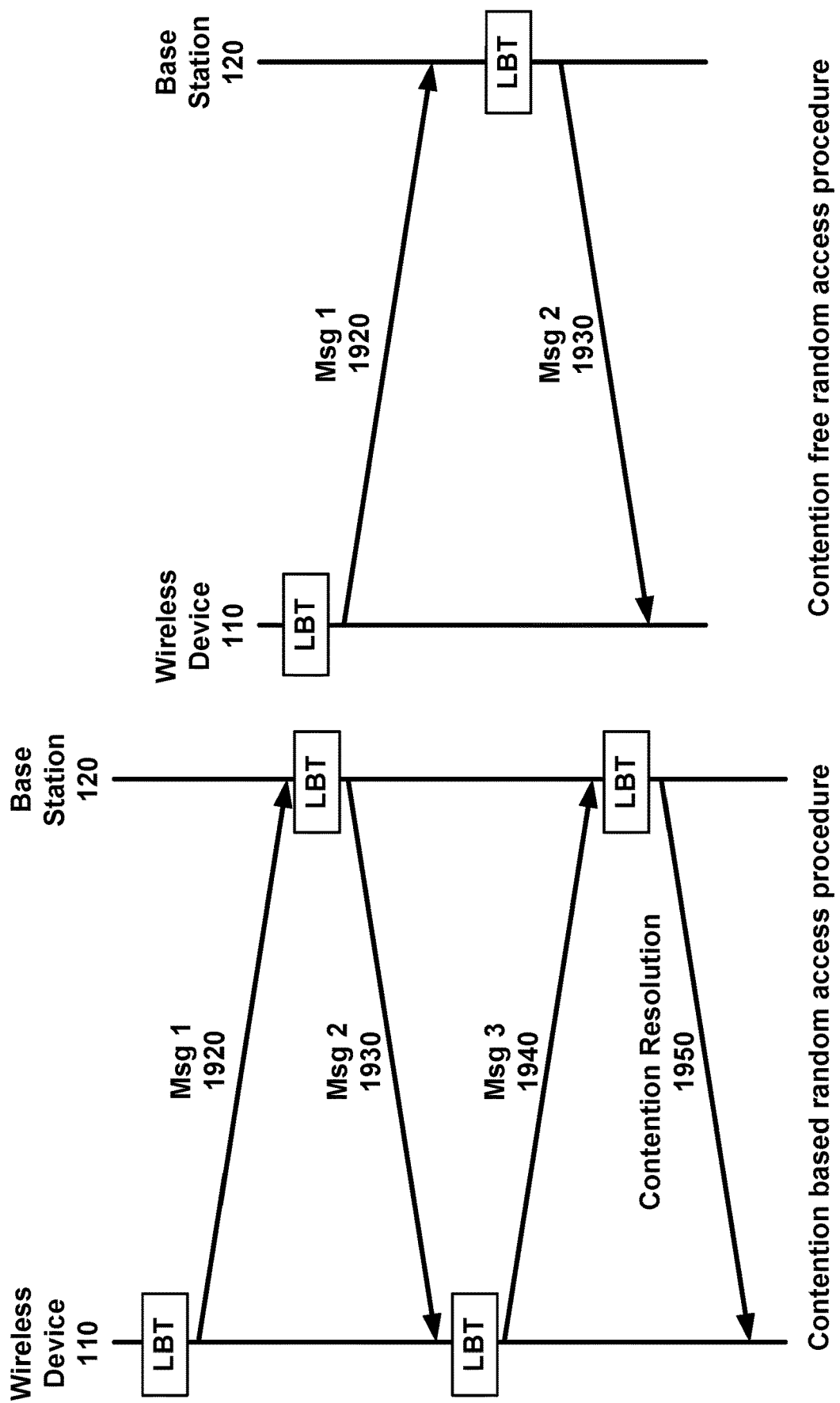
FIG. 19 shows an example of contention based and contention-free random access (RA) procedures with LBT.

FIG. 19 shows contention based and contention-free random access procedures with LBT. A successful contention based random access procedure may use Msg 1 1920, Msg 2 1930, Msg 3 1940, and contention resolution 1950 to perform the RA procedure with the wireless device 110 and base station 120. The wireless device may perform a first LBT, determine that the medium is clear, and send Msg 1 1920 to a base station 120. The base station 120 may perform a second LBT, determine that the medium is clear, and send Msg 2 1930 to the wireless device 110. The wireless device 110 may perform a third LBT, determine the medium is clear, and send Msg 3 1940 to the base station 120. The base station 120 may perform a fourth LBT, determine that the medium is clear, and sends contention resolution 1950 to the wireless device 110.

A successful contention-free based RA procedure may use Msg 1 1920 and Msg 2 1930 to perform the RA procedure with the wireless device 110 and the base station 120. The wireless device 110 may perform a first LBT, determine that the medium is clear, and send Msg 1 1920 to the base station 120. The base station 120 may perform a second LBT, determine that the medium is clear, and send Msg 2 1930 to the wireless device 110.

A failure of a RA may occur due to LBT, for example, in an unlicensed band. At least one LBT may be performed prior to DL and/or UL transmission. Msg 1 1920, Msg 2 1930, Msg 3 1940, and/or contention resolution 1950 may require at least one LBT before the transmission (e.g., at least 4 LBTs), for example, in a contention based random access procedure. Msg 1 1920 and Msg2 1930 may require at least one LBT each (e.g., at least 2 LBTs), for example, for a contention-free random access procedure. A base station and/or a wireless device may not send (e.g., transmit) a message (e.g., Msg 1 1920, Msg 2 1930, Msg 3 1940, and/or contention resolution 1950) for a RA procedure, for example, if the LBT procedure has failed prior to sending the message (e.g., CCA in LBT determines that a channel in unlicensed band is busy (e.g., occupied by another device)).

A failure of an LBT procedure may result in degrading a user experience (e.g., in terms of QoS, capacity (e.g., throughput), and/or coverage). A base station and/or a wireless device may wait until the channel becomes idle. This waiting may result in a latency problem to make a radio link connection between a base station and a wireless device. A failure of an LBT during a RA procedure may lead a long delay for a wireless device to receive an UL grant and/or TA value from a base station. This delay may result in a call drop and/or traffic congestion. A failure of an LBT procedure in a RA procedure for an SCell addition may lead a cell congestion (e.g., load imbalancing) on one or more existing cells (e.g., if an SCell may not take over traffic from the one or more existing cells in time).

An efficiency of RA procedure operating in an unlicensed band may degrade with LBT failure, which may cause a latency/delay, and/or performance degradation. Selecting two or more SSBs and performing one or more LBT procedures via one or more PRACH occasions associated with the two or more SSBs may increase a success rate of LBT procedures. A wireless device may measure a plurality of downlink reference signals (e.g., SSBs or CSI-RSs, if CSI-RS is configured by RRC). The wireless device may select two or more SSBs by comparing RSRPs of the plurality of downlink reference signals and a threshold. The threshold may comprise a RSRP threshold SSB parameter (e.g., rsrp-ThresholdSSB) if the plurality of downlink reference signals are SSBs. The threshold may comprise a RSRP threshold CSI-RS parameter (e.g., rsrp-Threshold-CSI-RS) if the plurality of downlink reference signals are CSI-RSs. The wireless device may select two or more downlink referencing signals (SSBs or CSI-RSs) having RSRPs that are higher than the threshold. The wireless device may determine one or more PRACH occasions associated with the selected two or more downlink reference signals (e.g., SSBs), for example, based on SSBs being configured with the wireless device. The wireless device may determine the one or more PRACH transmissions based on an association between PRACH occasions and SSBs that may be indicated by one or more RRC parameters (e.g., ra-ssb-OccasionMaskIndex). The wireless device may determine one or more PRACH occasions associated with the selected two or more downlink reference signals (e.g., CSI-RSs), for example, based on CSI-RSs being configured with the wireless device. The wireless device may determine the one or more PRACH transmissions based on an association between PRACH occasions and CSI-RSs that may be indicated by one or more RRC parameters (e.g., ra-OccasionList).

Figure 20:
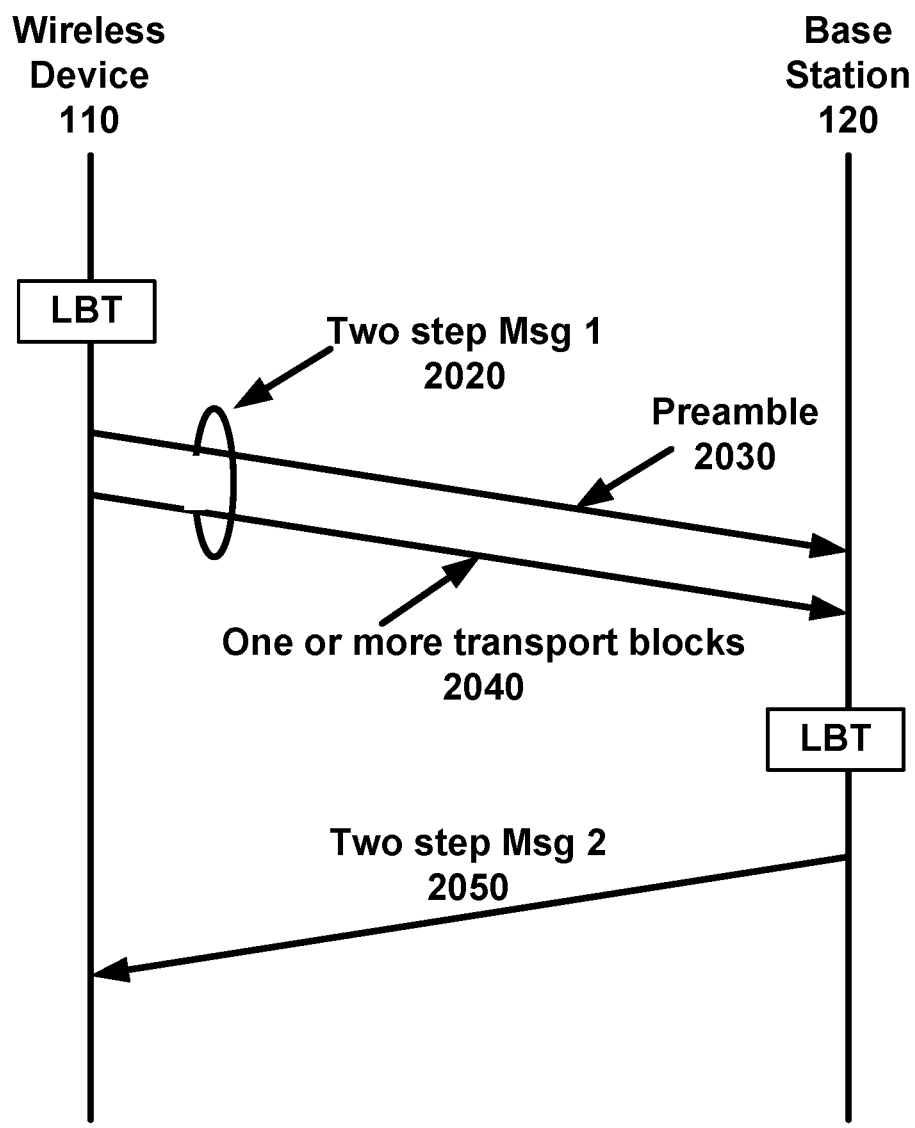
FIG. 20 shows an example of a two-step RA procedure with LBT.

FIG. 20 is an example diagram of a two-step RA procedure with LBT. A two-step RA procedure may employ LBT in an unlicensed band. A base station and/or a wireless device may not send (e.g., transmit) a message (e.g., two-step Msg 1 2020, preamble 2030, one or more TBs 2040, and/or two-step Msg 2 2050) for a RA procedure if LBT is failed prior to sending (e.g., transmitting) the message (e.g., CCA in LBT determines that a channel in unlicensed band is busy, e.g., occupied by other device). The transmissions of the preamble 2030 and for one or more TBs 2040 may have a same LBT procedure and/or different LBT procedures.

Radio resources for transmissions of a preamble 2030 and one or more TBs 2040 may be configured in a same channel (or a same subband or a same BWP or a same UL carrier), where a wireless device performs an LBT procedure for the transmissions (e.g., based on a regulation). An LBT result on the same channel (or the same subband or the same BWP or the same UL carrier) may be applied for transmissions of the preamble 2030 and for one or more TBs 2040.

Figure 21:
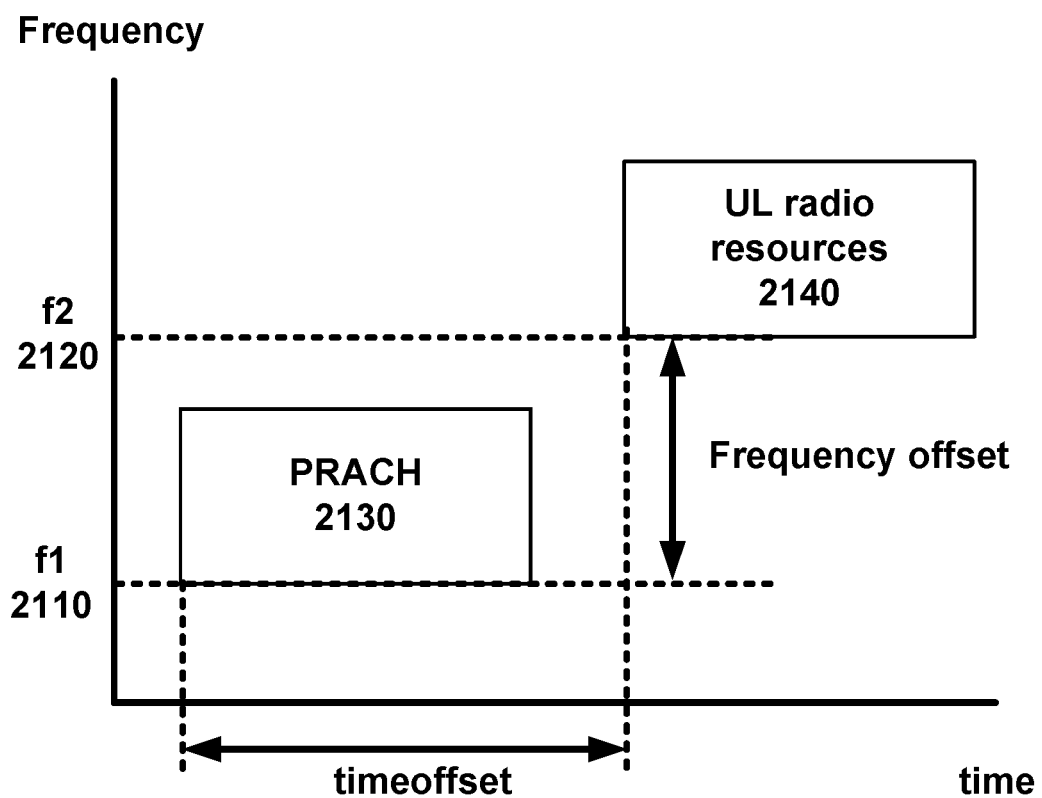
FIG. 21 shows an example of radio resource allocation for a two-step RA procedure.

FIG. 21 is an example of radio resource allocation for a two-step RA procedure. PRACH resource 2130 and UL radio resources 2140 may be time-multiplexed, for example, based on a frequency offset in FIG. 21 being zero. PRACH 2130 resource and UL radio resources 2140 may be frequency-multiplexed, for example, based on a time offset in FIG. 21 being zero. The frequency offset in FIG. 21 may be an absolute number in terms of Hz, MHz, and/or GHz, and/or a relative number (e.g., one of index from a set of frequency indices that are predefined/preconfigured). The time offset in FIG. 21 may be an absolute number in terms of micro-second, milli-second, and/or second and/or a relative number (e.g., in terms of subframe, slot, mini-slot, OFDM symbol). PRACH resource 2130 for transmission of the preamble 2130 and UL radio resources for transmission of one or more TBs 2140 may be subject to one LBT procedure if f1 2110 and f2 2120 are configured in the same channel (or a same subband or a same BWP or a same UL carrier). One LBT procedure before a PRACH resource 2130 may be performed by a wireless device (e.g., based on a regulation of unlicensed band). A quantity of LBT procedures may be determined based on a value of the time offset. One LBT procedure before a PRACH resource 2130 may be performed by a wireless device, for example, if the value of a time offset is equal to and/or less than a threshold (e.g., that may be configured and/or defined by a regulation). The one LBT procedure may determine idle and a wireless device may perform a transmission of the preamble 2030 via PRACH resource 2130 followed by a second transmission of one or more TBs 2040 via the UL radio resources 2140 with no LBT procedure (the transmission order may be switched if the UL radio resources 2140 is allocated before PRACH resource 2130 in time domain). PRACH and UL radio resources may be allocated closely enough in time domain.

A wireless device may perform a first LBT procedure before a PRACH resource 2130 and perform a second LBT procedure before U1 radio resources 2140, for example, based on the value of time offset being larger than the threshold A bandwidth of BWP and/or UL carrier may be larger than a first value (e.g., 20 MHz). f1 2110 and f2 2120 may be configured in the bandwidth. A wireless device may perform an LBT procedure and apply a result (e.g., idle or busy) of the LBT procedure to the transmission of the preamble 2030 and UL radio resources for transmission of one or more TBs 2040. A wireless device may perform the transmissions of the preamble 2030 and for one or more TBs 2040. If the channel is busy, a wireless device may not perform the transmissions of the preamble 2030 and for one or more TBs 2040, for example, based on the channel being idle.

A bandwidth of BWP and/or UL carrier may be less than a first value (e.g., 20 MHz). f1 2110 and f2 2120 may be configured in the bandwidth. A wireless device may perform an LBT procedure and apply a result (e.g., idle or busy) of the LBT procedure to the transmission of the preamble 2030 and UL radio resources for transmission of one or more TBs 2040. A wireless device may perform a first transmission of the preamble 2030 followed by a second transmission of one or more TBs 2040, for example, based on if the channel being idle. A wireless device may not perform the transmissions of the preamble 2030 and for one or more TBs 2040, for example, based on the channel being busy.

Radio resources for transmissions of the preamble 2030 and one or more TBs 2040 may be configured in different channels, different subbands, different BWPs, and/or different UL carriers (e.g., one in NUL and the other one in SUL) that may require separate LBT procedures. A wireless device may perform a LBT procedure per one or more channels, per one or more subbands, per one or more BWPs, and/or per one or more UL carriers.

Figure 22:
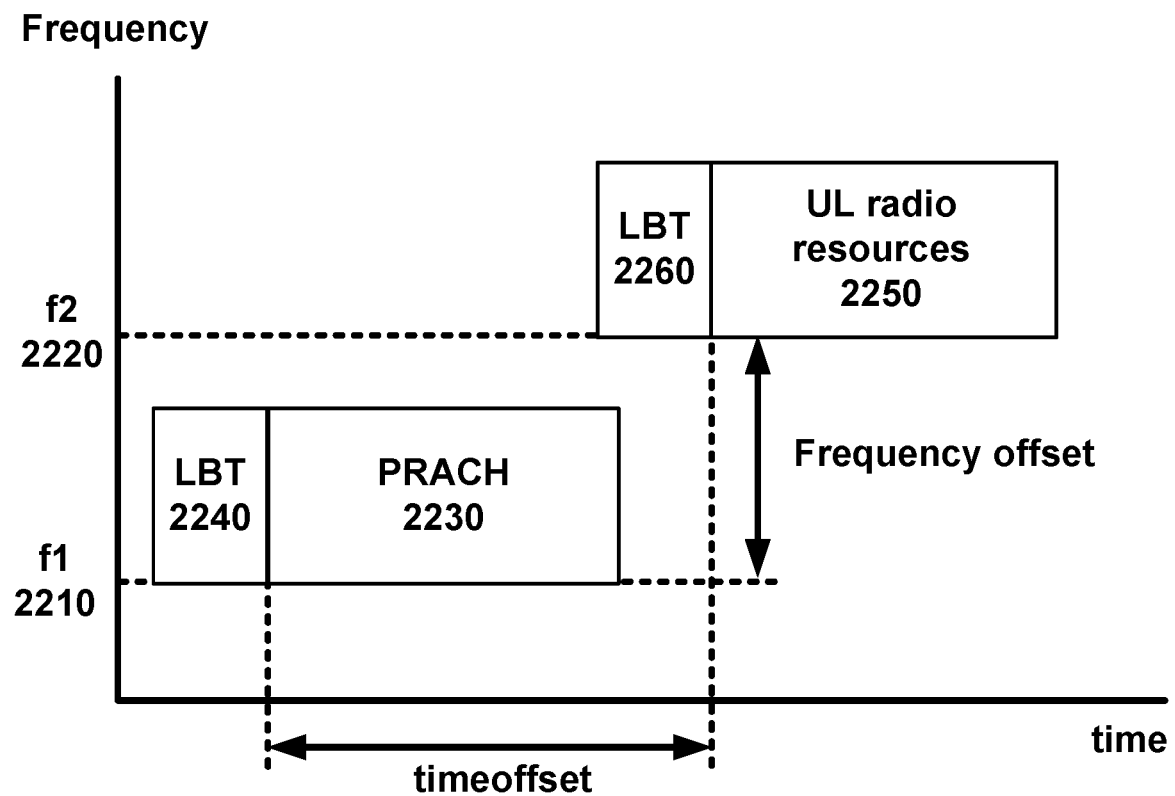
FIG. 22 shows an example of one or more LBT procedures for a two-step RA procedure.

FIG. 22 shows an example of one or more LBT procedures performed for a two-step RA procedure UL radio resources 2250 may be allocated before or aligned with PRACH resources 2230 in time. A wireless device may perform a first LBT procedure (e.g., LBT 2240 in FIG. 22) before a first transmission of preamble 2030 (e.g., via PRACH resources 2230) and perform a second LBT procedure (e.g., LBT 2260 in FIG. 22) before a second transmission of one or more TBs 2040 (e.g., via UL radio resources 2250). A wireless device may perform none of, one of, or both of the first transmission and the second transmission, depending on results of the first LBT procedure and second LBT procedure. Separate LBTs before a PRACH message and/or data may provide benefits, such as: earlier transmission of the first transmission and/or second transmission by a wireless device, earlier transmission of a preamble than if a larger LBT were used, and increased probability that a transmission will be successful.

The first transmission may be performed if a first result of the first LBT procedure is idle. The second transmission may be independent of the first result. The second transmission may be performed if a second result of the second LBT procedure is idle. A wireless device may send (e.g., transmit) the preamble 2030, for example, in response to the first LBT procedure being idle. The wireless device may not be able to send (e.g., transmit) one or more TBs 2040 in response to the second LBT procedure being busy. A wireless device may not send (e.g., transmit) the preamble 2030 in response to the first LBT procedure being busy. The wireless device may send (e.g., transmit) one or more TBs 2040 in response to the second LBT procedure being idle. In a two-step RA procedure, one or more TBs may comprise an identifier of the wireless device, for example, so that a base station may identify and/or indicate which wireless device sent (e.g., transmitted) the one or more TBs. The identity may be configured by the base station and/or may be at least a portion of wireless device-specific information (e.g., resume ID, DMRS sequence/index, IMSI, etc.). A base station may identify and/or indicate the wireless device based on the identity in the one or more TBs, for example, based on a wireless device sending (e.g., transmitting) one or more TBs with no preamble 2030 (e.g., if a channel, e.g. PRACH 2230 is busy).

Separate LBT procedures for transmissions of a preamble and one or more TBs may be performed, for example, based on a two-step RA procedure configured in an unlicensed band. A wireless device may be configured (e.g., by a base station) with separate LBT procedures for a wideband operation (e.g., based on a bandwidth greater than 20 MHz). A wireless device may be configured (e.g., by a base station) with a wideband comprising one or more subbands and/or one or more BWPs, for example, based on wideband operation. Some of the one or more subbands may overlap in the frequency domain. Some of the one or more subbands may not overlap in the frequency domain. Some of the one or more BWPs overlap in the frequency domain. Some of the one or more BWPs may not overlap in the frequency domain. Separate LBT procedures may be used for transmissions via the two radio resources, for example, based on a wideband operation and/or two radio resources being allocated with a space larger than a threshold (e.g., 20 MHz). A wideband may comprise one or more subbands, and two radio resources may be allocated in different subbands. A first transmission scheduled in a first subband may use a first LBT procedure, and a second transmission scheduled in a second subband may use a second LBT procedure. The first LBT procedure and the second LBT procedure may be independent of each other.

UL radio resources for transmission of one or more TBs 2040 may be subject to a first LBT procedure (e.g., LBT 2260) and be independent of a second LBT procedure (e.g., LBT 2240) for transmission of the preamble 2030. PRACH resources 2230 for transmission of the preamble 2030 may be subject to a second LBT procedure (e.g., LBT 2260) and be independent of a first LBT procedure (e.g., LBT 2260) for transmission of one or more TBs 2040. A wireless device may perform separate LBT procedures for a first transmissions of the preamble 2030 and a second transmission of one or more TBs 2040, for example, based on f1 2210 and f2 2220 being configured in different channels, different subbands, different BWPs, and/or different UL carriers.

Figure 23A:
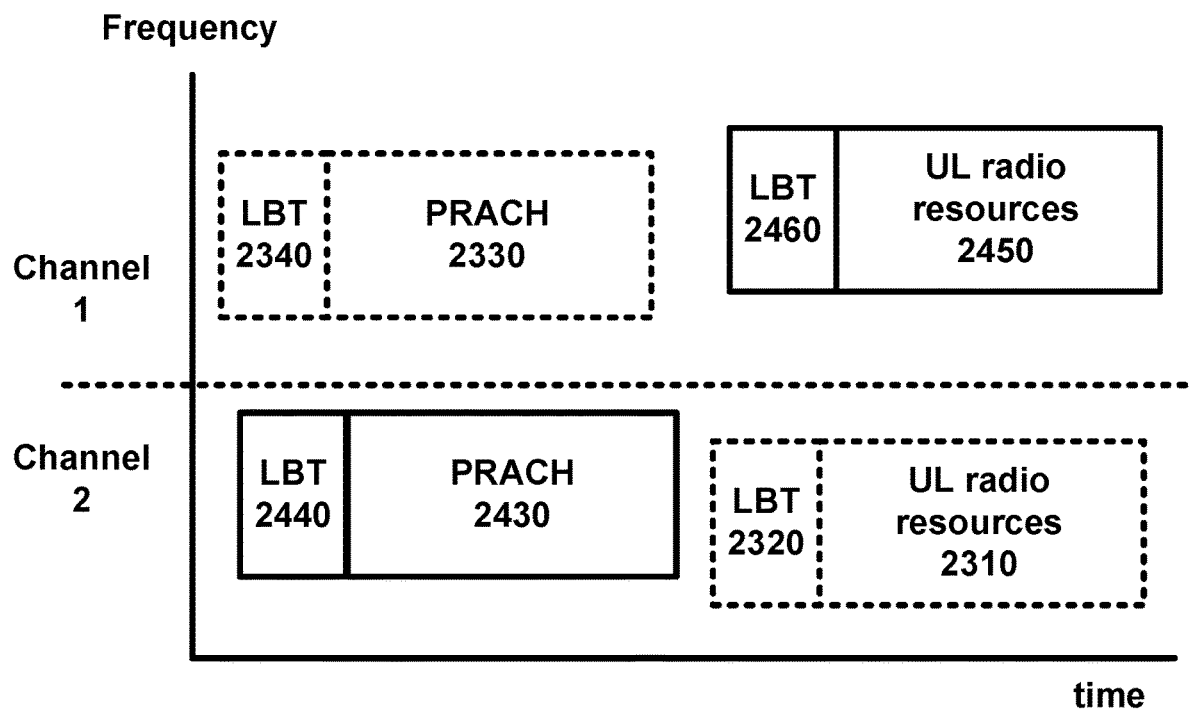
FIGS. 23A and 23B show examples of one or more LBT procedures for a two-step RA procedure in an unlicensed band.
Figure 23B:
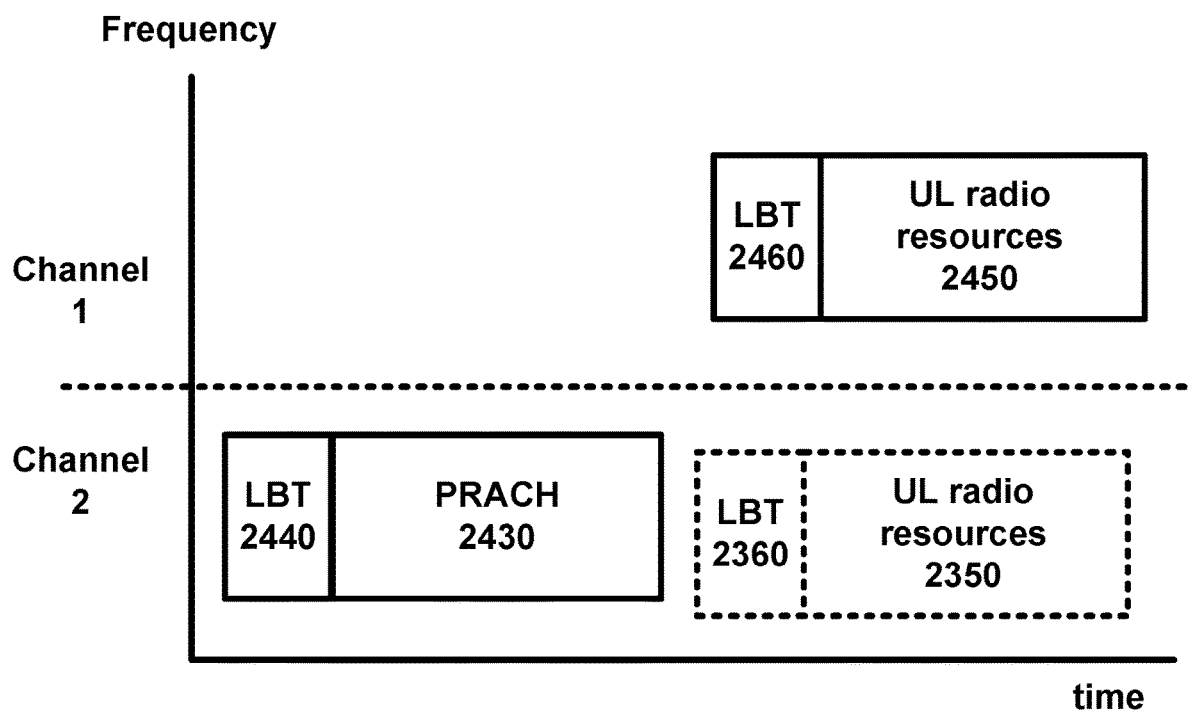

FIGS. 23A and 23B are examples of one or more LBT procedures performed for a two-step RA procedure in an unlicensed band. The resource allocation and the separate LBT procedures in FIG. 22 may be resulted from FIGS. 23A and/or 23B. A wireless device may be configured (e.g., by a base station) with one or more PRACH resources and one or more UL radio resources in different channels (BWPs and/or UL carriers). The wireless device may one or more first opportunities to send (e.g., transmit) preambles and one or more second opportunities to send (e.g., transmit) one or more TBs. A wireless device may have two opportunities via random access resources (e.g., PRACH resource 2330 and PRACH resource 2430) for preamble transmission, for example, as shown in FIG. 23A. A wireless device may select one of two opportunities, for example, based on LBT results. A wireless device may perform a first LBT procedure (e.g., LBT 2340) and a second LBT procedure (e.g., LBT 2440 as shown in FIG. 23A). A wireless device may select one of PRACH resources associated either a first LBT procedure or a second LBT procedure (e.g., based on random selection), for example, based on the results of the first and second LBT procedures being idle. A wireless device may select a PRACH resource associated with the LBT result being idle for preamble transmission, for example, based on one of LBT result being idle and the other of LBT result being busy. A wireless device may not send (e.g., transmit) a preamble and may perform one or more LBT procedures for one or more TB transmissions, for example, based on the first and second LBT procedure results being busy.

A wireless device may have one or more opportunities for transmission of one or more TBs via UL radio resources (e.g., in a similar way that a wireless device has for preamble transmission above). The one or more opportunities for transmission of one or more TBs may be independent of one or more opportunities for transmission of preamble. The wireless device may perform one or more LBT procedures to gain access to a channel to send (e.g., transmit) one or more TBs, for example, based on a wireless device not sending (e.g., transmitting) a preamble due to a result (e.g., busy) of LBT procedure. A wireless device may perform a first LBT procedure (e.g., LBT 2320) followed by a first transmission opportunity of one or more TBs via first UL radio resources 2310 and a second LBT procedure (e.g., LBT 2460 in FIG. 23A) followed by a second transmission opportunity of one or more TBs via second UL radio resources 2450, as shown in FIG. 23A. A wireless device may select one of the opportunities, for example, depending on LBT results. A wireless device may send (e.g., transmit) one or more TBs via UL radio resources 2450, for example, based on LBT 2320 being busy and/or LTB 2460 being idle as shown in FIG. 23A. A wireless device may not send (e.g., transmit) any preamble, for example, based on one or more LBT procedures (e.g., LBT 2440 and LBT 2340 in FIG. 23A) to gain access for sending (e.g., transmitting) a preamble result in busy. A wireless device may perform one or more second LBT procedures (e.g., LBT 2320 and LBT 2460 in FIG. 23A) for transmission of one or more TBs.

The wireless device may receive, from a base station, one or more control message (e.g., RRC messages and/or PDCCH messages) indicating one or more associations between PRACH resources and UL radio resources, for example, before a wireless device initiates a two-step RA procedure. The associations may be one-to-one, multi-to-one, one-to-multi, and/or multi-to-multi between one or more PRACHs resources and one or more UL radio resources. A wireless device may determine which UL radio resources and/or which PRACH resources to select, for example, based on the associations. The associations may indicate one-to-multi association from PRACH resource 2430 to UL radio resources 2450 and UL radio resources 2310, for example, as shown in FIG. 23A. The associations may indicate one-to-one association from PRACH resources 2330 to UL radio resources 2450. A wireless device may perform one or more LBT procedures (depending on a regulation and/or resource allocation whether the resources are in the same channel) for transmission of one or more TBs depending on a selection of PRACH resources. A wireless device may perform two LBT procedures (LBT 2440 and LBT 2340), for example, as shown in FIG. 23A. A wireless device may send (e.g., transmit) a preamble via PRACH resources 2430, for example, based on LBT 2440 being idle but LBT 2340 being busy. The wireless device may determine (e.g., select) one or more candidate UL radio resources based on a configured association of PRACH resources 2430, which may be one-to-multi from PRACH resources 2430 to UL radio resources 2450 and UL radio resources 2310. The wireless device may perform LBT 2320 and LBT 2460 based on the configured association. A wireless device may send (e.g., transmit) one or more TBs, depending on the results of the LBT procedures. FIG. 23B is an example of a two-step RA procedure. UL radio resources are associated with one PRACH resource. An association may be configured (e.g., by a base station) from PRACH resource 2430 to UL radio resource 2450 and UL radio resources 2350.

The PRACH resource and/or UL radio resources in FIGS. 21, 22, 23A, and/or 23B may be associated with at least one reference signal configuration (e.g., SSB, CSI-RS, DM-RS). A wireless device may receive (e.g., from a base station) at least one control message to indicate such an association. A configuration of each reference signal may have an association with at least one PRACH resource, that may be configured by RRC message and/or PDCCH signals, for example, based on the base station sending (e.g., transmitting) a plurality of reference signals. In one or more downlink channels, there may be a plurality of PRACH resources and a plurality of UL radio resources associated with the plurality of PRACH resources.

A failure of a LBT procedure may result in degrading a user experience (e.g., in terms of QoS, capacity (throughput), and/or coverage). A base station and/or a wireless device may wait until the channel becomes idle. This wait may result in a latency problem to make a radio link connection between a base station and a wireless device. A failure of an LBT procedure during a RA procedure may lead a long delay for a wireless device to receive an UL grant and/or TA value from a base station. This failure may result in a call drop and/or traffic congestion. A failure of an LBT in a RA procedure for an SCell addition may lead to cell congestion (e.g., load imbalancing) on one or more existing cells, for example, because an SCell may not take over traffic from the one or more existing cells in time.

A wireless device may detect/attempt to detect DCI (e.g., DCI format 1_0) during a window (e.g., ra-responseWindow), for example, based on or in response to a transmission received via a channel (e.g., access channel, PRACH, etc.). The DCI may be CRC scrambled by a corresponding RA-RNTI. The wireless device may determine a first (e.g., earliest) CORESET, for example, based on at least one symbol after the last symbol of the PRACH. The wireless device may receive a PDCCH for Type1-PDCCH CSS set in the first (e.g., earliest) CORESET. The wireless device may start the window at a first symbol of the first (e.g., earliest) CORESET, for example, based on or in response to determining the first (e.g., earliest) CORESET. The wireless device may determine a symbol duration for determining the first (e.g., earliest) CORESET, for example, based on a SCS for the Type1-PDCCH CSS set.

The base station may provide (e.g., send/transmit) the wireless device with a length of the window by a higher layer parameter (e.g., ra-ResponseWindow). The length of the window may be in quantity/number of slots. The wireless device may determine a slot duration for the length of the window, for example, based on the SCS for the Type1-PDCCH CSS set.

The wireless device may detect the DCI (e.g., DCI format 1_0) within the window. The DCI may be CRC scrambled by the corresponding RA-RNTI. The wireless device may detect a transport block in a PDSCH within the window. The DCI may schedule the transport block in the PDSCH., based on or in response to detecting the transport block. A lower layer (e.g., PHY, MAC) of the wireless device may pass the transport block to a higher layer of the wireless device (e.g., MAC, RRC). The wireless device (e.g., the higher layer of the wireless device) may parse the transport block for a random access preamble identity (RAPID) associated with the PRACH transmission. The wireless device (e.g., the higher layer of the wireless device) may determine and/or identify the RAPID in at least one random access response (RAR) message of the transport block. The higher layer may indicate an uplink grant (e.g., RAR uplink grant) to the lower layer of the wireless device, for example, based on or in response to the determining/identifying. The higher layer of the wireless device may indicate to the lower layer (e.g., physical layer) of the wireless device to transmit a second PRACH, for example, based on or in response to not detecting the DCI (e.g., DCI format 1_0) within the window. The higher layer of the wireless device may indicate to the lower layer (e.g., physical layer) of the wireless device to transmit a second PRACH, for example, based on or in response to not correctly receiving the transport block in the PDSCH within the window. The higher layer of the wireless device may indicate to the lower layer (e.g., physical layer) of the wireless device to transmit a second PRACH, for example, based on or in response to not identifying the RAPID associated with the PRACH transmission from the wireless device.

The wireless device may send (e.g., transmit) the second PRACH within a first offset (e.g., 1 msec or any time duration), for example based on or in response to the higher layer indicating to the lower layer of the wireless device to send (e.g., transmit) the second PRACH. The first offset may be after the last symbol of the window. The wireless device may send (e.g., transmit) the second PRACH within the first offset after the last symbol of the PDSCH, for example, based on or in response to the higher layer indicating to the lower layer to send (e.g., transmit) the second PRACH. The first offset may be based on the wireless device's capability for a PDSCH reception. The wireless device may detect the DCI. The DCI may be CRC scrambled by the corresponding RA-RNTI. The wireless device may detect (e.g., receive) the transport block in the PDSCH.

The wireless device may initiate a PRACH transmission, for example, based on or in response to receiving a PDCCH order from the base station. The RAR UL grant may schedule a PUSCH transmission (e.g., Msg3) from the wireless device. The RAR UL grant may comprise at least one of: a frequency hopping flag (e.g., 1 bit), a frequency resource allocation for the PUSCH transmission (e.g., 14 bit), a time resource allocation for the PUSCH transmission (e.g., 4 bit), MCS (e.g., 4 bit), a TPC command for the PUSCH transmission (e.g., 3 bit), and/or a CSI request (e.g., 1 bit). The wireless device may determine the MCS of the PUSCH transmission, for example, based on the MCS in the RAR UL grant. The RAR UL grant in the at least one RAR message may schedule a PUSCH transmission (e.g., Msg3). The wireless device may transmit a second transport block in the PUSCH using a first redundancy version (e.g., 0).

The base station may reschedule a sending/resending (e.g., transmission/retransmission) of the second transport block with a second DCI (e.g., DCI format 0_0). The second DCI may be CRC scrambled by a TC-RNTI. The TC-RNTI may be provided in the at least one RAR message. The wireless device may send (e.g., transmit) the PUSCH, scheduled by the RAR UL grant, without repetitions.

The wireless device may receive the PDSCH with the at least one RAR message for the PRACH transmission. The at least one RAR message may end in a first slot (e.g., slot n).

The wireless device may send (e.g., transmit) the PUSCH in a second slot, for example, based on or in response to the at least one RAR message ending in a first slot. The second slot may be based on the first slot. The second slot may be equal to the first slot plus an offset. The offset may be based on a wireless device's capability, PDSCH processing time, and/or PUSCH preparation time.

The base station may not provide the wireless device with a C-RNTI. The wireless device may be in an RRC-IDLE mode. The wireless device may be in RRC-INACTIVE mode. The wireless device may detect/attempt to detect a third DCI (e.g., DCI format 1_0), for example, based on or in response to not being provided with the C-RNTI (e.g., if the wireless device transmits the PUSCH scheduled by the RAR UL grant). The third DCI may be CRC scrambled by the TC-RNTI. The third DCI may schedule a second PDSCH that may comprise a wireless device contention resolution identity.

A wireless device may receive one or more configuration parameters from a base station. The one or more configuration parameters may be for a two-step random access (RA) procedure of a cell (e.g., PCell, SCell). For example, the one or more configuration parameters may indicate at least one of following: one or more RACH occasions (e.g., time-frequency resources), one or more random access preambles (RAPs) (or RAP groups), preamble format, SSB information (e.g., a number of transmitting SSBs, downlink resource allocation of SSB transmissions, transmission power of SSB transmission, and/or other information), one or more uplink radio resources (in terms of time, frequency, code/sequence/signature), and/or power control parameters (e.g., cell and/or wireless device specific power adjustments used for calculating received target power, inter-cell interference control parameter that may be used as a scaling factor of pathloss measurement, reference signal power to calculate for pathloss measurement, and/or one or more margins).

The two-step RA procedure may comprise a first uplink (UL) transmission of a RAP (e.g., two-step Msg1) of the one or more RAPs and/or a second UL transmission of one or more transport blocks (e.g., FDM-ed, TDM-ed). The base station may send (e.g., transmit) a two-step Msg2 to the wireless device, for example, based on or in response to receiving the RAP and/or the one or more transport blocks. The two-step Msg2 may comprise a response, such as a random access response (RAR). The RAR may correspond to the first UL transmission and/or the second UL transmission. The two-step Msg2 may comprise at least one of following: a timing advance command indicating the TA value, a power control command, an RAR UL grant (e.g., radio resource assignment, and/or MCS), a wireless device ID for contention resolution (e.g., a contention resolution message), an RNTI (e.g., C-RNTI or TC-RNTI), and/or other information. The two-step Msg2 (e.g., an RAR) may comprise a preamble identifier corresponding to the RAP, a positive (ACK) or negative acknowledgement (NACK) of a reception of the one or more transport blocks, and/or an indication of a successful decoding of the one or more transport blocks. The wireless device may send (e.g., transmit) one or more second transport blocks, for example, based on or in response to the two-step Msg2.

The wireless device may send (e.g., transmit) the RAP via at least one RACH resource of the one or more RACH occasions indicated by the one or more configuration parameters in the two-step random access procedure. The wireless device may send (e.g., transmit) the one or more transport blocks via at least one UL radio resource of the one or more uplink radio resources indicated by the one or more configuration parameters. The one or more configuration parameters may indicate one or more associations between the one or more uplink radio resources and/or the one or more RAPs (or RAP groups). The one or more configuration parameters may indicate one or more associations between the one or more uplink radio resources and/or the one or more RACH occasions. The one or more associations may be one-to-one, many-to-one, one-to-many, and/or many-to-many between one or more RAPs and/or one or more uplink radio resources. The one or more associations may be one-to-one, many-to-one, one-to-many, and/or many-to-many between one or more RACH occasions and/or one or more uplink radio resources.

A wireless device may determine which UL radio resource and/or which PRACH resource or RAP should/needs to be selected, for example, based on the associations. The wireless device may determine at least one UL radio resource of the one or more uplink radio resources, for example, based on the selection of the RAP and the one or more associations (e.g., if the wireless device selects a two-step RA procedure). The wireless device may send (e.g., transmit) the one or more transport blocks via the at least one UL radio resource for RA procedure (e.g., the two-step RA procedure), for example, based on or in response to determining at least one UL radio resource of the one or more uplink radio resources.

The first transmission of the RAP may overlap in time and/or in frequency (e.g., partially or entirely) with the second transmission of the one or more transport blocks. The first transmission of the RAP may be multiplexed with the second transmission of the one or more transport blocks in the time and/or frequency domain.

A wireless device may perform a listen-before-talk (LBT) procedure on an uplink channel. The wireless device may perform an uplink transmission via the uplink channel, for example, based on or in response to a success of the LBT procedure. The success of the LBT procedure may comprise the wireless device determining that the uplink channel is idle/unoccupied (e.g., not being occupied by another wireless device). The wireless device may not perform an uplink transmission (e.g., two-step Msg 1, preamble, one or more transport blocks) via the uplink channel, for example, based on or in response to a failure of the LBT procedure. Failure of the LBT procedure may comprise the wireless device determining that the uplink channel (e.g., PRACH, PUSCH, PUCCH) for the uplink transmission is busy/occupied (e.g., occupied by another wireless device).

The wireless device may perform a first LBT procedure for the first UL transmission of the RAP and/or a second LBT procedure for the second UL transmission. The first LBT procedure and/or the second LBT procedure may be the same (e.g., simultaneous, same frequency, same time, etc.). Alternatively, the first LBT procedure and/or the second LBT procedure may be different (e.g., different times, frequency, etc.). The wireless device may determine a success of the first LBT procedure for the RAP. The wireless device may perform the first UL transmission of the RAP via the RACH resource, for example, based on or in response to the success of the first LBT procedure. The wireless device may not perform the second LBT procedure for the second UL transmission of the one or more transport blocks, for example, based on or in response to the success of the first LBT procedure. The wireless device may perform the second UL transmission via the at least one UL radio resource if the first LBT procedure is successful, for example, based on or in response to the not performing the second LBT. The PRACH and/or UL radio resources may be allocated close in the time domain. The wireless device may perform the first and the second UL transmissions back-to-back, for example, based on or in response to the PRACH and/or UL radio resources being allocated close in time.

The wireless device may determine a success of the first LBT procedure (e.g., idle/unoccupied) for the RAP. The wireless device may perform the first UL transmission of the RAP via the RACH resource, for example, based on or in response to the success of the first LBT procedure. The wireless device may perform the second UL transmission of the one or more transport blocks via the at least one UL radio resource, for example, based on or in response to the success of the first LBT procedure.

The wireless device may determine a failure of the first LBT procedure (e.g., busy/occupied) for the RAP. The wireless device may not perform the first UL transmission of the RAP via the RACH resource, for example, based on or in response to the failure of the first LBT procedure. The wireless device may not perform the second UL transmission of the one or more transport blocks via the at least one UL radio resource, for example, based on or in response to the failure of the first LBT procedure.

A wireless device may receive one or more messages (e.g., RRC connection reconfiguration message, RRC connection reestablishment message, and/or RRC connection setup message) from a base station. The one or more messages may comprise one or more configuration parameters for a cell (e.g., PCell, PSCell, SCell). The one or more configuration parameters may comprise bandwidth part (BWP) configuration parameters for a plurality of downlink BWPs of the cell and/or a plurality of uplink BWPs of the cell, and/or any other resource configurations for a plurality of resources of the cell.

The wireless device may operate in a paired spectrum (e.g., frequency division duplex (FDD)). The one or more configuration parameters may comprise downlink BWP specific indices for the plurality of downlink BWPs and/or uplink BWP specific indices for the plurality of uplink BWPs. Each downlink BWP may be indicated/identified by a respective downlink BWP specific index (e.g., provided by a higher layer parameter BWP-ID). Each uplink BWP may be indicated/identified by a respective uplink BWP specific index (e.g., provided by a higher layer parameter BWP-ID).

At a time slot, the wireless device may operate on a first downlink BWP and/or a second uplink BWP. The wireless device may be active on the first downlink BWP and/or the second uplink BWP at the time slot, for example, based on or in response to the operating on the first downlink BWP and/or the second uplink BWP. The first downlink BWP and the second uplink BWP may be an active downlink BWP and an active uplink BWP of the cell, respectively (e.g., during the time slot).

The wireless device may initiate a random access procedure (e.g., contention-based random access procedure, contention-free random access procedure), for example, if the first downlink BWP is the active downlink BWP and/or the second uplink BWP is the active uplink BWP of the cell (e.g., during the time slot). The wireless device may perform the random access procedure on the first downlink BWP and/or the second uplink BWP. The random access procedure may be started (e.g., initiated) for an initial access from RRC_IDLE, an RRC Connection Re-establishment procedure, a handover, a DL or UL data arrival during RRC_CONNECTED if UL synchronization status is non-synchronized, a transition from RRC_INACTIVE, a time alignment establishment at an SCell addition, a beam failure recovery, and/or a request for other system information (SI).

The one or more configuration parameters may comprise one or more PRACH resources on the second uplink BWP. The one or more configuration parameters may comprise one or more RSs (e.g., SS/PBCH blocks, CSI-RS). The one or more configuration parameters may comprise one or more associations (or correspondence) between the one or more RSs and the one or more PRACH resources (e.g., the association may be one-to-one, one-to-many, many-to-one, etc.). The association may be provided by configuration parameters (e.g., RACH-ConfigDedicated, Candidate-BeamRSList, RACH-ConfigCommon, ra-ssb-Occasion-MaskIndex, ra-OccasionList etc.).

Performing the random access procedure on the second uplink BWP may comprise performing a random access resource selection. Performing the random access resource selection may comprise selecting a first RS from a plurality of RSs. The first RS may be a first SS/PBCH block and/or a first CSI-RS. The first RS may be associated with (or correspond to) a PRACH resource of a plurality PRACH resources configured on the second uplink BWP. The PRACH resource may comprise at least one preamble (e.g., associated with PREAMBLE_INDEX) and/or at least one PRACH occasion (e.g., time, frequency, code) on the second uplink BWP.

The wireless device may perform a random access preamble transmission for example, based on or in response to performing the random access resource selection. The wireless device may send (e.g., transmit), in a first slot, the at least one preamble via the at least one PRACH resource of the second uplink BWP for the random access procedure. The wireless device may start, from a second slot, a configured response window (e.g., ra-responseWindow), for example, based on or in response to transmitting the at least one preamble in the first slot. The configured response window may be configured by the one or more configuration parameters (e.g., RACH-ConfigCommon, BeamFailureRecoveryConfig). The wireless device may monitor (e.g., listen) for a random access response (RAR) corresponding to the at least one preamble, for example, if the configured response window is running. Monitoring for the random access response may comprise monitoring at least one PDCCH in the second downlink BWP of the cell (e.g., SpCell) for DCI (e.g., a downlink assignment, an uplink grant, etc.). The DCI may be CRC scrambled by a C-RNTI or MCS-C-RNTI of the wireless device. The random access procedure may be initiated for a beam failure recovery of the cell. The DCI may be indicated/identified using a CRC scrambled by an RA-RNTI. An offset between the first slot and the second slot may be fixed (e.g., 1 slot, 2 slots, 3 slots, 4 slots, etc.) or variable. The second slot may be at a first PDCCH occasion of the second downlink BWP from the conclusion (e.g., end) of transmitting the at least one preamble.

The random access procedure (e.g., contention-free random access procedure) for the beam failure recovery may be successfully completed, for example, based on or in response to receiving the DCI (e.g., scrambled by a C-RNTI or an MCS-C-RNTI) on the at least one PDCCH in the second downlink BWP of the cell within the configured response window. The random access response may comprise a first MAC subPDU with a random access preamble identifier. The random access preamble identifier may be associated with (e.g., correspond to) the at least one preamble (e.g., PREAMBLE_INDEX).

A reception of the random access response may be successfully completed, for example, if the random access procedure is not initiated for a beam failure recovery (e.g., contention-free random access procedure for the beam failure recovery). A reception of the random access response may be successfully completed, for example, based on or in response to receiving the DCI (e.g., scrambled by RA-RNTI) in the at least one PDCCH of the second downlink BWP within the configured response window and/or the random access preamble identifier being associated with (e.g., correspond to) the at least one preamble.

The random access procedure (e.g., contention-free random access procedure) may be successfully completed, for example, if the random access procedure is not initiated for a beam failure recovery and/or a reception of the random access response is successfully completed. The random access procedure (e.g., contention-free random access procedure) may be successfully completed, for example, based on or in response to receiving the DCI (e.g., scrambled by an RA-RNTI) on the at least one PDCCH in the second downlink BWP of the cell within the configured response window.

The configured response window may expire. The wireless device may not receive the DCI within the configured response window. The wireless device may determine (e.g., consider) a reception of the random access response unsuccessful, for example, based on or in response to the configured response window expiring and/or the wireless device not receiving the DCI (e.g., scrambled by a C-RNTI). The wireless device may determine (e.g., consider) a reception of the random access response to be unsuccessful, for example, based on or in response to the configured response window expiring and/or a random access response comprising the random access preamble identifier being associated with (e.g., correspond to) the at least one preamble. The wireless device may increment a preamble transmission counter variable (e.g., PREAMBLE_TRANSMISSION_COUNTER) by one, for example, based on a determination that reception of the random access response unsuccessful. The preamble transmission counter variable may be equal to or greater than a preamble maximum transmission parameter (e.g., RRC parameter preambleTransMax), for example, based on or in response to incrementing the preamble transmission counter variable.

The cell may be an SpCell (e.g., PCell, PSCell). The wireless device may send (e.g., transmit) the at least one preamble on the SpCell, for example, based on or in response to the cell being the SpCell. The wireless device may indicate/identify a problem of the random access procedure to one or more upper layers (e.g., RRC), for example, based on or in response to the preamble transmission counter variable being equal to or greater than the preamble maximum transmission parameter.

The cell may be an SCell. The wireless device may send (e.g., transmit) the at least one preamble on the SCell, for example, based on or in response to the cell being the SCell. The wireless device may complete the random access procedure unsuccessfully, for example, based on or in response to the preamble transmission counter variable being equal to or greater than the preamble maximum transmission parameter. The upper layers may trigger a radio link failure that may lead to prolonged random access delay and/or degraded user experience, for example, based on or in response to indicating the problem of the random access procedure to the one or more upper layers (e.g., RRC).

The preamble transmission counter variable may be less than the preamble maximum transmission parameter plus one (or any other value/quantity/number), for example, based on or in response to incrementing the preamble transmission counter variable. The wireless device may determine/consider the random access procedure to be incomplete, for example, based on or in response to the preamble transmission counter variable being less than the preamble maximum transmission parameter plus one (or any other value/quantity/number). The wireless device may select a random back-off time, for example, based on or in response to the determining/considering the random access procedure to be incomplete. The random back-off time may be selected according to a uniform distribution between zero and a preamble back-off variable in the RAR. The wireless device may start a back-off timer with a value indicated by the random back-off time, for example, based on or in response to selecting the random back-off time.

The wireless device may perform a second random access resource selection, for example, at a time that the back-off timer is running. The wireless device may select a second RS from a plurality of RSs. The second RS may be a second SS/PBCH block and/or a second CSI-RS. The second RS may be associated with (e.g., correspond to) a second PRACH resource of the one or more PRACH resources configured on the second uplink BWP, for example, based on the one or more associations. The second PRACH resource may comprise at least one second preamble and/or at least one second PRACH occasion (e.g., time, frequency, code) on the second uplink BWP. The wireless device may perform a second random access preamble transmission, for example, if the wireless device performs the second random access resource selection. The wireless device may send (e.g., transmit), in a third slot, the at least one second preamble via the at least one second PRACH resource of the second uplink BWP for the random access procedure, for example, via the second random access preamble transmission.

A wireless device may start (e.g., initiate) a contention resolution timer (e.g., ra-ContentionResolutionTimer) or fallback to random access resource selection, for example, if the Listen-Before-Talk (LBT) procedures on the uplink resources are unsuccessful. The uplink resources may be used to send (e.g., transmit) one or more transport blocks (e.g., Msg3). The wireless device may monitor multiple random access responses, each associated with an uplink grant. The wireless device may consume more power and network traffic may be increased as a result of the multiple random access responses.

A base station may communicate/indicate (e.g., identify) one or more uplink resources to the wireless device. The one or more uplink resources may be for sending (e.g., transmitting) one or more messages. The one or more uplink resources may be indicated via additional fields in existing random access responses. The base station may send (e.g., transmit) a single random-access response that indicates (e.g., identifies) multiple uplink resources for sending (e.g., transmitting) one or more messages. The base station may increase the probability of a successful LBT procedure, for example, by sending (e.g., transmitting) a single random-access response that indicates (e.g., identifies) multiple uplink resources for sending (e.g., transmitting) messages.

Figures 24A, 24B:
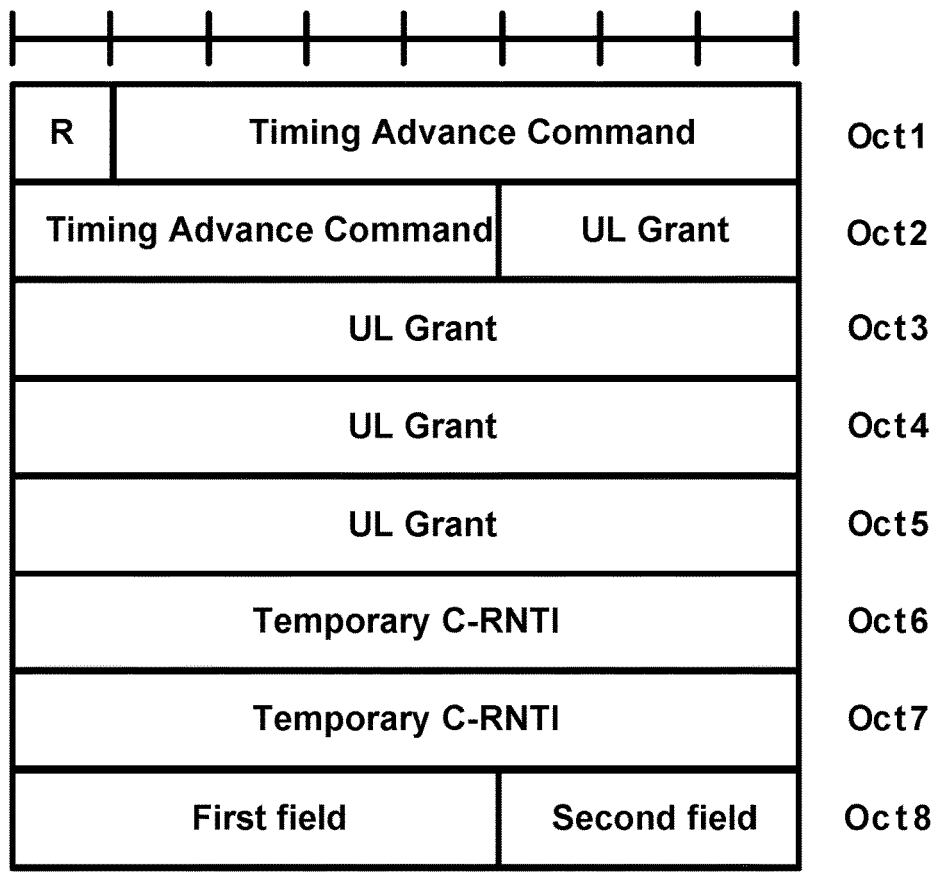
FIGS. 24A and 24B show examples of a random access response.

FIG. 24A and FIG. 24B show examples of a response to a resource request. For example, a wireless device may receive a random access response. Receiving the random access response may comprise completing the reception of the random access response successfully.

FIG. 24A shows a random access response. The random access response may comprise an UL grant (e.g., RAR UL grant). The random access response may also comprise a first field (e.g., Repetition number, Retransmission number, Maximum LBT number, etc.) and/or a second field (e.g., an offset, time offset, frequency offset, and/or the like). The first field may indicate a quantity/number of one or more uplink transmission opportunities for an uplink transmission (e.g., msg3, PUSCH) scheduled by the UL grant. The first field may be a first quantity (e.g., number) of bits (e.g., 2 bits, 3 bits, 4 bits, 5 bits). As shown in FIG. 24A, the first field may be 5 bits. The second field may indicate an offset (e.g., time and/or frequency offset) between consecutive uplink transmission opportunities corresponding to the one or more uplink transmission opportunities. The second field may be a second quantity (e.g., number) of bits (e.g., 2 bits, 3 bits, 4 bits, 5 bits). Following the example described above, the second field may be 3 bits.

FIG. 24B shows an example of a random access response comprising a UL grant (e.g., RAR UL grant). The UL grant may comprise a first field (e.g., Repetition number, Retransmission number, Maximum LBT number, and/or like) and/or a second field (e.g., an offset, time offset, frequency offset, and/or like). The first field may indicate a quantity (e.g., number) of one or more uplink transmission opportunities for an uplink transmission (e.g., Msg3, PUSCH) scheduled by the UL grant. The first field may be a first quantity (e.g., number) of bits (e.g., 2 bits, 3 bits, 4 bits, 5 bits, etc.). As shown in FIG. 24B, the first field may be 4 bits. The second field may indicate an offset (e.g., time and/or frequency offset) between consecutive uplink transmission opportunities corresponding to the one or more uplink transmission opportunities. The second field may be a second quantity (e.g., number) of bits (e.g., 2 bits, 3 bits, 4 bits, 5 bits, etc.). Following the example above, the second field may be 4 bits.

Figure 25:
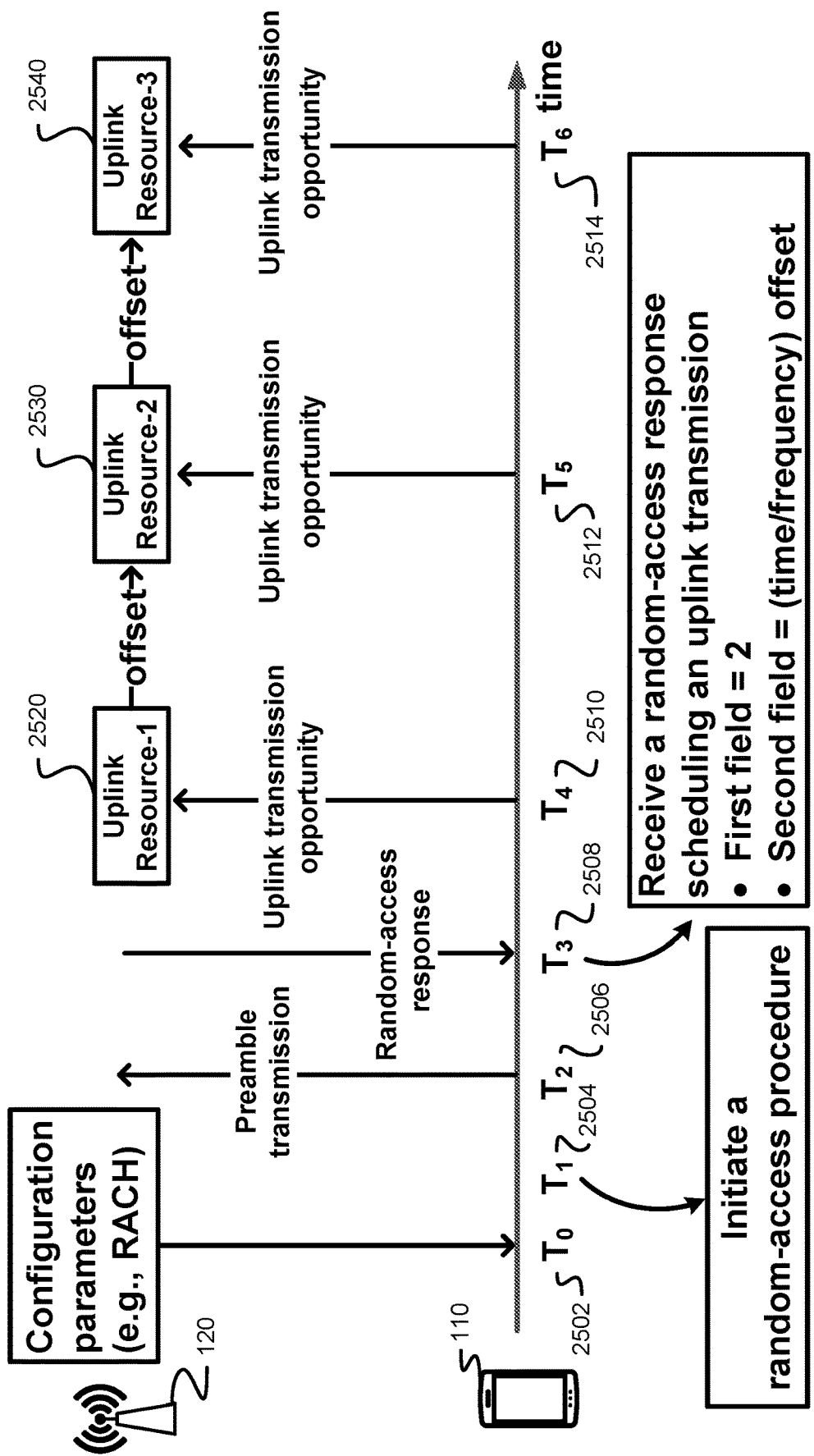
FIG. 25 shows an example of a random access procedure.

FIG. 25 shows an example of an access procedure. At time $T_0$ 2502, a wireless device 110 may receive one or more messages from a base station 120. The one or more messages may comprise one or more configuration parameters of a cell at time $T_0$ 2502. The one or more configuration parameters may indicate one or more random access channel (PRACH) resources.

At time $T_1$ 2504, the wireless device 110 may initiate a random access procedure (e.g., contention-free random access procedure, contention-based random access procedure) for the cell. The wireless device 110 may perform a random access resource selection for the random access procedure. The wireless device 110 may select a random access channel (PRACH) resource from a plurality of PRACH resources in the random access resource selection. The PRACH resource may comprise at least one preamble. The PRACH resource may comprise at least one PRACH occasion (e.g., time resource/occasion, frequency resource/occasion, code, etc.).

At time $T_2$ 2506, the wireless device 110 may send (e.g., transmit), via the at least one PRACH occasion, the at least one preamble for the random access procedure. The wireless device 110 may monitor (e.g., listen) for a random access response (RAR) corresponding to the at least one preamble, for example, based on or in response to transmitting the at least one preamble. Monitoring for the RAR may comprise attempting to detect DCI (e.g., DCI format 1_0) during a window (e.g., ra-responseWindow). The one or more configuration parameters may indicate the window (e.g., ra-responseWindow). The DCI may be CRC scrambled by an RA-RNTI and/or a C-RNTI.

At time $T_3$ 2508, the wireless device 110 may detect the DCI (e.g., DCI format 1_0) within the window. The wireless device 110 may detect a first transport block in a PDSCH within the window. The DCI may schedule the first transport block in the PDSCH. A lower layer (e.g., PHY, MAC) of the wireless device 110 may pass the first transport block to a higher layer of the wireless device (e.g., MAC, RRC), for example, based on or in response to detecting the first transport block. The wireless device (e.g., the higher layer of the wireless device) may parse the first transport block for a random access preamble identity (RAPID).

At time $T_3$ 2508, the wireless device 110 may receive the random access response corresponding to the at least one preamble. Receiving the random access response corresponding to the at least one preamble may comprise a RAPID (e.g., in the first transport block) that indicates (e.g., identifies) the at least one preamble. Receiving the random access response may comprise completing the reception of the random access response successfully. The random access response may comprise an UL grant, a first field (e.g., defined in FIG. 24A), and/or a second field (e.g., defined in FIG. 24A). Alternatively, the random access response may comprise an UL grant, a first field (e.g., defined in FIG. 24B), and/or a second field (e.g., defined in FIG. 24B). The UL grant may schedule an uplink transmission (e.g., PUSCH, Msg3) of a transport block. The wireless device 110 may determine one or more uplink transmission opportunities (e.g., UL Resource-1 2520, UL resource-2 2530, and/or UL Resource-3 2540) for the uplink transmission of the transport block, for example, based on at least one of: the UL grant, the first field, and/or the second field. A transmission opportunity of the one or more uplink transmission opportunities may comprise at least one time and/or at least one frequency resource.

The wireless device 110 may perform one or more LBT procedures on the one or more uplink transmission opportunities (e.g., UL Resource-1 2520, UL resource-2 2530, and/or UL Resource-3 2540). The wireless device may perform an LBT procedure for each of the one or more uplink transmission opportunities (e.g., UL Resource-1 2520, UL resource-2 2530, and/or UL Resource-3 2540). The wireless device 110 may perform an LBT procedure for each of the one or more uplink transmission opportunities, for example, at least until at least one LBT procedure succeeds. The wireless device 110 may stop performing an LBT procedure on the remaining uplink transmission opportunities, for example, based on or in response to the at least one LBT procedure succeeding. The wireless device 110 may perform a first LBT procedure on the UL Resource-1 2520. The wireless device 110 may not perform a second LBT procedure on the UL Resource-2 2530 and/or a third LBT procedure on the UL Resource-3 2540, for example, based on or in response to the first LBT procedure being successful. The wireless device 110 may perform a second LBT procedure on the UL Resource-2 2530, for example, based on or in response to a failure of the first LBT procedure. The wireless device 110 may not perform a third LBT procedure on the UL Resource-3 2540, for example, based on or in response to the second LBT procedure being successful. The wireless device 110 may perform a third LBT procedure on the UL Resource-3 2540, for example, based on or in response to a failure of the second LBT procedure.

The wireless device 110 may stop performing an LBT procedure on the remaining one or more uplink transmission opportunities, for example, if the wireless device 110 determines that at least one LBT procedure of the one or more LBT procedures succeeds. The wireless device 110 may perform the at least one LBT procedure on at least one uplink transmission opportunity of the one or more uplink transmission opportunities.

The wireless device 110 may determine at least one LBT procedure on at least one uplink transmission opportunity succeeded. The wireless device 110 may send (e.g., transmit) the transport block for the uplink transmission via the at least one uplink transmission opportunity, for example, based on or in response to determining that at least one LBT procedure succeeded. The wireless device 110 may perform a first LBT on the UL Resource-1 2520. The wireless device 110 may send (e.g., transmit) the transport block via the UL Resource-1 2520, for example, based on or in response to the first LBT procedure being successful. The wireless device 110 may perform a second LBT on the UL Resource-2 2530, for example, based on or in response to a failure of the first LBT procedure. The wireless device 110 may send (e.g., transmit) the transport block via the UL Resource-2 2530, for example, based on or in response to the second LBT procedure being successful. The wireless device 110 may perform a third LBT procedure on the UL Resource-3 2540, for example, based on or in response to a failure of the second LBT procedure. The wireless device 110 may send (e.g., transmit) the transport block via the UL Resource-3 2540, for example, based on or in response to the third LBT procedure being successful.

A quantity (e.g., number) of the one or more uplink transmission opportunities of the wireless device may be three or any other quantity/number. The wireless device 110 may perform a first LBT procedure on a first uplink transmission opportunity (e.g., UL Resource-1 2520) of the one or more uplink transmission opportunities for the uplink transmission of the transport block. The first LBT procedure may succeed. The first LBT procedure succeeding may comprise the wireless device 110 determining a successful first LBT. A successful first LBT procedure may comprise the first uplink transmission opportunity being idle/unoccupied (e.g., not occupied by another wireless device). The wireless device 110 may perform the uplink transmission of the transport block, for example, based on or in response to the first LBT procedure succeeding. Performing the uplink transmission of the transport block may comprise sending (e.g., transmitting) the transport block via the first uplink transmission opportunity (e.g., UL Resource-1 2520). The first uplink transmission opportunity may comprise a first time allocation (e.g., resource) and/or a first frequency allocation (e.g., resource). The wireless device may not perform a second LBT procedure on a second uplink transmission opportunity (e.g., UL Resource-2 2530) for the uplink transmission of the transport block, for example, based on or in response to the first LBT procedure succeeding. The wireless device 110 may not perform a third LBT procedure on a third uplink transmission opportunity (e.g., UL Resource-3 2540) for the uplink transmission of the transport block, for example, based on or in response to the first LBT procedure succeeding.

The first LBT procedure may fail. The wireless device 110 may determine (e.g., detect) a failure of the first LBT procedure. Failure of the first LBT may comprise determining (e.g., detecting) that the first uplink transmission opportunity is busy/occupied (e.g., occupied by another wireless device). The wireless device 110 may perform a second LBT procedure on a second uplink transmission opportunity (e.g., UL Resource-2 2530) for the uplink transmission of the transport block, for example, based on or in response to the first LBT procedure failing. The second LBT procedure may succeed. The wireless device 110 may determine (e.g., detect) whether the second LBT procedure is successful. The wireless device 110 may perform the uplink transmission of the transport block, for example, based on or in response to the second LBT procedure succeeding. Performing the uplink transmission of the transport block may comprise sending (e.g., transmitting) the transport block via the second uplink transmission opportunity. The second uplink transmission opportunity may comprise a second time allocation (e.g., resource) and/or a second frequency allocation (e.g., resource). The wireless device 110 may not perform a third LBT procedure on a third uplink transmission opportunity (e.g., UL Resource-3 2540) of for the uplink transmission of the transport block, for example, based on or in response to the second LBT procedure succeeding.

The second LBT procedure may fail. The wireless device 110 may determine (e.g., detect) a failure of the second LBT procedure (e.g., occupied by another wireless device). The wireless device 110 may perform a third LBT procedure on a third uplink transmission opportunity (e.g., UL Resource-3 2540) for the uplink transmission of the transport block, for example, based on or in response to the second LBT procedure failing. The third LBT procedure may succeed. The wireless device 110 may determine whether the third LBT procedure is successful. The wireless device 110 may perform the uplink transmission of the transport block, for example, based on or in response to the third LBT procedure succeeding. Performing the uplink transmission of the transport block may comprise sending (e.g., transmitting) the transport block via the third uplink transmission opportunity. The third uplink transmission opportunity may comprise a third time allocation (e.g., resource) and/or a third frequency allocation (e.g., resource).

The one or more uplink transmission opportunities may be the first uplink transmission opportunity (UL Resource-1 2520), the second uplink transmission opportunity (UL Resource-2 2530) and the third uplink transmission opportunity (UL Resource-3 2540). The one or more LBT procedures may be the first LBT procedure, the second LBT procedure, and the third LBT procedure. The wireless device 110 may perform an LBT procedure on an uplink transmission opportunity of the one or more uplink transmission opportunities, for example, if the wireless device 110 determines (e.g., detects) LBT procedure failures on previous uplink transmission opportunities. The previous uplink transmission opportunities may occur earlier in time and/or frequency than the uplink transmission opportunity. The wireless device 110 may perform an LBT procedure on an uplink transmission opportunity, for example, if the uplink transmission opportunity occurs earlier in time than the other uplink transmission opportunities. The first uplink transmission opportunity (UL Resource-1 2520) may be the uplink transmission opportunity that occurs earliest in time among the first uplink transmission opportunity (UL Resource-1 2520), the second uplink transmission opportunity (UL Resource-2 2530), and/or the third uplink transmission opportunity (UL Resource-3 2540). The first uplink transmission opportunity (UL Resource-1 2520) may be the earlier (e.g., previous, prior) uplink transmission opportunity for the second uplink transmission opportunity (UL Resource-2 2530) and/or the third uplink transmission opportunity (UL Resource-3). The first uplink transmission opportunity (UL Resource-1 2520) and the second transmission opportunity (UL Resource-2 2530) may be the earlier (e.g., previous, prior) uplink transmission opportunities for the third uplink transmission opportunity (UL Resource-3 2540).

A quantity (e.g., number) of the one or more uplink transmission opportunities may be based on the first field in the random access response. The first field may be equal to a first quantity/number. The first quantity/number may be equal to the quantity/number of the one or more uplink transmission opportunities (e.g., including the transmission opportunity given by the UL grant), for example, based on or in response to the first field being equal to the first quantity/number. As shown in FIG. 25, the quantity/number of the one or more uplink transmission opportunities may be three (or any other value). Accordingly, the value of the first field may be three (or any other value). A quantity/number of the one or more uplink transmission opportunities may be equal to the first quantity/number plus one (e.g., the quantity/number may not be based on the transmission opportunity given by the UL grant), for example, based on or in response to the first field being equal to a first quantity/number. The first field may be equal to two and the quantity/number of the one or more uplink transmission opportunities may be equal to three (e.g., 1 from the UL grant and 2 from the first field as additional transmission opportunities) or any other quantity/number.

The UL grant may comprise a first time allocation (e.g., PUSCH time resource allocation in FIG. 24B). The UL grant may comprise a first frequency allocation (e.g., PUSCH frequency resource allocation in FIG. 24B). A first resource allocation (e.g., or the first uplink transmission opportunity) for the uplink transmission of the transport block may be the first time allocation and/or the first frequency allocation (e.g., UL resource-1 2520). The wireless device 110 may perform the first LBT procedure on the first resource allocation. The wireless device 110 may determine (e.g., detect) a success of the first LBT. At time $T_4$ 2510, the wireless device 110 may send (e.g., transmit) the transport block for the uplink transmission via the first frequency allocation at the first time allocation, for example, based on or in response to determining (e.g., detecting) the success of the first LBT procedure.

The wireless device 110 may determine (e.g., detect) a failure of the first LBT procedure. The wireless device 110 may determine a second resource allocation for the uplink transmission of the transport block based on the UL grant and/or the second field, for example, based on or in response to determining the failure of the first LBT procedure. The second field may be a time offset (e.g., slots, symbols, subframe, frames, etc.). The wireless device 110 may determine that the second resource allocation for the uplink transmission of the transport block may be a second time allocation and/or the first frequency allocation (e.g., UL Resource-2 2530), for example, based on or in response to the second field being the time offset. The second time allocation may be equal to the first time allocation of the first resource allocation plus the second field. The wireless device 110 may perform the second LBT procedure on the second resource allocation. The wireless device 110 may determine a success of the second LBT procedure. At time $T_5$ 2512, the wireless device 110 may send (e.g., transmit) the transport block for the uplink transmission via the first frequency allocation at the second time allocation, for example, based on or in response to determining the success of the second LBT procedure.

The wireless device 110 may determine (e.g., detect) a failure of the second LBT procedure. The wireless device 110 may determine a third resource allocation for the uplink transmission of the transport block based on the UL grant and/or the second field, for example, based on or in response to determining (e.g., detecting) the failure of the second LBT procedure. The second field may be a time offset (e.g., slots, symbols, subframe, frames, etc.). The wireless device 110 may determine that the third resource allocation for the uplink transmission of the transport block may be a third time allocation and/or the first frequency allocation (e.g., UL Resource-3 2540), for example, based on or in response the second field being the time offset. The third time allocation may be equal to the second time allocation of the second resource allocation plus the second field. The wireless device 110 may perform a third LBT procedure on the third resource allocation. The wireless device 110 may determine (e.g., detect) a success of the third LBT. At time $T_6$ 2514, the wireless device 110 may send (e.g., transmit) the transport block for the uplink transmission via the first frequency allocation at the third time allocation, for example, based on or in response to the determining the success of the third LBT procedure.

Figure 26:
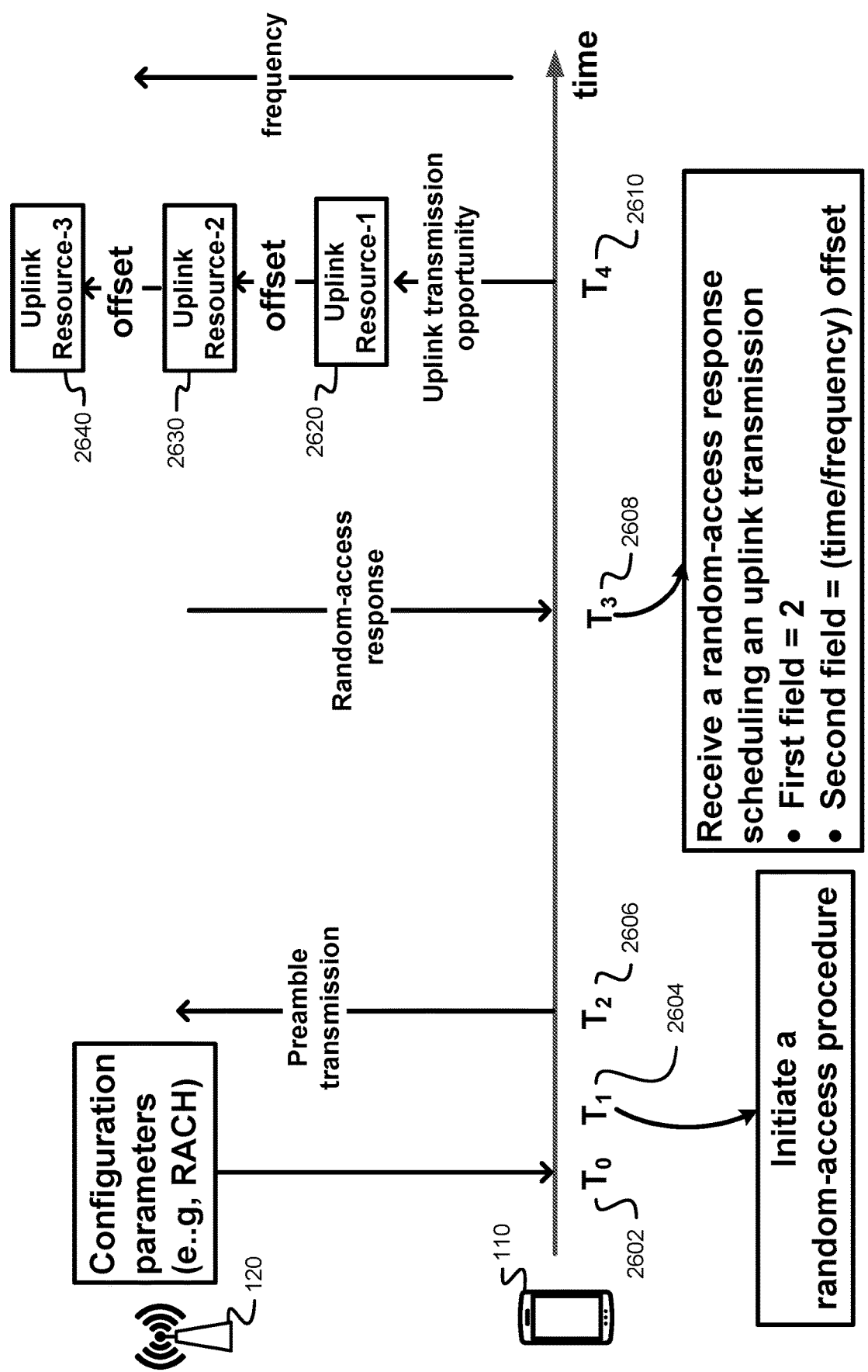
FIG. 26 shows an example of a random access procedure.

FIG. 26 shows an example of an access procedure. At time $T_0$ 2602, a wireless device 110 may receive one or more messages from a base station 120. The one or more messages may comprise one or more configuration parameters of a cell at time $T_0$ 2602. The one or more configuration parameters may indicate one or more random access channel (PRACH) resources.

At time $T_1$ 2604, the wireless device 110 may start (e.g., initiate) a random access procedure (e.g., contention-free random access procedure, contention-based random access procedure) for the cell. The wireless device 110 may perform a random access resource selection for the random access procedure. The wireless device 110 may determine (e.g., select) a random access channel (PRACH) resource of the one or more PRACH resources in the random access resource selection. The PRACH resource may comprise at least one preamble. The PRACH resource may comprise at least one PRACH occasion (e.g., time resource/occasion, frequency resource/occasion, code, etc.).

At time $T_2$ 2606, the wireless device 110 may send (e.g., transmit), via the at least one PRACH occasion, the at least one preamble for the random access procedure. The wireless device 110 may monitor (e.g., listen) for a random access response (RAR) corresponding to the at least one preamble, for example, based on or in response to sending (e.g., transmitting) the at least one preamble. Monitoring (e.g., listening) for the RAR may comprise attempting to detect DCI (e.g., DCI format 1_0) during a window (e.g., ra-responseWindow). The one or more configuration parameters may indicate the window (e.g., ra-responseWindow). The DCI may be CRC scrambled by a RA-RNTI and/or a C-RNTI.

At time $T_3$ 2608, the wireless device 110 may detect the DCI (e.g., DCI format 1_0) within the window. The wireless device 110 may detect a first transport block in a PDSCH within the window. The DCI may schedule the first transport block in the PDSCH. A lower layer (e.g., PHY, MAC) of the wireless device 110 may pass the first transport block to a higher layer of the wireless device (e.g., MAC, RRC), for example, based on or in response to the detecting the first transport block. The higher layer may parse the first transport block for a random access preamble identity (RAPID).

At time $T_3$ 2608, the wireless device 110 may receive the random access response corresponding to the at least one preamble. Receiving the random access response corresponding to the at least one preamble may comprise a RAPID (e.g., in the first transport block) that indicates (e.g., identifies) the at least one preamble. Receiving the random access response may comprise completing the reception of the random access response successfully. The random access response may comprise an UL grant, a first field (e.g., defined in FIG. 24A), and/or a second field (e.g., defined in FIG. 24A). Alternatively, the random access response may comprise an UL grant, a first field (e.g., defined in FIG. 24B), and/or a second field (e.g., defined in FIG. 24B). The UL grant may schedule an uplink transmission (e.g., PUSCH, Msg3) of a transport block. The wireless device 110 may determine one or more uplink transmission opportunities (e.g., UL Resource-1 2620, UL resource-2 2630, and/or UL Resource-3 2640) for the uplink transmission of the transport block, for example, based on at least one of: the UL grant, the first field, and/or the second field. A transmission opportunity of the one or more uplink transmission opportunities may comprise at least one time and/or at least one frequency resource.

The wireless device 110 may perform one or more LBT procedures on the one or more uplink transmission opportunities ((e.g., UL Resource-1 2620, UL resource-2 2630, and/or UL Resource-3 2640). The wireless device may perform an LBT procedure for each of the one or more uplink transmission opportunities (e.g., UL Resource-1 2620, UL resource-2 2630, and/or UL Resource-3 2640). The wireless device 110 may perform an LBT procedure for each of the one or more uplink transmission opportunities, for example, until at least one LBT procedure succeeds. The wireless device 110 may stop performing an LBT procedure on the remaining one or more uplink transmission opportunities, for example, based on or in response to the at least one LBT procedure succeeding. The wireless device 110 may perform a first LBT procedure on the UL Resource-1 2620. The wireless device 110 may not perform a second LBT procedure on the UL Resource-2 2630 and/or a third LBT on the UL Resource-3 2640, for example, based on or in response to the first LBT procedure being successful. The wireless device 110 may perform a second LBT procedure on the UL Resource-2 2630, for example, based on or in response to a failure of the first LBT procedure. The wireless device 110 may not perform a third LBT procedure on the UL Resource-3 2640, for example, based on or in response to the second LBT procedure being successful. The wireless device 110 may perform a third LBT procedure on the UL Resource-3 2640, for example, based on or in response to a failure of the first LBT procedure and/or the second LBT procedure.

The wireless device 110 may stop (e.g., cease) performing an LBT procedure on the remaining one or more uplink transmission opportunities, for example, if the wireless device 110 determines that at least one LBT procedure of the one or more LBT procedures succeeds. The wireless device 110 may perform the at least one LBT procedure on at least one uplink transmission opportunity of the one or more uplink transmission opportunities.

The wireless device 110 may determine at least one LBT procedure on at least one uplink transmission opportunity succeeded. The wireless device 110 may send (e.g., transmit) the transport block for the uplink transmission via the at least one uplink transmission opportunity, for example, based on or in response to determining that at least one LBT procedure succeeded. The wireless device 110 may perform a first LBT procedure on the UL Resource-1 2620. The wireless device 110 may send (e.g., transmit) the transport block via the UL Resource-1 2620, for example, based on or in response to the first LBT procedure being successful. The wireless device 110 may perform a second LBT procedure on the UL Resource-2 2630, for example, based on or in response to a failure of the first LBT procedure. The wireless device 110 may send (e.g., transmit) the transport block via the UL Resource-2 2630, for example, based on or in response to the second LBT procedure being successful. The wireless device 110 may perform a third LBT procedure on the UL Resource-3 240, for example, based on or in response to a failure of the second LBT procedure. The wireless device 110 may send (e.g., transmit) the transport block via the UL Resource-3 2640, for example, based on or in response to the third LBT procedure being successful.

A quantity (e.g., number) of the one or more uplink transmission opportunities of the wireless device may be three. The wireless device 110 may perform a first LBT procedure on a first uplink transmission opportunity (e.g., UL Resource-1 2620) of the one or more uplink transmission opportunities for the uplink transmission of the transport block. The first LBT procedure may succeed. The first LBT procedure succeeding may comprise the wireless device 110 determining (e.g., detecting) a successful first LBT procedure. A successful first LBT procedure may comprise the first uplink transmission opportunity being idle (e.g., not occupied by another wireless device). The wireless device 110 may perform the uplink transmission of the transport block, for example, based on or in response to the first LBT procedure succeeding. Performing the uplink transmission of the transport block may comprise sending (e.g., transmitting) the transport block via the first uplink transmission opportunity (e.g., UL Resource-1 2620). The first uplink transmission opportunity may comprise a first time allocation (e.g., resource) and/or a first frequency allocation (e.g., resource). The wireless device may not perform a second LBT procedure on a second uplink transmission opportunity (e.g., UL Resource-2 2630) for the uplink transmission of the transport block, for example, based on or in response to the first LBT procedure succeeding. The wireless device 110 may not perform a third LBT procedure on a third uplink transmission opportunity (e.g., UL Resource-3 2640) for the uplink transmission of the transport block, for example, based on or in response to the first LBT procedure succeeding.

The first LBT procedure may fail. The wireless device 110 may determine (e.g., detect) a failure of the first LBT procedure. Failure of the first LBT procedure failing may comprise determining (e.g., detecting) that the first uplink transmission opportunity is busy (e.g., occupied by another wireless device). The wireless device 110 may perform a second LBT procedure on a second uplink transmission opportunity (e.g., UL Resource-2 2630) for the uplink transmission of the transport block, for example, based on or in response to the first LBT procedure failing. The second LBT procedure may succeed. The wireless device 110 may determine whether the second LBT procedure is successful. The wireless device 110 may perform the uplink transmission of the transport block, for example, based on or in response to the second LBT procedure succeeding. Performing the uplink transmission of the transport block may comprise sending (e.g., transmitting) the transport block via the second uplink transmission opportunity. The second uplink transmission opportunity may comprise a second time allocation (e.g., resource) and/or a second frequency allocation (e.g., resource). The wireless device 110 may not perform a third LBT procedure on a third uplink transmission opportunity (e.g., UL Resource-3 2640) of for the uplink transmission of the transport block, for example, based on or in response to the second LBT procedure succeeding.

The second LBT procedure may fail. The wireless device 110 may determine (e.g., detect) a failure of the second LBT procedure (e.g., occupied by another wireless device). The wireless device 110 may perform a third LBT on a third uplink transmission opportunity (e.g., UL Resource-3 2640) for the uplink transmission of the transport block, for example, based on or in response to the second LBT failing. The third LBT procedure may succeed. The wireless device 110 may determine whether the third LBT procedure is successful. The wireless device 110 may perform the uplink transmission of the transport block, for example, based on or in response to the third LBT procedure succeeding. Performing the uplink transmission of the transport block may comprise sending (e.g., transmitting) the transport block via the third uplink transmission opportunity. The third uplink transmission opportunity may comprise a third time allocation (e.g., resource) and/or a third frequency allocation (e.g., resource).

As noted above, the one or more uplink transmission opportunities may be the first uplink transmission opportunity (UL Resource-1 2620), the second uplink transmission opportunity (UL Resource-2 2630), and/or the third uplink transmission opportunity (UL Resource-3 2640). The one or more LBT procedures may be the first LBT procedure, the second LBT procedure, and/or the third LBT procedure. The wireless device 110 may perform an LBT procedure on an uplink transmission opportunity of the one or more uplink transmission opportunities, for example, if the wireless device 110 determines (e.g., detects) LBT failures on previous uplink transmission opportunities. The previous uplink transmission opportunities may occur earlier in time and/or frequency than the uplink transmission opportunity. The wireless device 110 may perform an LBT procedure on an uplink transmission opportunity, for example, if the uplink transmission opportunity occurs earlier in time than the other uplink transmission opportunities. The first uplink transmission opportunity (UL Resource-1 2620) may be the uplink transmission opportunity that occurs earliest in time among the first uplink transmission opportunity (UL Resource-1 2620), the second uplink transmission opportunity (UL Resource-2 2630), and the third uplink transmission opportunity (UL Resource-3 2640). The first uplink transmission opportunity (UL Resource-1 2620) may be the earlier (e.g., previous, prior) uplink transmission opportunity for the second uplink transmission opportunity (UL Resource-2 230) and/or the third uplink transmission opportunity (UL Resource-3 2640). The first uplink transmission opportunity (UL Resource-1 2620) and the second transmission opportunity (UL Resource-2 2630) may be the earlier (e.g., previous, prior) uplink transmission opportunities for the third uplink transmission opportunity (UL Resource-3 2640).

A quantity/number of the one or more uplink transmission opportunities may be based on the first field in the random access response. The first field may be equal to a first quantity/number. The first quantity/number may be equal to the quantity/number of the one or more uplink transmission opportunities (e.g., including the transmission opportunity given by the UL grant), for example, based on or in response to the first field being equal to the first quantity/number. As shown in FIG. 26, the quantity/number of the one or more uplink transmission opportunities may be three (or any other value). Accordingly, the value of the first field may be three (or any other value). A quantity/number of the one or more uplink transmission opportunities may be equal to the first quantity/number plus one (e.g., the number may not be based on the transmission opportunity given by the UL grant), for example, based on or in response to the first field being equal to a first quantity/number. The first field may be equal to two (or any other quantity/number). The quantity/number of the one or more uplink transmission opportunities may be equal to three (e.g., 1 from the UL grant and 2 from the first field as additional transmission opportunities) or any other value.

The UL grant may comprise a first time allocation (e.g., PUSCH time resource allocation in FIG. 24B). The UL grant may comprise a first frequency allocation (e.g., PUSCH frequency resource allocation in FIG. 24B). A first resource allocation (e.g., or the first uplink transmission opportunity) for the uplink transmission of the transport block may be the first time allocation and/or the first frequency allocation (e.g., UL resource-1 2620). The wireless device 110 may perform the first LBT procedure on the first resource allocation. The wireless device 110 may determine (e.g., detect) a success of the first LBT procedure. At time $T_4$ 2610, the wireless device 110 may send (e.g., transmit) the transport block for the uplink transmission via the first frequency allocation at the first time allocation, for example, based on or in response to determining (e.g., detecting) the success of the first LBT procedure.

The wireless device 110 may determine a failure of the first LBT procedure. The wireless device 110 may determine a second resource allocation for the uplink transmission of the transport block based on the UL grant and/or the second field, for example based on or in response to the determining the failure of the first LBT procedure. The second field may be a frequency offset (e.g., subcarriers, resource blocks, subbands, BWPs, etc.). The wireless device 110 may determine that the second resource allocation for the uplink transmission of the transport block is the first time allocation and/or a second frequency allocation (e.g., UL Resource-2 2630), for example, based on or in response to the second field being the frequency offset. The second frequency allocation may be equal to the first frequency allocation of the first resource allocation plus the second field (e.g., the frequency offset). The wireless device 110 may perform the second LBT procedure on the second resource allocation (e.g., UL Resource-2 2630). The wireless device 110 may determine (e.g., detect) a success of the second LBT procedure. At time $T_4$ 2610, the wireless device 110 may send (e.g., transmit) the transport block for the uplink transmission via the second frequency allocation at the first time allocation, for example, based on or in response to the determining (e.g., detecting) that the second LBT procedure was successful.

The wireless device 110 may determine a failure of the second LBT procedure. The wireless device 110 may determine a third resource allocation for the uplink transmission of the transport block based on the UL grant and/or the second field, for example, based on or in response to the determining (e.g., detecting) the failure of the second LBT procedure. The second field may be a frequency offset (e.g., subcarriers, resource blocks, subbands, BWPs, etc.). The wireless device 110 may determine that the third resource allocation for the uplink transmission of the transport block may be the first time allocation and/or a third frequency allocation (e.g., UL Resource-3 2640), for example, based on or in response to the second field being the frequency offset. The third frequency allocation may be equal to the second frequency allocation of the second resource allocation (e.g., UL Resource-2 2630) plus the second field (e.g., frequency offset). The wireless device 110 may perform the third LBT procedure on the third resource allocation. The wireless device may determine whether the third LBT procedure is a success. At time $T_4$ 2610, the wireless device 110 may send (e.g., transmit) the transport block for the uplink transmission via the third frequency allocation at the first time allocation, for example, based on or in response to determining (e.g., detecting) that the third LBT procedure was a success.

By including the first field and/or the second field in the random access response may increase the success probability of the uplink transmission scheduled by the random access response. Including the UL grant of the random access response may increase the success probability of the uplink transmission scheduled by the random access response. Including the first field and/or the second field in the random access response may increase transmission opportunities for the uplink transmission and/or reduce the probability of LBT failure. Including the UL grant of the random access response may increase transmission opportunities for the uplink transmission and/or reduce the probability of LBT failure At least two uplink opportunities may overlap in time (e.g., in at least one symbol, slot, and/or subframe). Additionally or alternatively, at least two LBT procedures on the at least two uplink opportunities may succeed. In FIG. 26, the first uplink transmission opportunity (e.g., UL Resource-1 2620), the second uplink transmission opportunity (e.g., UL Resource-2 2630), and/or the third uplink transmission opportunity (e.g., UL Resource-3 2640) may overlap. At time $T_4$ 2610, the wireless device 110 may perform the first LBT procedure, the second LBT procedure, and/or the third LBT procedure. The first LBT procedure and the third LBT may succeed, while the second LBT procedure may fail. The wireless device 110 may determine (e.g., select) an uplink transmission opportunity (e.g., the first transmission opportunity or the third uplink transmission opportunity) of the at least two uplink opportunities, for example, based on or in response to the at least two LBT procedures on the at least two uplink opportunities succeeding (e.g., the first LBT procedure on the first transmission opportunity and/or the third LBT procedure on the third uplink transmission opportunity). The wireless device 110 may determine (e.g., select) an uplink transmission opportunity (e.g., the first transmission opportunity or the third uplink transmission opportunity), for example, based on one or more criteria.

The one or more criteria for determining (e.g., selecting) an uplink transmission opportunity may be based on an index (e.g., BWP index, subband index). The wireless device 110 may determine (e.g., select) the uplink transmission opportunity with the lowest (or highest) index among the at least two indices of the at least two uplink opportunities. The wireless device 110 may determine (e.g., select) the uplink transmission opportunity, for example, based on or in response to a first index of the uplink transmission opportunity being the lowest (or highest) among the at least two indices of the at least two uplink opportunities. The one or more configuration parameters may indicate (e.g., identify) an index for each of the uplink transmission opportunities. The first uplink transmission opportunity may be associated with a first index and/or the third uplink transmission opportunity may be associated with a third index. The wireless device 110 may determine (e.g., select) the third uplink transmission opportunity, for example, based on or in response to the third index being lower (or higher) than the first index.

The one or more criteria for determining (e.g., selecting) an uplink transmission opportunity may be based on an uplink transmission power. The wireless device 110 may determine (e.g., select) the uplink transmission opportunity with the lowest (or highest) transmission power among the at least two uplink transmission powers of the at least two uplink opportunities. The wireless device 110 may determine (e.g., select) an uplink transmission opportunity, for example, based on or in response to a first uplink transmission power associated with the uplink transmission opportunity being lower (or higher) than the uplink transmission powers of the other uplink transmission opportunities.

The one or more criteria for determining (e.g., selecting) an uplink transmission opportunity may be based on an operating frequency (e.g., frequency allocation and/or frequency band). The wireless device 110 may determine (e.g., select) the uplink transmission opportunity with the lowest (or highest) operating frequency among a plurality of uplink operating frequencies associated with each of the uplink transmission opportunities. The wireless device 110 may determine (e.g., select) the uplink transmission opportunity, for example, based on or in response to a first uplink operating frequency of the uplink transmission opportunity being lower (or higher) than the uplink operating frequencies associated with each of the uplink opportunities. The wireless device 110 may determine that the frequency allocation of the first transmission opportunity may be lower (or higher) than the third frequency allocation of the third uplink transmission opportunity. The wireless device 110 may determine (e.g., select) the first uplink transmission opportunity, for example, based on or in response to determining that the frequency allocation of the first transmission opportunity may be lower (or higher) than the third frequency allocation of the third uplink transmission opportunity.

A wireless device may start a contention resolution timer associated with an access procedure. The wireless device may start the contention resolution timer, for example, based on or in response to transmitting a first message for the access procedure. The wireless device may monitor for a second message rescheduling the transmission of the first message at a time that the contention resolution timer is running, for example, if the base station fails to receive the first message. The wireless device may fallback to resource selection, for example, if the contention resolution timer expires and/or if the wireless device has not received the second message from the base station. The wireless device may retransmit a message, for example, if the wireless device falls back to resource selection. The wireless device may not send (e.g., transmit) the message, for example, based on a failed listen-before-talk (LBT) procedure. For example, the resource to transmit the message may be unavailable/occupied. The wireless device may not know when to start the contention resolution timer, for example, if the message cannot be sent (e.g., transmitted). For example, an LBT procedure may fail, which may result in the message not being sent (e.g., transmitted). The wireless device may not start the contention resolution timer, for example, at least until the message is sent (e.g., transmitted). The wireless device may monitor the for the second message to reschedule the first message, for example, if the contention resolution timer is running. The wireless device may not monitor for a retransmission grant, for example, if the contention resolution timer is not running. The contention resolution timer may not expire, for example, if it is not running. The wireless device may not fall back to a resource selection of the access procedure, for example, if the contention resolution timer does not expire. The wireless device may be required to continue to perform the access procedure.

As described herein, a wireless device may perform one or more listen-before-talk (LBT) procedures on one or more uplink grants, for example, before sending (e.g., transmitting) one or more transport blocks. The wireless device may start a contention resolution timer, for example, based on or in response to the one-or-more LBT procedures failing. The wireless device may perform a random access selection, for example, based on or in response to the one-or-more LBT procedures failing. A fixed RV sequence may be determined/ defined, for example, for use if one or more LBT procedures fail. One or more fallback procedures may be determined/ defined, for example, for use if one or more LBT procedures fails. By using the fixed RV sequence and/or the one or more fallback procedures, for example, if one or more LBT procedures fail, latency may be reduced/avoided and/or misalignment between a wireless device and a base station may be reduced/avoided.

Figure 27:
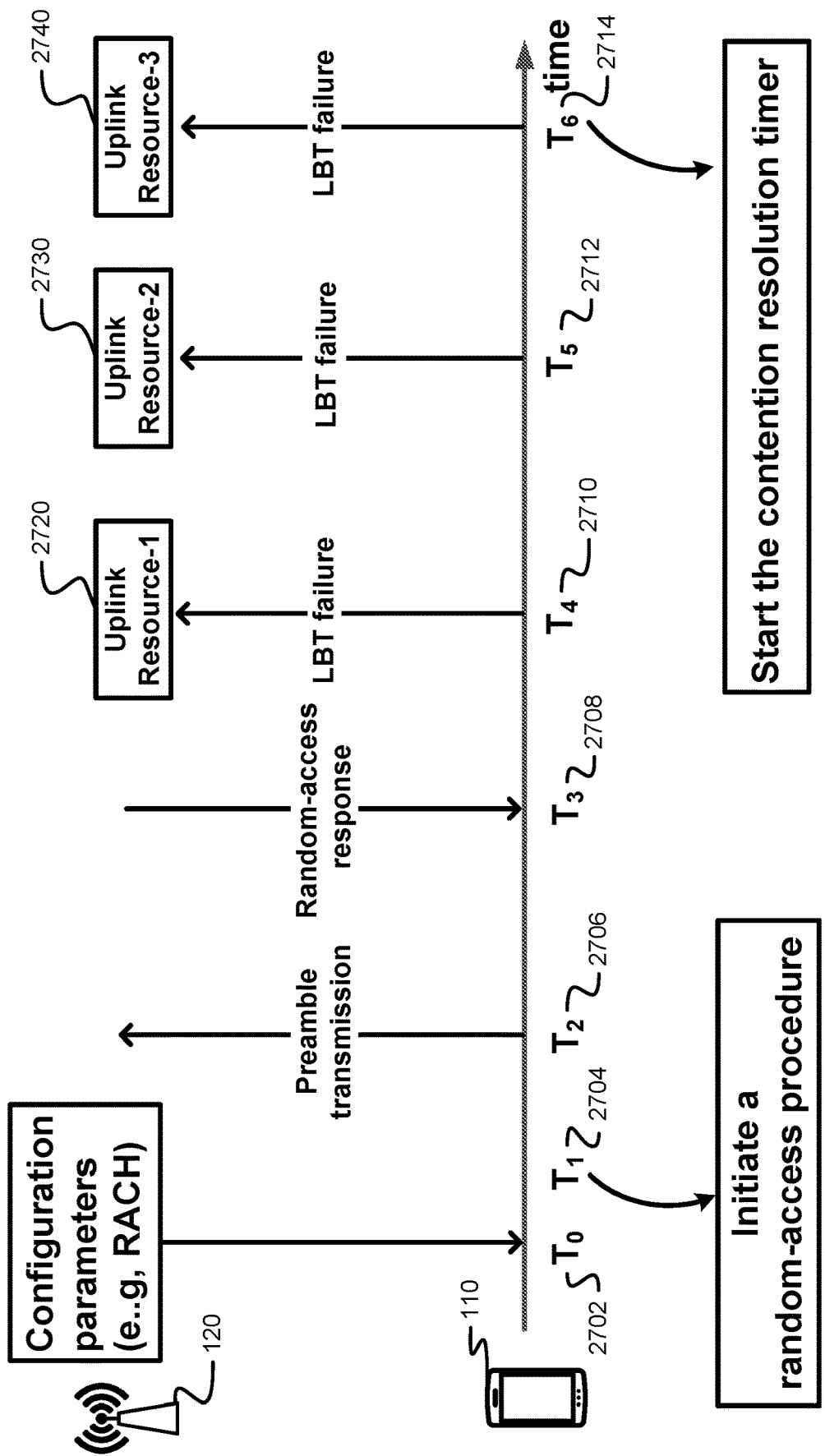
FIG. 27 shows an example of a random access procedure.

FIG. 27 shows an example of an access procedure. The steps and/or procedures performed at times $T_0$ 2702, $T_1$ 2704, and/or $T_2$ 2706 may be similar to the steps and/or procedures performed at times $T_0$ 2502, $T_1$ 2504, and/or $T_2$ 2506.

At time $T_0$ 2702, a wireless device 110 may receive one or more messages from a base station 120. The one or more messages may comprise one or more configuration parameters of a cell. The one or more configuration parameters may indicate one or more random access channel (PRACH) resources and/or a contention-resolution timer (e.g., ra-ContentionResolutionTimer).

At time $T_1$ 2704, the wireless device 110 may start (e.g., initiate) a random access procedure for the cell. The wireless device 110 may perform a first random access resource selection, for example, based on or in response to starting (e.g., initiating) the random access procedure. The wireless device 110 may determine (e.g., select) a random access channel (PRACH) resource of the one or more PRACH resources for the first random access selection. The PRACH resource may comprise at least one preamble. The PRACH resource may comprise at least one PRACH occasion (e.g., time resource/occasion, frequency resource/occasion, code, etc.).

At time $T_2$ 2706, the wireless device 110 may send (e.g., transmit) the at least one preamble for the random access procedure via the at least one PRACH occasion. The wireless device 110 may monitor (e.g., listen) for a random access response (RAR) corresponding to the at least one preamble, for example, based on or in response to the transmitting the at least one preamble. Monitoring for the RAR may comprise attempting to detect DCI (e.g., DCI format 1_0) during a window (e.g., ra-responseWindow). The one or more configuration parameters may indicate the window for the RAR.

At time $T_3$ 2708, the wireless device 110 may receive the random access response corresponding to the at least one preamble. The random access response may comprise at least two uplink grants for an uplink transmission of a transport block (e.g., PUSCH, Msg3). Each of the at least two uplink grants may comprise a time allocation (e.g., PUSCH time resource allocation in FIG. 24B) and/or a frequency allocation (e.g., PUSCH frequency resource allocation in FIG. 24B). As shown in FIG. 27, the random access response may comprise three uplink grants (e.g., indicating UL Resource-1 2720, UL Resource-2 2730, UL Resource-3 2740) for the uplink transmission of the transport block. A first uplink grant of the at least two uplink grants may comprise a first time allocation and/or a first frequency allocation (e.g., UL Resource-1 2720). A second uplink grant of the at least two uplink grants may comprise a second time allocation and/or a second frequency allocation (e.g., UL Resource-2 2730). A third uplink grant of the at least two uplink grants may comprise a third time allocation and/or a third frequency allocation (e.g., UL Resource-3 2740).

The random access response may comprise at least two uplink transmission opportunities for an uplink transmission (e.g., PUSCH, Msg3). Each of the at least two uplink transmission opportunities may comprise a time allocation (e.g., PUSCH time resource allocation in FIG. 24B) and/or a frequency allocation (e.g., PUSCH frequency resource allocation in FIG. 24B). As shown in FIG. 27, the random access response may comprise three uplink transmission opportunities (e.g., UL Resource-1 2720, UL Resource-2 2730, UL Resource-3 2740) for the uplink transmission of the transport block. A first uplink transmission opportunity may comprise a first time allocation and/or a first frequency allocation (e.g., UL Resource-1 2720). A second uplink transmission opportunity may comprise a second time allocation and/or a second frequency allocation (e.g., UL Resource-2 2730). A third uplink transmission opportunity may comprise a third time allocation and/or a third frequency allocation (e.g., UL Resource-3 2740).

The wireless device 110 may perform one or more LBT procedures on the one or more uplink resources indicated by the at least two uplink grants. The wireless device 110 may perform one or more LBT procedures on the one or more uplink resources indicated by the at least two uplink transmission opportunities. As shown in FIG. 27, the wireless device 110 may perform a first LBT on the first time allocation and/or the first frequency allocation indicated by the first UL grant (or by the first uplink transmission opportunity). The wireless device 110 may perform a second LBT on the second time allocation and/or the second frequency allocation indicated by the second UL grant (or by the second uplink transmission opportunity). The wireless device 110 may perform a third LBT on the third time allocation and/or the third frequency allocation indicated by the third UL grant (or by the third uplink transmission opportunity). The wireless device 110 may determine (e.g., detect) a failure of the one or more LBT procedures on the one or more uplink resources indicated by the at least two uplink grants.

At time $T_4$ 2710, the wireless device 110 may determine (e.g., detect) a failure of the first LBT procedure. At time $T_5$ 2712, the wireless 110 device may determine (e.g., detect) a failure of the second LBT procedure. At time $T_6$ 2714, the wireless device 110 may determine (e.g., detect) a failure of the third LBT procedure in FIG. 27. The wireless device 110 may start a contention resolution timer (e.g., ra-ContentionResolutionTimer), for example, based on or in response to the failure of the one or more LBT procedures.

The contention-resolution timer (e.g., ra-ContentionResolutionTimer) may expire. The wireless device 110 may perform a second random access resource selection, for example, based on or in response to the contention resolution timer (e.g., ra-ContentionResolutionTimer) expiring. The wireless device 110 may determine (e.g., select) a second PRACH resource of the one or more PRACH resources, for example, during the second random access resource selection. The second PRACH resource may comprise at least one second preamble and/or at least one second PRACH occasion (e.g., time, frequency, code, etc.). The wireless device 110 may send (e.g., transmit) the at least one second preamble via the at least one second PRACH occasion for the random access procedure, for example, based on or in response to determining (e.g., selecting) the second PRACH resource.

The wireless device 110 may perform a second random access resource selection, for example, based on or in response to the failure of the one or more LBT procedures. The wireless device 110 may determine (e.g., select) a second PRACH resource of the one or more PRACH resources, for example, during the second random access resource selection. The second PRACH resource may comprise at least one second preamble and/or at least one second PRACH occasion (e.g., time, frequency, code, etc.). The wireless device 110 may send (e.g., transmit) the at least one second preamble via the at least one second PRACH occasion for the random access procedure, for example, based on or in response to determining (e.g., selecting) the second PRACH resource.

The wireless device 110 may not stop the window (e.g., ra-responseWindow), for example, if the wireless device 110 receives the random access response. The wireless device 110 may perform an LBT procedure (e.g., first LBT, second LBT or third LBT) to send (e.g., transmit) the transport block for the uplink transmission. The wireless device 110 may determine whether an LBT procedure is successful. The wireless device 110 may stop (e.g., cease, pause, halt) the window (e.g., ra-responseWindow), for example, based on or in response to determining (e.g., detecting) the success of the LBT procedure. The wireless device 110 may send (e.g., transmit) the transport block for the uplink transmission, for example, based on or in response to determining (e.g., detecting) that one of the LBT procedures was successful. The wireless device 110 may stop (e.g., cease, pause, halt) the window (e.g., ra-responseWindow), for example, based on or in response to sending (e.g., transmitting) the transport block.

Figure 28:
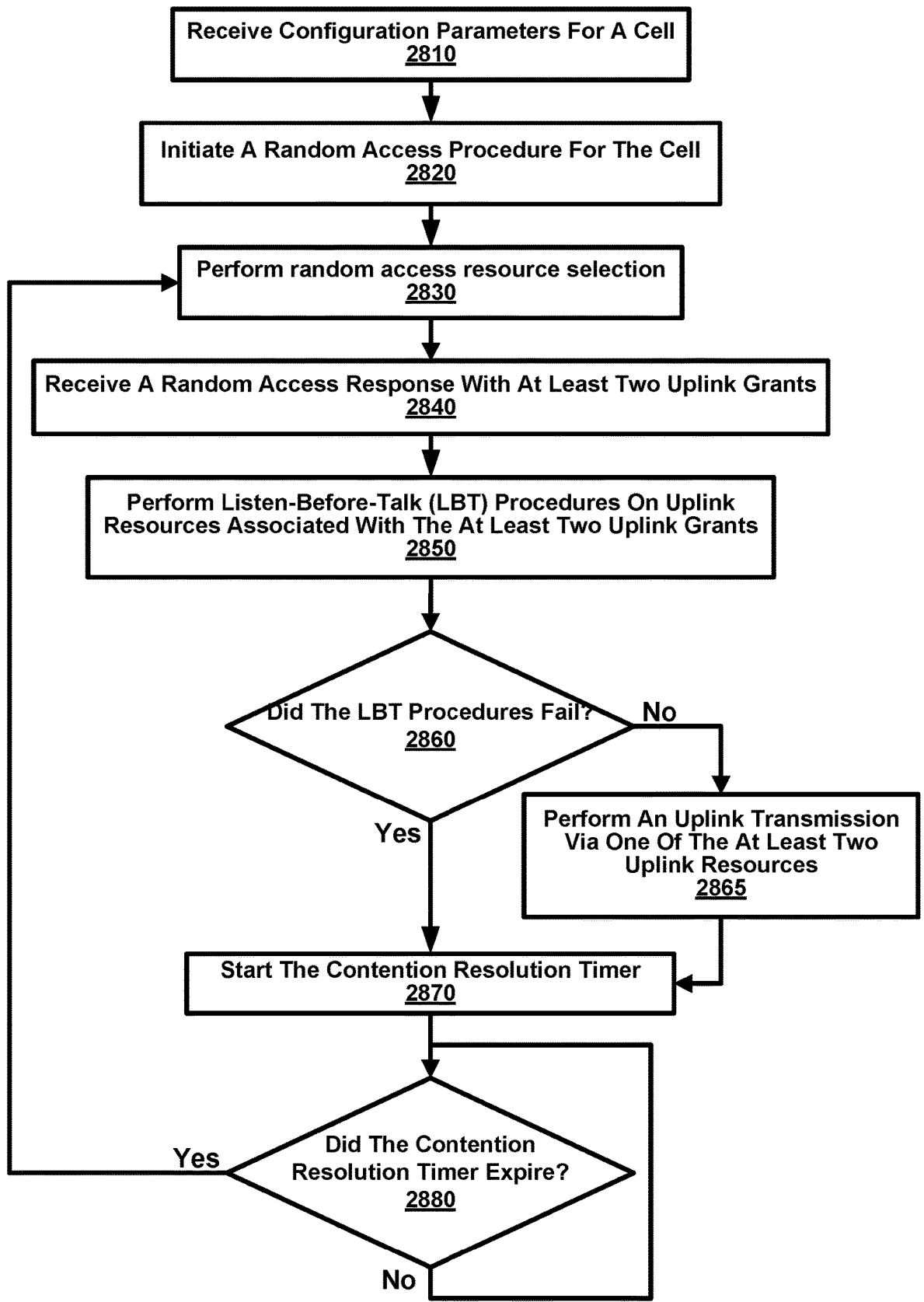
FIG. 28 shows an example flowchart of a random access procedure.

FIG. 28 shows an example flowchart of an access procedure. At step 2810, a wireless device may receive one or more messages comprising one or more configuration parameters for a cell. The one or more messages may be received from a base station. The one or more configuration parameters may indicate one or more random access channel (PRACH) resources and/or a contention resolution timer (e.g., ra-ContentionResolutionTimer).

At step 2820, the wireless device may start (e.g., initiate) a random access procedure (e.g., contention-free random access procedure, contention-based random access procedure) for the cell. The wireless device may determine (e.g., select) a random access channel (PRACH) resource of the one or more PRACH resources as part of a random access resource selection process. The wireless device may send (e.g., transmit) at least one preamble for the random access procedure via at least one RACH (e.g., time-frequency) occasion. The wireless device may monitor (e.g., listen) for a random access response (RAR) corresponding to the at least one preamble, for example, based on or in response to sending (e.g., transmitting) the at least one preamble.

At step 2830, the wireless device may perform a random access resource selection. The wireless device may determine (e.g., select) a random access channel (RACH) resource, for example, as part of the random access resource selection. The RACH resource may comprise at least one preamble. The RACH resource may comprise at least one RACH occasion (e.g., time resource/occasion, frequency resource/occasion, code, etc.). The wireless device may send (e.g., transmit) a preamble via the at least one RACH occasion. At step 2840, the wireless device may receive the random access response corresponding to the at least one preamble. The random access response may comprise at least two UL grants. At step 2850, the wireless device may perform one or more LBT procedures on uplink resources associated with each of the at least two UL grants. At step 2860, the wireless device may determine whether the LBT procedures on the uplink resources associated with each of the at least two UL grants failed. As discussed above, an LBT procedure may fail, for example, if a resource (e.g., uplink resource) is busy/occupied (e.g., occupied by another device). At step 2865, the wireless device may perform an uplink transmission via one of the at least two UL resources, for example, if one of the LBT procedures was successful (e.g., was not occupied by another device). Performing the uplink transmission may comprise sending (e.g., transmitting) one or more transport blocks via the uplink resource.

At step 2870, the wireless device may start (e.g., commence, initiate) the contention resolution timer (e.g., ra-ContentionResolutionTimer). The contention resolution timer may be started, for example, if each of the LBT procedures failed. Additionally or alternatively, the contention resolution timer may be started, for example, based on or in response to the wireless device sending (e.g., transmitting) one or more transport blocks via the at least one uplink grant. At step 2880, the wireless device may determine (e.g., detect) whether the contention resolution timer (e.g., ra-ContentionResolutionTimer) has expired. The wireless device may continue to monitor for a DCI (e.g., Msg3 and/or Msg 4 retransmission), for example, if the contention resolution timer (e.g., ra-ContentionResolutionTimer) has not expired. The wireless device may fall back to a new random access resource selection procedure, for example, if the contention resolution timer expires and/or the wireless device has not received one or more messages in response to the one or more transport blocks sent (e.g., transmitted) by the wireless device. The wireless device may fallback and perform a new random access resource selection procedure, for example, if the contention resolution timer expires and/or the wireless device has not received one or more messages in response to the one or more transport blocks sent (transmitted) by the wireless device.

Figure 29:
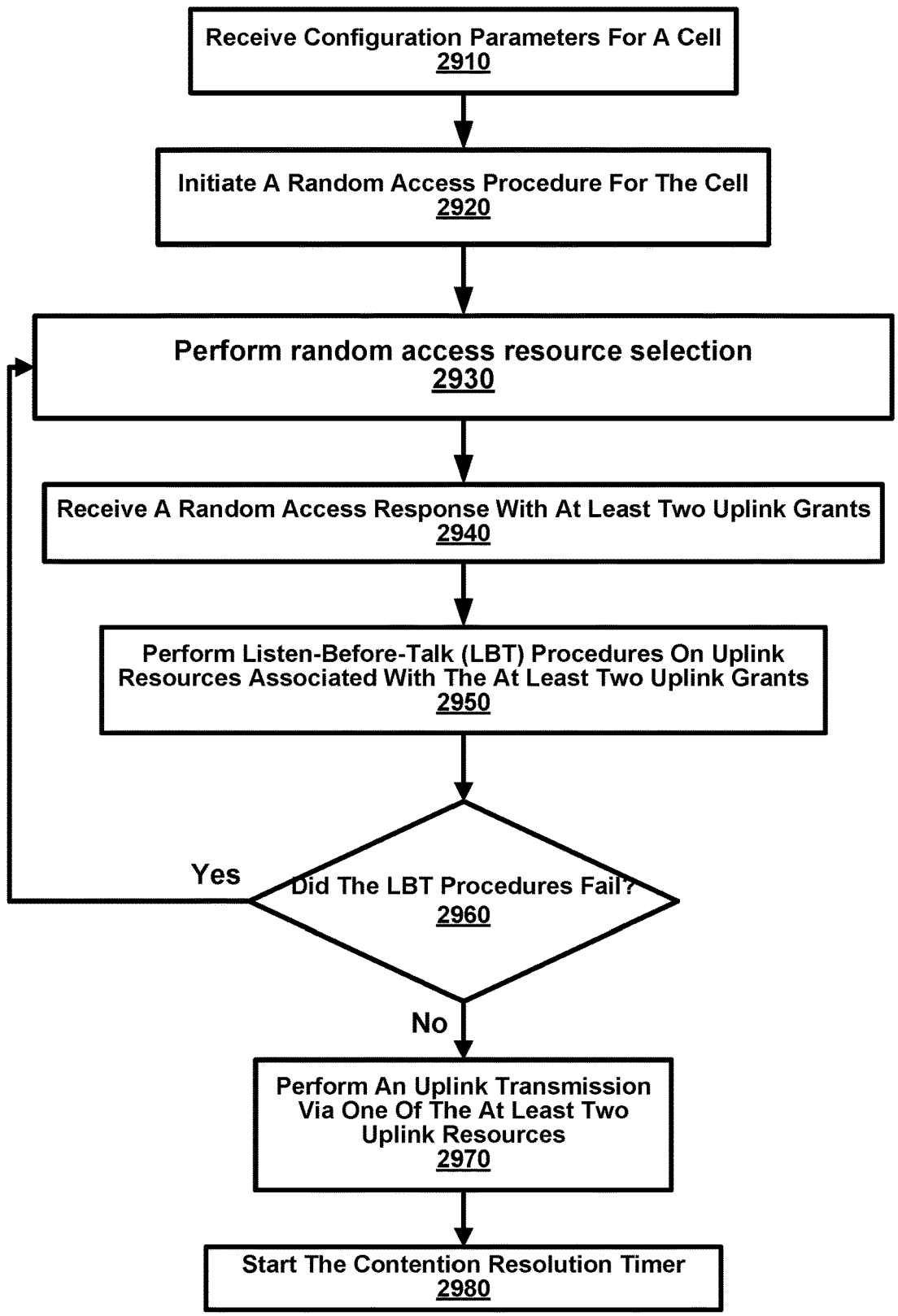
FIG. 29 shows an example flowchart of a random access procedure.

FIG. 29 shows an example flowchart of an access procedure. At step 2910, a wireless device may receive one or more messages comprising one or more configuration parameters for a cell. The one or more messages may be received from a base station. The one or more configuration parameters may indicate one or more random access channel (PRACH) resources and/or a contention resolution timer (e.g., ra-ContentionResolutionTimer).

At step 2920, the wireless device may start (e.g., initiate) a random access procedure (e.g., contention-free random access procedure, contention-based random access procedure) for the cell. The wireless device may determine (e.g., select) a random access channel (PRACH) resource of the one or more PRACH resources as part of a random access resource selection process. The wireless device may send (e.g., transmit) at least one preamble for the random access procedure via at least one RACH (e.g., time-frequency) occasion. The wireless device may monitor (e.g., listen) for a random access response (RAR) corresponding to the at least one preamble, for example, based on or in response to sending (e.g., transmitting) the at least one preamble.

At step 2930, the wireless device may perform a random access resource selection. The wireless device may determine (e.g., select) a random access channel (RACH) resource, for example, as part of the random access resource selection. The RACH resource may comprise at least one preamble. The RACH resource may comprise at least one RACH occasion (e.g., time resource/occasion, frequency resource/occasion, code, etc.). The wireless device may send (e.g., transmit) a preamble via the at least one RACH occasion.

At step 2940, the wireless device may receive the random access response corresponding to the at least one preamble. The random access response may comprise at least two UL grants. At step 2950, the wireless device may perform one or more LBT procedures on uplink resources associated with each of the at least two UL grants. At step 2960, the wireless device may determine whether the LBT procedures on the uplink resources associated with each of the at least two UL grants failed. As discussed above, an LBT procedure may fail, for example, if a resource (e.g., uplink resource) is busy/occupied (e.g., occupied by another device). The wireless device may perform a new random access resource selection in step 2930, for example, if each of LBT procedures performed on the uplink resources fails. At step 2970, the wireless device may perform an uplink transmission via one of the at least two UL resources, for example, if one of the LBT procedures was successful (e.g., was not busy). Performing the uplink transmission may comprise sending (e.g., transmitting) one or more transport blocks via the uplink resource. At step 2980, the wireless device may start (e.g., initiate, commence) the contention resolution timer (e.g., ra-ContentionResolutionTimer). The contention resolution timer may be started (e.g., initiated, commenced), for example, based on or in response to the wireless device sending (e.g., transmitting) one or more transport blocks via the at least one uplink grant.

A wireless device may perform an initial transmission of a message of an access procedure with an RV equal to zero. Re-sending (e.g., re-transmitting) the message may be scheduled by the base station via information indicating a value of the RV for resending (e.g., retransmitting). In a two-step random access procedure, the wireless device may transmit a plurality of messages in the first step of the two-step random access procedure. The base station may not be aware of the two-step random access procedure, for example, if the base station cannot decode a first message. The base station may not reschedule a second message for re-sending (e.g., re-transmission), for example, because the base station may not be aware of the second message. The wireless device may select an RV for the second message retransmission. However, the base station may not decode the second message, for example, if the RV value is not known at the base station. This operation may increase the latency of the two-step random access procedure. Further, the number of retransmissions without successful reception at the base station may increase uplink interference with other cells and/or wireless devices.

A wireless device may initially send (e.g., transmit) a message with a first redundancy version (RV), for example, if the wireless device initiates a random access procedure. Re-sending (e.g., re-transmission) of the message may be scheduled by the base station via control information. The control information may indicate the number of the RV used for re-sending (e.g., re-transmitting) the message. Using different RV numbers for re-sending (e.g., re-transmitting) the message may increase successful decoding probability of the message, for example, by permitting the base station to combine different RV sequences (e.g., by enhancing energy at each combining).

A wireless device may send (e.g., transmit) a random access preamble and a transport block in the first step of the two-step random access procedure, for example, if the wireless device initiates a two-step contention-free random access procedure. The wireless device may send (e.g., transmit) the transport block with a first RV. Misalignment between the wireless device and the base station may be avoided, for example, if the base station is aware that retransmissions may be performed with an RV. The probability of successful reception at the base station may also be increased, for example, if sending/re-sending (e.g., transmitting/re-transmitting) with an RV.

The base station may not receive the preamble and the transport block. Therefore, the base station may not transmit a random access response. The wireless device may re-send (e.g., re-transmit) the preamble and the transport block, for example, if wireless device does not receive the random access response. The wireless device may retransmit the transport block with a second RV different from the first RV, for example, if the base station and wireless device determine/agree that the random access procedure is a contention-free random access procedure. The base station may combine the first RV and the second RV to increase the energy of the transport block. This combining may increase the decoding probability of the transport block leading to fast completion of the random access procedure. The base station may combine the retransmissions resulting in code rate gain, for example, as additional parity and redundant information bits are transmitted in each retransmission. The base station may gain extra information of the transport block at each retransmission.

A wireless device may send (e.g., transmit) a first message and a second message in the first step of a two-step random access procedure, for example, if the wireless device initiates the two-step random access procedure. The base station may transmit a regular (e.g., legacy) RAR to the wireless device, for example, if the base station can only detect the first message. The wireless device may fall back to a four-step random access, for example, based on receiving the regular RAR. The wireless device may not know which RV to use to send (e.g., transmit) the second message of the four-step random access procedure.

As described herein, a wireless device may re-send (e.g., re-transmit) a transport block with the RV equal to zero, for example, if the random access procedure is a two-step random access procedure or a four-step random access procedure. The wireless device may send (e.g., transmit) one or more transport blocks with an RV equal to zero, for example, if the wireless device falls-back to 4-step RACH procedure. By using RV equal zero in transmissions/retransmissions of a transport block, latency may be reduced.

A base station may send (e.g., transmit) one or more downlink control signals and/or messages to the wireless device, which may indicate a fixed redundancy version (RV) sequence to use for re-sending (e.g., re-transmitting) one or more transport blocks during a two-step random access procedure. A wireless device may re-send (e.g., re-transmit) the one or more transport blocks based on the fixed RV sequence, for example, if the two-step random access procedure is a contention-free random access procedure. The wireless device may re-send (e.g., re-transmit) the one or more transport blocks with an RV equal to zero (0), for example, if the two-step random access procedure is a contention-based random access procedure or if the wireless device falls back to a four-step random access procedure as described above.

In RV combining, the wireless device may add additional redundancy bits to each transmission. This may also be referred to as "implicit link adaptation." The wireless device may only retransmit, for example, if the previous transmission was not received by the base station. Unlike explicit link adaptation, RV combining does not require any channel estimation and therefore, works equally well regardless of the speed at which the wireless device may be moving. Additionally, the base station may complete reception of the second message (and/or Msg3) earlier, for example, with RV combining. With an early successful reception of msg3, the wireless device may not need to transmit additional Msg3 retransmissions, for example, based on early successful reception of Msg3. This may result in saving power consumption for the wireless device and/or reduce uplink interference to other wireless devices and/or cells. The wireless device may complete the two-step random-access procedure earlier, for example, based on early successful Msg3 reception. Two-step random-access procedure may also be initiated for a beam failure recovery procedure. The wireless device may send (e.g., transmit) the candidate beam information to the base station, for example, using one or more transport blocks (e.g., Msg3). The wireless device may not declare radio link failure due to prolonged beam failure recovery procedure, for example, based on receiving a message from the base station that indicates that the message was received successfully.

Figure 30:
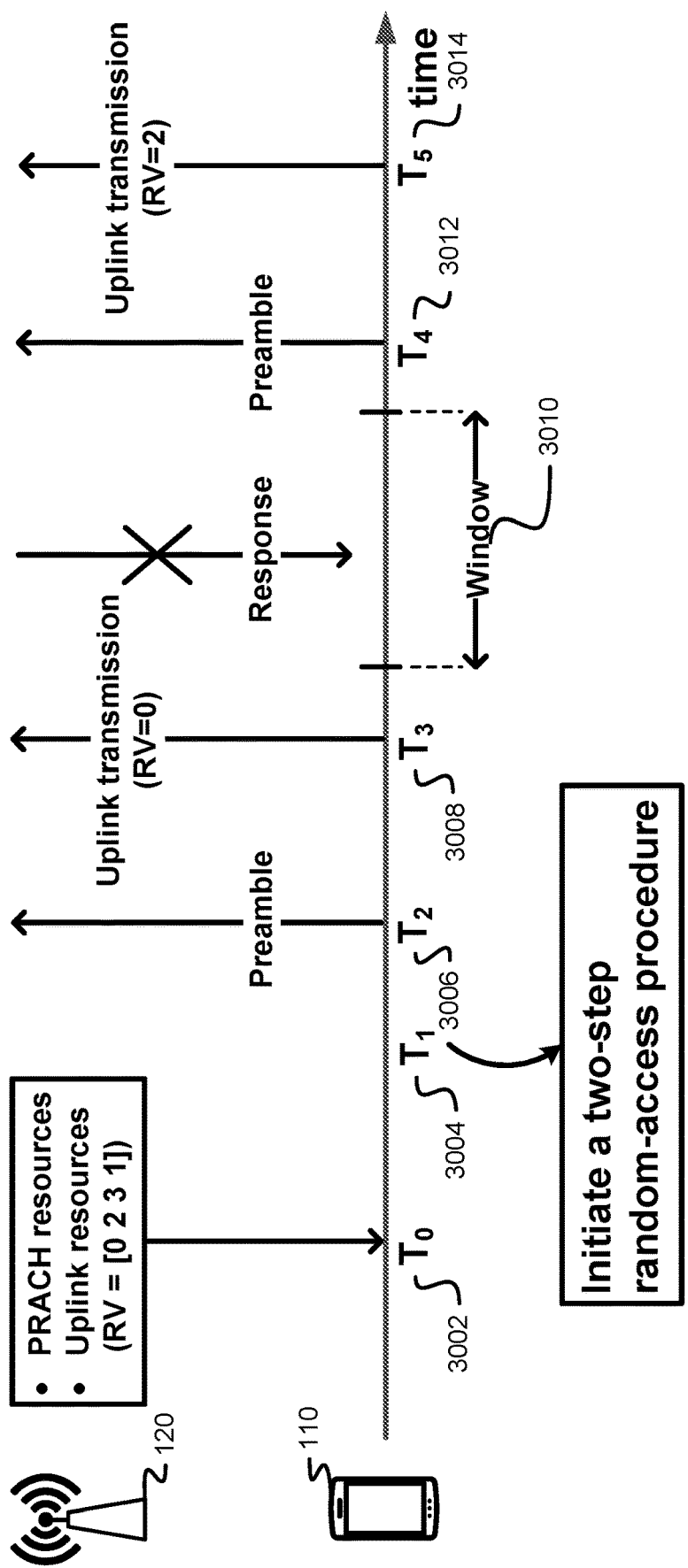
FIG. 30 shows an example of a random access procedure.

FIG. 30 shows an example of a random access procedure. At time $T_0$ 3002, a wireless device 110 may receive one or more configuration parameters from a base station 120. The configuration parameters may comprise configuration parameters for a two-step random access (RA) procedure of a cell (e.g., PCell, SCell). The one or more configuration parameters may indicate (e.g., identify) one or more PRACH resources (e.g., PRACH resources in FIG. 30). The one or more PRACH resources may comprise one or more RAPs. The one or more PRACH resources may comprise one or more RACH occasions (e.g., time/frequency occasion). The one or more configuration parameters may indicate (e.g., identify) one or more uplink radio resources (in terms of time, frequency, code/sequence/signature). The configuration parameters may comprise one or more uplink radio resources (e.g., Uplink resources in FIG. 30). The one or more configuration parameters may indicate (e.g., identify) one or more uplink grants indicating one or more uplink radio resources (in terms of time, frequency, code/sequence/signature).

The base station 120 may broadcast one or more uplink radio resources (in terms of time, frequency, code/sequence/signature). A plurality of wireless devices (in the cell) may share the one or more uplink radio resources, for example, based on or in response to broadcasting the one or more uplink resources. The one or more configuration parameters may indicate (e.g., identify) one or more associations (e.g., mappings) between the one or more uplink radio resources and the one or more PRACH resources. The one or more configuration parameters may indicate (e.g., identify) one or more associations (e.g., mappings) between the one or more uplink radio resources and the one or more RAPs of the one or more PRACH resources. The one or more configuration parameters may indicate (e.g., identify) one or more associations (e.g., mappings) between the one or more uplink radio resources and the one or more RACH occasions of the one or more PRACH resources. The one or more associations (e.g., mappings) may be one-to-one, many-to-one, one-to-many, and/or many-to-many as discussed in greater detail below with respect to FIG. 31.

The one or more configuration parameters may indicate (e.g., identify) a redundancy version (RV) sequence (e.g., [0 0 0 0], [0 2 3 1], [0 3 0 3]) for the one or more uplink radio resources. As shown in FIG. 30, the redundancy version sequence may be [0 2 3 1]. A size (e.g., length) of the RV sequence may be a first size (e.g., 4). The size (e.g., length) of the RV sequence may be the number of elements in the RV sequence. The size of the RV sequence may be four, for example, if the RV sequence [0 1 2 3]. The first size of the RV sequence may be five, for example, if the RV sequence is [0 1 2 3 0].

At time $T_1$ 3004, the wireless device 110 may start (e.g., initiate) a two-step random access procedure (e.g., contention-free random access procedure, contention-based random access procedure) for the cell. The wireless device 110 may perform a first random access resource selection, for example, based on or in response to starting (e.g., initiating) the two-step random access procedure. The wireless device 110 may determine (e.g., select) a random access channel (PRACH) resource of the one or more PRACH resources for the first random access selection. The PRACH resource may comprise at least one preamble. The PRACH resource may comprise at least one PRACH occasion (e.g., time resource/occasion, frequency resource/occasion, code, etc.).

The wireless device may determine (e.g., select) at least one UL radio resource of the one or more uplink radio resources, for example, if the wireless device performs the first random access resource selection for the two-step random access procedure. The first random access resource selection may be based on the one or more associations (e.g., mappings). The PRACH resource may be (e.g., one-to-one, one-to-many, many-to-one) associated (e.g., mapped) with the at least one UL radio resource (or at least one uplink grant). The at least one UL radio resource may comprise a time resource (e.g., occasion) and/or a frequency resource (e.g., occasion) for an uplink transmission of a transport block (e.g., Msg3, PUSCH). The PRACH resource being associated (e.g., mapped) with the at least one UL radio resource may comprise the at least one preamble of the PRACH resource being associated (e.g., mapped) with the at least one UL radio resource. The PRACH resource being associated (e.g., mapped) with the at least one UL radio resource may comprise the at least one PRACH occasion of the PRACH resource being associated (e.g., mapped) with the at least one UL radio resource.

At time $T_2$ 3006, the wireless device 110 may send (e.g., transmit) the at least one preamble for the two-step random access procedure via the at least one PRACH occasion. The at least one preamble may be sent (e.g., transmitted) via the at least one PRACH occasion, for example, based on the first random access selection. At time $T_3$ 3008, the wireless device 110 may send (e.g., transmit) the transport block for the uplink transmission for the two-step random access procedure via the at least one UL radio resource. The transport block may be sent (e.g., transmitted), for example, based on or in response to the determining (e.g., selecting) the at least one UL radio resource. The wireless device 110 may send (e.g., transmit) the transport block with a first redundancy version (RV) in the RV sequence (e.g., the first RV is 0 in FIG. 30). The first RV may have a first index in the redundancy version sequence. In a redundancy version sequence [0 2 3 1], the first index may be equal to 1 if the first RV is 0; the first index may be equal to 2 if the first RV is 2; the first index may be equal to 3 if the first RV is 3; and the first index may be equal to 4 if the first RV is 1. In another example with a redundancy version sequence [0 1 2 3], the first index may be equal to 1 if the first RV is 0; the first index may be equal to 2 if the first RV is 1; the first index may be equal to 3 if the first RV is 2; and the first index may be equal to 4 if the first RV is 3.

Sending (e.g., transmitting) the at least one preamble may overlap in time and/or in frequency (partially or entirely) with the uplink transmission of the transport block. The at least one PRACH occasion may be multiplexed with the at least one UL radio resource in the time and/or frequency domain (e.g., TDM-ed, FDM-ed). The wireless device 110 may send (e.g., transmit) the at least one preamble and/or the at least one UL radio resource simultaneously (e.g., $T_2$ 3006 and $T_3$ 3008 may be the same), for example, if the at least one PRACH occasion is multiplexed with the at least one UL radio resource in a frequency domain. The wireless device 110 may send (e.g., transmit) the at least one preamble and/or the transport block at different times with a time gap (e.g., $T_2$ 3006 and $T_3$ 3008 may be different), for example, if the at least one PRACH occasion is multiplexed with the at least one UL radio resource in a time domain. The wireless device 110 may monitor (e.g., listen) for a response (e.g., random access response, two-step Msg2, MsgB) from the base station 120, for example, based on or in response to sending (e.g., transmitting) the at least one preamble and/or the transport block. The response may correspond to the at least one preamble, the transport block, and/or both.

The base station 120 may detect the at least one preamble and/or the transport block. In response to the detecting, the response sent (e.g., transmitted) from the base station may correspond to the at least one preamble and/or the transport block. The base station 120 may detect the at least one preamble, but not detect the transport block. The response sent (e.g., transmitted) from the base station 120 may correspond to the at least one preamble, for example, based on or in response to detecting the at least one preamble, but not detecting the transport block.

The base station may detect the transport block, but not detect the at least one preamble. The response sent (e.g., transmitted) from the base station 120 may correspond to the transport block, for example, based on or in response to detecting the transport block, but not detecting the at least one preamble.

The response may comprise at least one of following: an RAR UL grant (e.g., radio resource assignment, and/or MCS), a wireless device ID for contention resolution (e.g., a contention resolution message), an RNTI (e.g., C-RNTI or TC-RNTI), and/or other information. The response (e.g., an RAR) may comprise a preamble identifier corresponding to the at least one preamble, a positive (ACK) or negative acknowledgement (NACK) of a reception of the transport block, and/or an indication of a successful decoding of the transport block. The wireless device 110 may send (e.g., transmit) a second transport block, for example, based on the response received from the base station 120.

Monitoring (e.g., listening) for the response may comprise attempting to detect DCI (e.g., DCI format 1_0) during a window 3010 (e.g., ra-responseWindow). The one or more configuration parameters may indicate (e.g., identify) the window 3010. The wireless device 110 may not receive the response during the window 3010 (e.g., ra-responseWindow). Not receiving the response may comprise not receiving the response corresponding to the at least one preamble and/or the transport block. The wireless device 110 may determine (e.g., consider) that the two-step random access procedure is incomplete (e.g., preamble transmission counter variable is less than preamble maximum transmission parameter plus one), for example, based on or in response to not receiving a response from the base station 120.

The wireless device 110 may perform a second random access resource selection, for example, based on or in response to not receiving the response during the window 3010. Failure to receive the response during the window 3010 may indicate the random access procedure is incomplete. The wireless device 110 may determine (e.g., select, choose) a second PRACH resource of the one or more PRACH resources for the second random access selection. The PRACH resource may comprise at least one second preamble and/or at least one second PRACH occasion (e.g., time resource/occasion, frequency resource/occasion, code, etc.).

The wireless device 110 may determine (e.g., select) at least one second UL radio resource of the one or more uplink radio resources, for example, if the wireless device 110 performs the second random access resource selection for the two-step random access procedure based on the one or more associations (e.g., mappings). The second PRACH resource may be (e.g., one-to-one, one-to-many, many-to-one) associated (e.g., mapped) with the at least one second UL radio resource (or at least one uplink grant). The at least one second UL radio resource may comprise a second time resource (e.g., occasion) and/or a second frequency resource (e.g., occasion) for a second uplink transmission of a second transport block (e.g., Msg3, PUSCH). The second PRACH resource may comprise the at least one second preamble of the second PRACH resource being associated (e.g., mapped) with the at least one second UL radio resource. The second PRACH resource may comprise the at least one second PRACH occasion of the second PRACH resource being associated (e.g., mapped) with the at least one second UL radio resource. The transport block and/or the second transport block may be the same. The transport block and/or the second transport block may be different.

At time $T_4$ 3012, the wireless device 110 may send (e.g., transmit) the at least one second preamble for the two-step random access procedure via the at least one second PRACH occasion. The wireless device 110 may send (e.g., transmit) the at least one second preamble for the two-step random access procedure, for example, based on the second random access selection.

At time $T_5$ 3014, the wireless device 110 may send (e.g., transmit) the second transport block for the second uplink transmission for the two-step random access procedure via the at least one second UL radio resource. the wireless device 110 may send (e.g., transmit) the second transport block for the second uplink transmission for the two-step random access procedure, for example, based on or in response to the determining (e.g., selecting) the at least one second UL radio resource.

The wireless device 110 may send (e.g., transmit) the second transport block with a second redundancy version (RV) in the RV sequence (e.g., the second RV is equal to two in FIG. 30). The second RV may have a second index in the redundancy version sequence. The second index may be equal to the first index plus one. In an RV sequence [0 2 3 1], the first RV may be 0 if the first index of the first RV is equal to one, and the second RV may be 2 if the second index of the second RV is equal to two (e.g., the first index plus one). In an RV sequence [0 2 3 1], the first RV may be 3 if the first index of the first RV is equal to three, and the second RV may be 1 if the second index of the second RV is four (e.g., the first index plus one). The first index may be equal to the size (e.g., length) of the RV sequence (e.g., the first size is four in FIG. 30). The second index may be one, for example, in response to the first index being equal to the size (e.g., length) of the RV sequence. In an RV sequence [0 2 3 1] with the first index of the first RV (e.g., 1) equal to four, which may be the same size (e.g., length) of the RV sequence [0 2 3 1], the second RV may be 0. The second index of the second RV (e.g., 0) may be one.

The wireless device 110 may determine the second index of the second RV using a formula. The formula may be mod(the first index+1, the size(e.g., length) of the RV sequence).

Given two positive numbers, a (the dividend) and n (the divisor), mod (a, n) is the remainder of the Euclidean division of a by n. For example, mod (5,3)=2, mod (6,3)=0, mod (5,1)=0, mod (5,5)=0.

Based on the formula above, the second index of the second RV is equal to mod (1+1,4)=2, for example, if a redundancy version sequence is [0 2 3 1] and the first index of the first RV (e.g., 0) is one. The second RV may be 2, for example, based on the second index being equal to two, which indicates 2 in the RV sequence. Based on the formula, the second index of the second RV may be equal to mod (4+1,4)=1, for example, if RV sequence is [0 2 3 1] and the first index of the first RV (e.g., 1) is four. The second RV may be 0, for example, in response to the second index being equal to one indicating 0 in the RV sequence.

The wireless device 110 may set a redundancy version to a first value, for example, for the $n^{th}$ transmission. The first value may be computed from a second formula as a value of the (mod(n−1, the size (e.g., length) of the RV sequence)+ 1)$^{th}$ entry in the RV sequence. The wireless device 110 may determine n=1 for the uplink transmission of the transport block at time $T_3$ 3008, for example, if the RV sequence is [0 2 3 1]. Based on the second formula (e.g., mod (1−1,4)+ 1=1), the wireless device 110 may set the first redundancy version for the uplink transmission to a 1st element (e.g., 0) in the RV sequence. The wireless device may determine n=2 for the second uplink transmission of the second transport block at time $T_5$ 3014, for example, if the RV sequence is [0 2 3 1]. Based on the second formula (e.g., mod (2−1,4)+ 1=2), the wireless device 110 may set the second RV for the second uplink transmission to a $2^{nd}$ element (e.g., 2) in the RV sequence.

Figure 31:
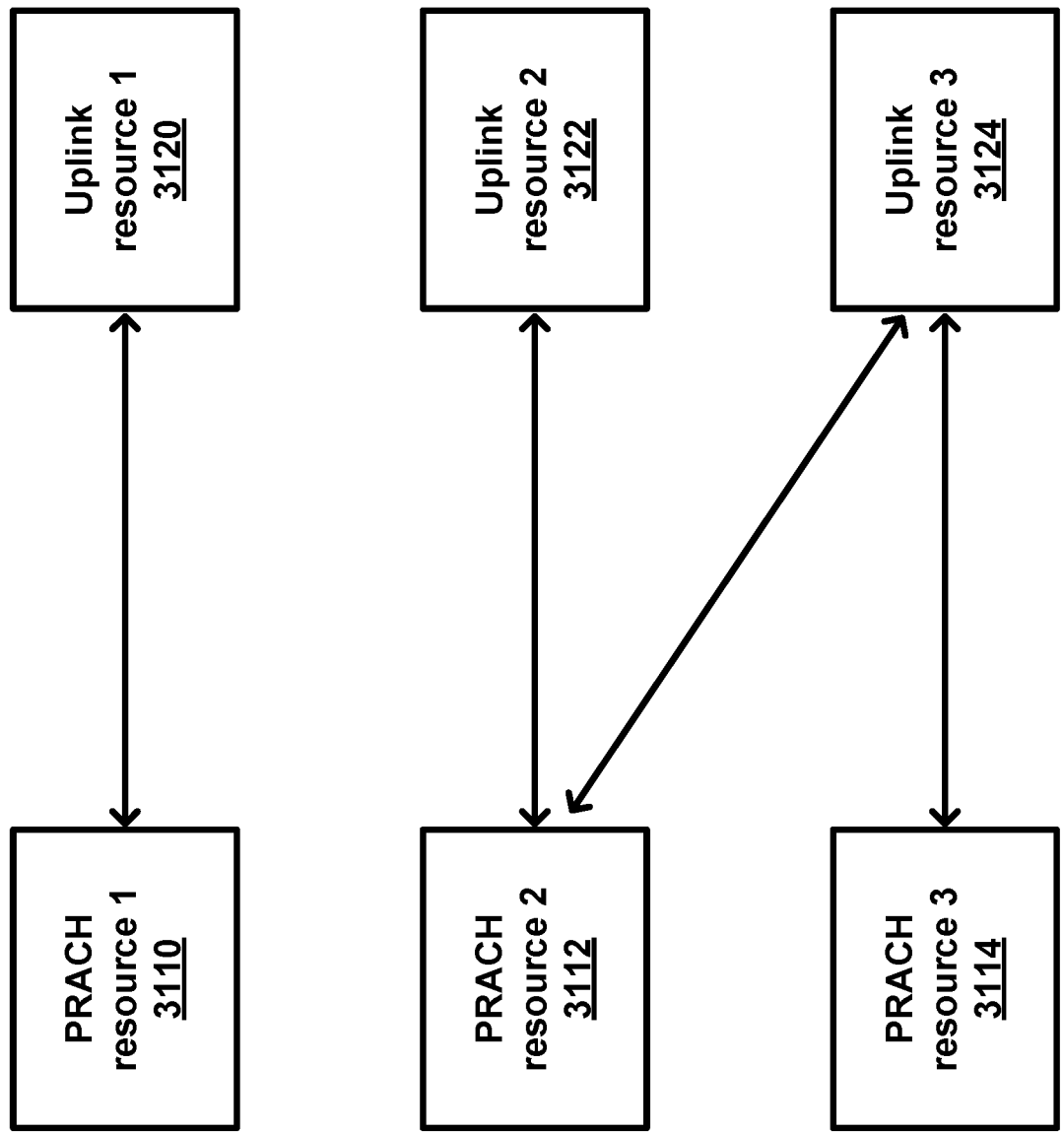
FIG. 31 shows an example of association/mapping in a two-step random access procedure.

FIG. 31 shows that PRACH resource 1 3110 may be one-to-one associated (e.g., mapped) with uplink resource 1 3120. The wireless device may determine (e.g., select, choose) the uplink resource 1 3120 for an uplink transmission of a transport block (e.g., Msg3), for example, based on the one-to-one association (e.g., mapping) between PRACH resource 1 3110 and uplink resource 1 3120. The wireless may determine (e.g., select, choose) the uplink resource 1 3120, for example, if the wireless device selects the PRACH resource 1 3110 for a two-step random access procedure. The base station may determine that the wireless device selected the PRACH resource 1 3110 for a two-step random access procedure, for example, if the base station receives a transport block on the uplink resource 1 3120. The base station may determine that the wireless device selected the PRACH resource 1 3110 for a two-step random access procedure, for example, based on the one-to-one association (e.g., mapping) between PRACH resource 1 3110 and uplink resource 1 3120.

FIG. 31 also shows that PRACH resource 2 3112 may be associated with (e.g., mapped to) uplink resource 2 3122 and/or uplink resource 3 3124 via a one-to-many association (e.g., mapping). The wireless device may determine (e.g., select, choose) the uplink resource 2 3122 and/or the uplink resource 3 3124 for an uplink transmission of a transport block (e.g., Msg3), for example, if the wireless device determines (e.g., selects) the PRACH resource 2 3112 for a two-step random access procedure. The wireless device may determine (e.g., select, choose) the uplink resource 2 3122 for an uplink transmission of a transport block (e.g., Msg3), for example, based on the one-to-many association (e.g., mapping) between PRACH resource 2 3112 and uplink resource 2 3122 and/or uplink resource 3 3124. The base station may determine that the wireless device selected the PRACH resource 2 3112 for a two-step random access procedure, for example, if the base station receives a transport block on the uplink resource 2 and/or the uplink resource 3. The base station may determine that the wireless device selected the PRACH resource 2 3112 for a two-step random access procedure, for example, based on the one-to-many association (e.g., mapping) between PRACH resource 2 3112 and Uplink resource 2 3122 and/or Uplink resource 3 3124.

FIG. 31 shows that uplink resource 3 3124 may be a many-to-one association (e.g., mapped) with PRACH resource 2 3112 and/or PRACH resource 3 3114. The wireless device may determine (e.g., select) the uplink resource 3 3124 for an uplink transmission of a transport block (e.g., Msg3), for example, if the wireless device selects the PRACH resource 2 3112 and/or the PRACH resource 3 for 3114 a two-step random access procedure. The wireless device may determine (e.g., select) the uplink resource 3 3124 for an uplink transmission of a transport block (e.g., Msg3), for example, in response to the many-to-one association (e.g., mapping) between uplink resource 3 3124 and PRACH resource 2 3112 and/or PRACH resource 3 3114. The base station may determine that the wireless device selected the PRACH resource 2 3112 and/or the PRACH resource 3 3114 for a two-step random access procedure, for example, if the base station receives a transport block on the uplink resource 3 3124. The base station may determine that the wireless device selected the PRACH resource 2 3112 and/or the PRACH resource 3 3114 for a two-step random access procedure, for example, based on in response to the many-to-one association (e.g., mapping) between uplink resource 3 3124 and PRACH resource 2 3112 and/or PRACH resource 3 3114.

Figure 32:
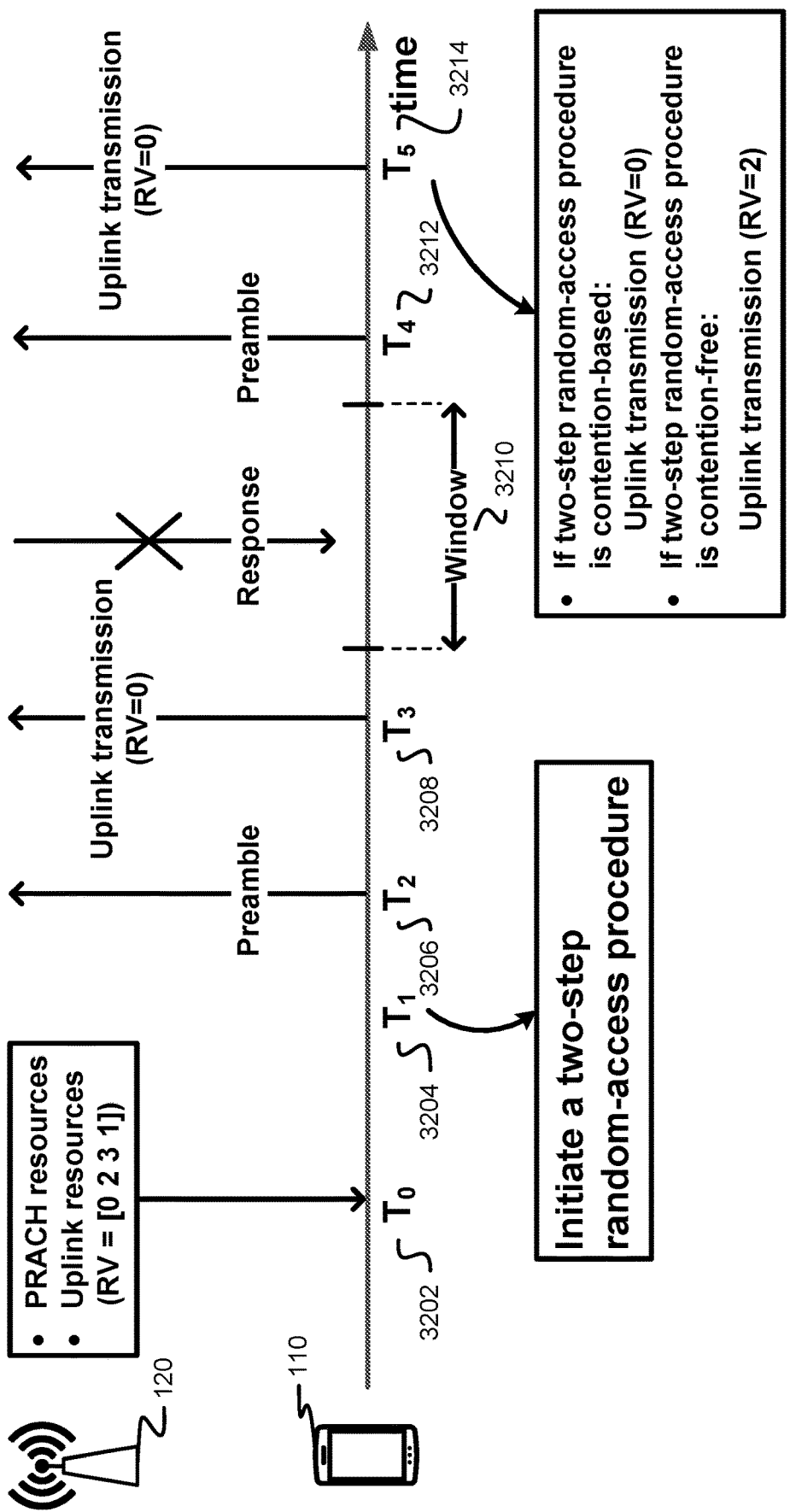
FIG. 32 shows an example of a random access procedure.

FIG. 32 shows an example of a random access procedure. At time $T_0$ 3202, a wireless device 110 may receive one or more configuration parameters from a base station 120. The configuration parameters may comprise configuration parameters for a two-step random access (RA) procedure of a cell (e.g., PCell, SCell). The one or more configuration parameters may indicate (e.g., identify) one or more PRACH resources (e.g., PRACH resources in FIG. 32). The one or more PRACH resources may comprise one or more RAPs. In an example, the one or more PRACH resources may comprise one or more RACH occasions (e.g., time/frequency occasion). The one or more configuration parameters may indicate one or more uplink radio resources (e.g., in terms of time, frequency, code/sequence/signature). The configuration parameters may comprise one or more uplink radio resources (e.g., Uplink resources in FIG. 32). The one or more configuration parameters may indicate one or more uplink grants indicating one or more uplink radio resources (in terms of time, frequency, code/sequence/signature).

At time $T_1$ 3204, the wireless device 110 may start (e.g., initiate) a two-step random access procedure (e.g., contention-free random access procedure, contention-based random access procedure) for the cell. The wireless device 110 may perform a first random access resource selection, for example, based on or in response to initiating the two-step random access procedure. The wireless device 110 may determine (e.g., select) a random access channel (PRACH) resource of the one or more PRACH resources for the first random access selection. The PRACH resource may comprise at least one preamble. The PRACH resource may comprise at least one PRACH occasion (e.g., time resource/occasion, frequency resource/occasion, code, etc.).

At time $T_2$ 3206, the wireless device 110 may send (e.g., transmit) the at least one preamble for the two-step random access procedure via the at least one PRACH occasion. The at least one preamble may be sent (e.g., transmitted) via the at least one PRACH occasion, for example, based on the first random access selection. At time $T_3$ 3208, the wireless device 110 may send (e.g., transmit) the transport block for the uplink transmission for the two-step random access procedure via the at least one UL radio resource. The transport block may be sent (e.g., transmitted), for example, based on or in response to the determining (e.g., selecting)

the at least one UL radio resource. The wireless device 110 may send (e.g., transmit) the transport block with a first redundancy version (RV) in the RV sequence (e.g., the first RV is 0 in FIG. 30). The first RV may have a first index in the redundancy version sequence. In a redundancy version sequence [0 2 3 1], the first index may be equal to 1 if the first RV is 0; the first index may be equal to 2 if the first RV is 2; the first index may be equal to 3 if the first RV is 3; and the first index may be equal to 4 if the first RV is 1. In another example with a redundancy version sequence [0 1 2 3], the first index may be equal to 1 if the first RV is 0; the first index may be equal to 2 if the first RV is 1; the first index may be equal to 3 if the first RV is 2; and the first index may be equal to 4 if the first RV is 3.

Sending (e.g., transmitting) the at least one preamble may overlap in time and/or in frequency (partially or entirely) with the uplink transmission of the transport block. The at least one PRACH occasion may be multiplexed with the at least one UL radio resource in the time and/or frequency domain (e.g., TDM-ed, FDM-ed). The wireless device 110 may send (e.g., transmit) the at least one preamble and/or the at least one UL radio resource simultaneously (e.g., $T_2$ 3206 and $T_3$ 3208 may be the same), for example, if the at least one PRACH occasion is multiplexed with the at least one UL radio resource in a frequency domain. The wireless device 110 may send (e.g., transmit) the at least one preamble and/or the transport block at different times with a time gap (e.g., $T_2$ 3006 and $T_3$ 3008 may be different), for example, if the at least one PRACH occasion is multiplexed with the at least one UL radio resource in a time domain. The wireless device 110 may monitor (e.g., listen) for a response (e.g., random access response, two-step Msg2, MsgB) from the base station 120, for example, based on or in response to sending (e.g., transmitting) the at least one preamble and/or the transport block. The response may correspond to the at least one preamble, the transport block, and/or both.

Monitoring (e.g., listening) for the response may comprise attempting to detect DCI (e.g., DCI format 1_0) during a window 3210 (e.g., ra-responseWindow). The one or more configuration parameters may indicate the window 3210. The wireless device 110 may not receive the response during the window 3210 (e.g., ra-responseWindow). Not receiving the response may comprise not receiving the response corresponding to the at least one preamble and/or the transport block. The wireless device 110 may determine (e.g., consider) that the two-step random access procedure is incomplete (e.g., preamble transmission counter variable is less than preamble maximum transmission parameter plus one), for example, based on or in response to not receiving a response from the base station 120.

The wireless device 110 may perform a second random access resource selection, for example, based on or in response to not receiving the response during the window 3210. Failure to receive the response during the window 3210 may indicate the random access procedure is incomplete. The wireless device 110 may determine (e.g., select, choose) a second PRACH resource of the one or more PRACH resources for the second random access selection. The PRACH resource may comprise at least one second preamble and/or at least one second PRACH occasion (e.g., time resource/occasion, frequency resource/occasion, code, etc.).

The wireless device 110 may determine (e.g., select) at least one second UL radio resource of the one or more uplink radio resources, for example, if the wireless device 110 performs the second random access resource selection for the two-step random access procedure based on the one or more associations (e.g., mappings). The second PRACH resource may be (e.g., one-to-one, one-to-many, many-to-one) associated (e.g., mapped) with the at least one second UL radio resource (or at least one uplink grant). The at least one second UL radio resource may comprise a second time resource (e.g., occasion) and/or a second frequency resource (e.g., occasion) for a second uplink transmission of a second transport block (e.g., Msg3, PUSCH). The second PRACH resource may comprise the at least one second preamble of the second PRACH resource being associated (e.g., mapped) with the at least one second UL radio resource. The second PRACH resource may comprise the at least one second PRACH occasion of the second PRACH resource being associated (e.g., mapped) with the at least one second UL radio resource. The transport block and/or the second transport block may be the same. The transport block and/or the second transport block may be different.

At time $T_4$ 3212, the wireless device 110 may send (e.g., transmit) the at least one second preamble for the two-step random access procedure via the at least one second PRACH occasion. The wireless device 110 may send (e.g., transmit) the at least one second preamble for the two-step random access procedure, for example, based on the second random access selection. The two-step random access procedure may be a contention-based random access procedure. The wireless device 110 may send (e.g., transmit) the second transport block with a second redundancy version (RV) in the RV sequence, for example, based on or in response to the two-step random access procedure being the contention-based random access procedure. At time $T_5$ 3214, the second RV may be equal to the first RV (e.g., 0). The wireless device 110 may send (e.g., transmit) the transport block with the first RV (e.g., 0) at time $T_3$ 3208. At time $T_5$ 3214, the wireless device 110 may send (e.g., transmit) the second transport block with the first RV (e.g., 0), for example, for example based on or in response to the second RV being equal to the first RV.

The two-step random access procedure may be a contention-free random access procedure. The wireless device 110 may send (e.g., transmit) the second transport block with a second RV in the RV sequence, for example, based on or in response to the two-step random access procedure being the contention-free random access procedure. The wireless device may determine the second RV based on the formula (e.g., mod (the first index+1, the size (e.g., length) of the RV sequence)). At time $T_3$ 3208, the wireless device 110 may send (e.g., transmit) the transport block with the first RV (e.g., 0). At time $T_5$ 3214, the wireless device 110 may send (e.g., transmit) the second transport block with the second RV (e.g., 2), for example, based on the formula above.

Figure 33:
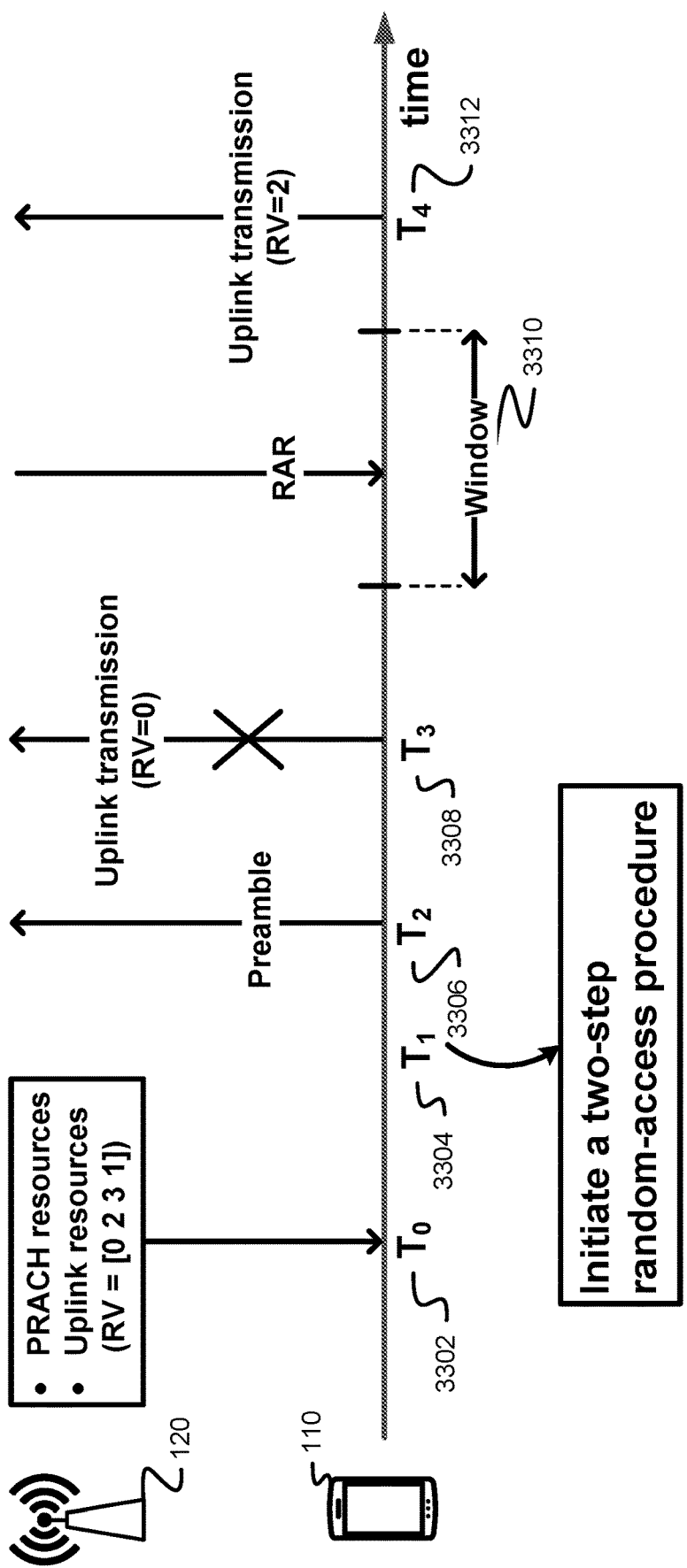
FIG. 33 shows an example of a random access procedure.

FIG. 33 shows an example of a random access procedure. At time $T_0$ 3302, a wireless device 110 may receive one or more configuration parameters from a base station 120. The configuration parameters may comprise configuration parameters for a two-step random access (RA) procedure of a cell (e.g., PCell, SCell). The one or more configuration parameters may indicate (e.g., identify) one or more PRACH resources (e.g., PRACH resources in FIG. 33). The one or more PRACH resources may comprise one or more RAPs. The one or more PRACH resources may comprise one or more RACH occasions (e.g., time/frequency occasion). The one or more configuration parameters may indicate one or more uplink radio resources (in terms of time, frequency, code/sequence/signature). The configuration parameters may comprise one or more uplink radio resources (e.g., Uplink resources in FIG. 33). The one or more configuration parameters may indicate one or more uplink grants indicating (e.g., identifying) one or more uplink radio resources (in terms of time, frequency, code/sequence/signature).

The base station 120 may broadcast one or more uplink radio resources (in terms of time, frequency, code/sequence/signature). A plurality of wireless devices (in the cell) may share the one or more uplink radio resources, for example, based on or in response to broadcasting the one or more uplink resources. The one or more configuration parameters may indicate (e.g., identify) one or more associations (e.g., mappings) between the one or more uplink radio resources and the one or more PRACH resources. The one or more configuration parameters may indicate (e.g., identify) one or more associations (e.g., mappings) between the one or more uplink radio resources and the one or more RAPs of the one or more PRACH resources. The one or more configuration parameters may indicate (e.g., identify) one or more associations (e.g., mappings) between the one or more uplink radio resources and the one or more RACH occasions of the one or more PRACH resources. The one or more configuration parameters may indicate (e.g., identify) a redundancy version (RV) sequence (e.g., [0 0 0 0], [0 2 3 1], [0 3 0]) for the one or more uplink radio resources. As shown in FIG. 33, the redundancy version sequence may be [0 2 3 1].

At time $T_1$ 3304, the wireless device 110 may start (e.g., initiate) a two-step random access procedure (e.g., contention-free random access procedure, contention-based random access procedure) for the cell. The wireless device 110 may perform a first random access resource selection, for example, based on or in response to starting (e.g., initiating) the two-step random access procedure. The wireless device 110 may determine (e.g., select) a random access channel (PRACH) resource of the one or more PRACH resources for the first random access selection. The PRACH resource may comprise at least one preamble. The PRACH resource may comprise at least one PRACH occasion (e.g., time resource/occasion, frequency resource/occasion, code, etc.).

The wireless device may determine (e.g., select) at least one UL radio resource of the one or more uplink radio resources, for example, if the wireless device performs the first random access resource selection for the two-step random access procedure. The first random access resource selection may be based on the one or more associations (e.g., mappings). The PRACH resource may be (e.g., one-to-one, one-to-many, many-to-one) associated (e.g., mapped) with the at least one UL radio resource (or at least one uplink grant). The at least one UL radio resource may comprise a time resource (e.g., occasion) and/or a frequency resource (e.g., occasion) for an uplink transmission of a transport block (e.g., Msg3, PUSCH). The PRACH resource being associated (e.g., mapped) with the at least one UL radio resource may comprise the at least one preamble of the PRACH resource being associated (e.g., mapped) with the at least one UL radio resource. The PRACH resource being associated (e.g., mapped) with the at least one UL radio resource may comprise the at least one PRACH occasion of the PRACH resource being associated (e.g., mapped) with the at least one UL radio resource.

At time $T_2$ 3306, the wireless device 110 may send (e.g., transmit) the at least one preamble for the two-step random access procedure via the at least one PRACH occasion. The at least one preamble may be sent (e.g., transmitted) via the at least one PRACH occasion, for example, based on the first random access selection. At time $T_3$ 3008, the wireless device 110 may send (e.g., transmit) the transport block for the uplink transmission for the two-step random access procedure via the at least one UL radio resource. The wireless device 110 may monitor (e.g., listen) for a response (e.g., random access response, two-step Msg2, MsgB) from the base station 120, for example, in response to sending (e.g., transmitting) the at least one preamble and/or the transport block during window 3310. The response may correspond to the at least one preamble, the transport block, and/or both.

The base station 120 may detect the at least one preamble, but not detect the transport block. The response sent (e.g., transmitted) from the base station 120 may correspond to the at least one preamble, for example, based on or in response to detecting the at least one preamble but not detecting the transport block. The response may be a random access response (RAR) corresponding to the at least one preamble. The wireless device 110 may fall back from the two-step random access procedure to a four-step random access procedure, for example, based on or in response to receiving the random access response corresponding to the at least one preamble. The two-step random access procedure may be a contention-free random access procedure.

The random access response may comprise an UL grant (e.g., RAR UL grant). The UL grant may schedule a second uplink transmission (e.g., PUSCH) for a second transport block (e.g., Msg3, PUSCH) for the four-step random access procedure. The wireless device 110 may send (e.g., transmit) the second transport block for the second uplink transmission, for example, via at least one second UL radio resource (e.g., a second time resource/occasion and/or a second frequency resource/occasion). The UL grant may indicate (e.g., identify) the at least one second UL radio resource. At time $T_4$ 3312, the wireless device 110 may send (e.g., transmit) the second transport block with a second RV in the RV sequence (e.g., the second RV is equal to two). The second RV may have a second index in the RV sequence. The second index may be equal to the first index plus one. In an RV sequence [0 2 3 1], the first RV (e.g., 0) may be equal to one if the first index is equal to one, and the second RV (e.g., 2) may be two if the second index is equal to two (e.g., the first index plus one). The first index may be equal to the size (e.g., length) of the RV sequence (e.g., as shown in FIG. 33, the first size is four). The second index may be one, for example, based on or in response to the first index being equal to the size (e.g., length) of the RV sequence. The second RV may be 0, for example, if an RV sequence is [0 2 3 1] and/or the first index of the first RV (e.g., 1) is equal to four, which is same size (e.g., length) of the RV sequence [0 2 3 1]. The second index of the second RV (e.g., 0) may be one.

The wireless device 110 may determine the second index of the second RV based on a formula. The formula may be mod (the first index+1, the size (e.g., length) of the RV sequence).

The second index of the second RV may be equal to mod (1+1,4)=2, for example, if an RV sequence is [0 2 3 1] and/or the first index of the first RV (e.g., 0) is one. The second RV may be 2, for example, based on or in response to the second index being equal to two indicating 2 in the RV sequence. The second index of the second RV may be equal to mod (4+1,4)=1, for example, if an RV sequence is [0 2 3 1] and/or the first index of the first RV (e.g., 1) is four. The second RV may be 0, for example, based on or in response to the second index being equal to one indicating 0 in the RV sequence Sending (e.g., transmitting) with different RVs (e.g., with RV=0 in the first transport block and RV=2 in the second transport block) may improve the decoding gain. The base station 120 may combine (e.g., reassemble) the transport block and/or the second transport block to improve the decoding performance. As additional parity and redundant information bits may be sent (e.g., transmitted) in each transmission, the base station 120 may combine (e.g., reassemble) the second uplink transmission with the first uplink transmission resulting in code rate gain. At each transmission the base station 120 may gain extra information. The base station 120 may not provide the wireless device 110 with the RV sequence. The wireless device 110 may set the first RV for the uplink transmission to zero, for example, based on or in response to not being provided with the RV sequence. The wireless device 110 may set the second redundancy version for the second uplink transmission to zero, for example, based on or in response to not being provided with the RV sequence.

A wireless device may send, as part of a random access procedure, a first transmission comprising a preamble and a transport block comprising a first redundancy version. The wireless device may resend the transport block with the first redundancy version based on a determination that a random access response associated with the transport block has not been received. The wireless device may receive, from a base station, one or more configuration parameters, wherein the one or more configuration parameters comprise a redundancy version sequence. The one or more configuration parameters may further comprise: one or more physical random-access channel (PRACH) resources, one or more uplink resources, and one or more mappings between the one or more PRACH resources and the one or more uplink resources. The wireless device may resend the transport block with a second redundancy version from the redundancy version sequence. The wireless device may send a random access preamble with the transport block comprising the first redundancy version as part of a two-step random access procedure. The wireless device may resend the random access preamble based on a determination that a second random access response corresponding to a random access preamble has not been received. The first redundancy version may be equal to zero. The wireless device may receive a second random access response corresponding to a random access preamble. The second random access responses may comprise an uplink grant indicating an uplink resource. The wireless device may resend the transport block via the uplink resource indicated by the uplink grant in the second random access response. The wireless device may send a second transmission comprising a second preamble as part of a second random-access procedure. The wireless device may send a third transmission as part of the second random-access procedure. The third transmission may comprise: the transport block; and a second redundancy version. The random access procedure may comprise either a contention-free random access procedure and/or a contention-based random access procedure.

A wireless device may receive one or more messages comprising one or more configuration parameters for a cell. The one or more configuration parameters may indicate a redundancy version sequence. The one or more configuration parameters may further comprise: one or more physical random access channel (PRACH) resources; one or more uplink resources; and one or more mappings between the one or more PRACH resources and the one or more uplink resources. The wireless device may start a random access procedure for the cell. The wireless device may send a transport block comprising a first redundancy version of the redundancy version sequence. The wireless device may resend the transport block with a second redundancy version of the redundancy version sequence based on a determination that a random access response corresponding to the transport block has not been received. The random-access procedure may comprise a two-step random access procedure. The wireless device may send a random-access preamble with the transport block comprising the first redundancy version. The wireless device may resend the random access preamble based on a determination that a second random access response corresponding to the random access preamble has not been received. The wireless device may determine the random access procedure for the cell based on a random access resource selection procedure. The first redundancy version and the second redundancy version may be equal.

A wireless device may receive one or more messages comprising one or more configuration parameters. The one or more configuration parameters may indicate a redundancy version sequence. The wireless device may send a transport block comprising a first redundancy version of the redundancy version sequence. The wireless device may resend the transport block with the first redundancy version based on a determination that a random access response corresponding to the transport block has not been received. The wireless device may send a random-access preamble with the transport block comprising the first redundancy version as part of a two-step random-access procedure. The wireless device may receive a second random access response corresponding to a random access preamble. The second random access response may comprise a second redundancy version. The wireless device may resend the transport block with the second redundancy version.

Figure 34:
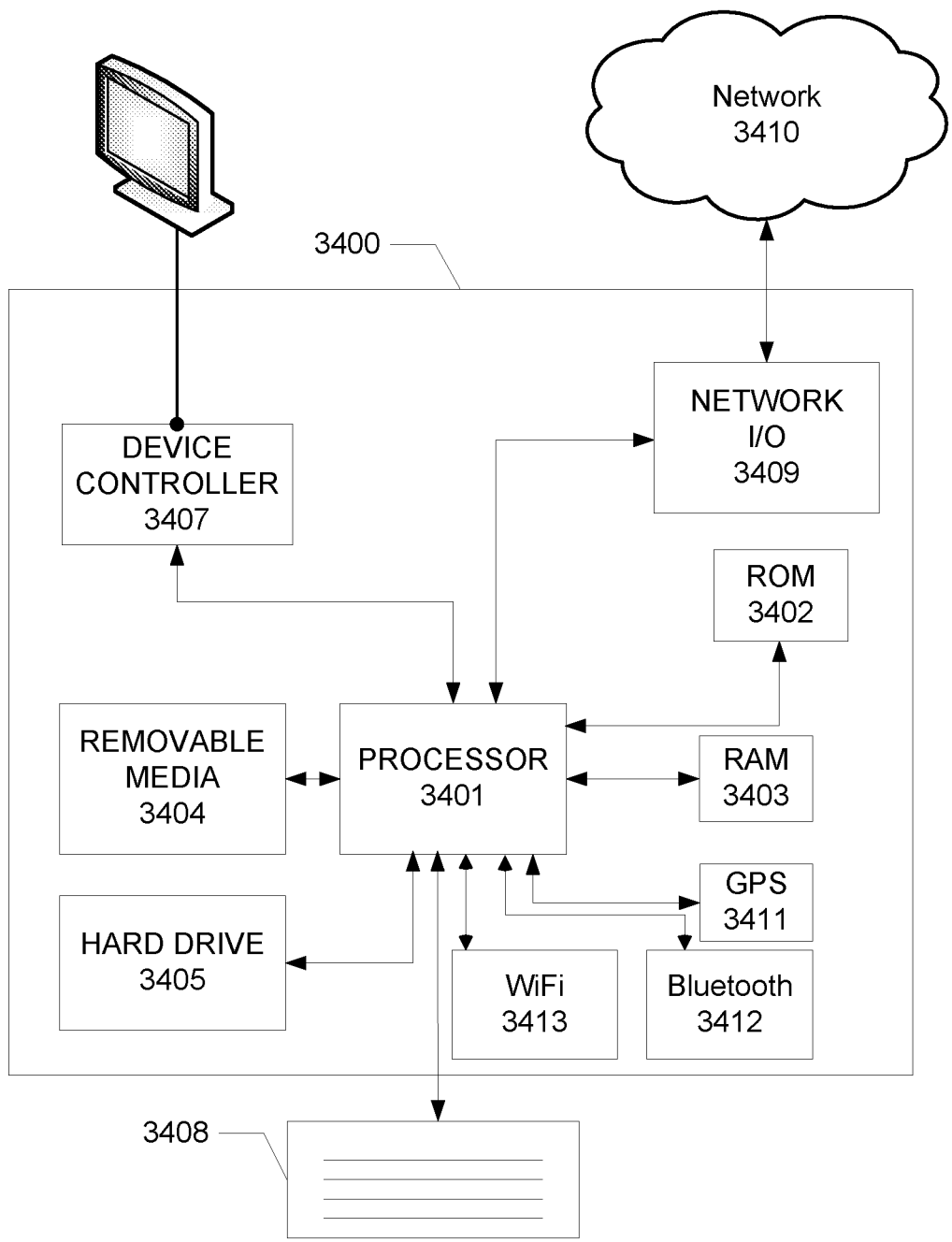
FIG. 34 shows example elements of a computing device that may be used to implement any of the various devices described herein.

FIG. 34 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3400 may include one or more processors 3401, which may execute instructions stored in the random access memory (RAM) 3403, the removable media 3404 (such as a Universal Serial Bus (USB) drive, compact disk (CD) or digital versatile disk (DVD), or floppy disk drive), or any other desired storage medium. Instructions may also be stored in an attached (or internal) hard drive 3405. The computing device 3400 may also include a security processor (not shown), which may execute instructions of one or more computer programs to monitor the processes executing on the processor 3401 and any process that requests access to any hardware and/or software components of the computing device 3400 (e.g., ROM 3402, RAM 3403, the removable media 3404, the hard drive 3405, the device controller 3407, a network interface 3409, a GPS 3411, a Bluetooth interface 3412, a WiFi interface 3413, etc.). The computing device 3400 may include one or more output devices, such as the display 3406 (e.g., a screen, a display device, a monitor, a television, etc.), and may include one or more output device controllers 3407, such as a video processor. There may also be one or more user input devices 3408, such as a remote control, keyboard, mouse, touch screen, microphone, etc. The computing device 3400 may also include one or more network interfaces, such as a network interface 3409, which may be a wired interface, a wireless interface, or a combination of the two. The network interface 3409 may provide an interface for the computing device 3400 to communicate with a network 3410 (e.g., a RAN, or any other network). The network interface 3409 may include a modem (e.g., a cable modem), and the external network 3410 may include communication links, an external network, an in-home network, a provider's wireless, coaxial, fiber, or hybrid fiber/coaxial distribution system (e.g., a DOCSIS network), or any other desired network. Additionally, the computing device 3400 may include a location-detecting device, such as a global positioning system (GPS) microprocessor 3411, which may be configured to receive and process global positioning signals and determine, with possible assistance from an external server and antenna, a geographic position of the computing device 3400.

The example in FIG. 34 may be a hardware configuration, although the components shown may be implemented as software as well. Modifications may be made to add, remove, combine, divide, etc. components of the computing device 3400 as desired. Additionally, the components may be implemented using basic computing devices and components, and the same components (e.g., processor 3401, ROM storage 3402, display 3406, etc.) may be used to implement any of the other computing devices and components described herein. For example, the various components described herein may be implemented using computing devices having components such as a processor executing computer-executable instructions stored on a computer-readable medium, as shown in FIG. 34. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
sending, by a wireless device, a physical random access channel (PRACH) transmission comprising a random access preamble associated with a first message of a two-step random access procedure; and
after transmission of the first message and based on the random access procedure being a two-step random access procedure, sending a physical uplink shared channel (PUSCH) transmission comprising a transport block using a redundancy version set to zero.

2. The method of claim 1, further comprising:
receiving, by the wireless device from a base station, one or more configuration parameters indicating a redundancy version sequence.

3. The method of claim 2, wherein the one or more configuration parameters further indicate:
one or more PRACH resources;
one or more uplink resources; and
one or more mappings between the one or more PRACH resources and the one or more uplink resources.

4. The method of claim 1, wherein the two-step random access procedure comprises a contention-based random access procedure.

5. The method of claim 1, wherein the first message comprises Msg A.

6. The method of claim 1, further comprising:
resending, based on a determination that a random access response associated with the transport block has not been received, the transport block with the redundancy version set to zero.

7. The method of claim 6, wherein the determination that the random access response associated with the transport block has not been received is based on at least one of:
not having received the random access response during a response window; or
an expiration of a timer.

8. The method of claim 1, wherein the PUSCH transmission comprises a retransmission of an earlier PUSCH transmission associated with the first message.

9. A wireless device comprising:
one or more processors; and
memory storing instructions that, when executed by the one or more processors, cause the wireless device to:
send a physical random access channel (PRACH) transmission comprising a random access preamble associated with a first message of a two-step random access procedure; and
after transmission of the first message and based on the random access procedure being a two-step random access procedure, send a physical uplink shared channel (PUSCH) transmission comprising a transport block using a redundancy version set to zero.

10. The wireless device of claim 9, wherein the instructions, when executed by the one or more processors, cause the wireless device to:
receive, from a base station, one or more configuration parameters indicating a redundancy version sequence.

11. The wireless device of claim 10, wherein the one or more configuration parameters further indicate:
one or more PRACH resources;
one or more uplink resources; and
one or more mappings between the one or more PRACH resources and the one or more uplink resources.

12. The wireless device of claim 9, wherein the two-step random access procedure comprises a contention-based random access procedure.

13. The wireless device of claim 9, wherein the first message comprises Msg A.

14. The wireless device of claim 9, wherein the instructions, when executed by the one or more processors, cause the wireless device to:
resend, based on a determination that a random access response associated with the transport block has not been received, the transport block with the redundancy version set to zero.

15. The wireless device of claim 14, wherein the instructions, when executed by the one or more processors, cause the wireless device to:
determine that the random access response associated with the transport block has not been received based on at least one of:
not having received the random access response during a response window; or
an expiration of a timer.

16. The wireless device of claim 9, wherein the PUSCH transmission comprises a retransmission of an earlier PUSCH transmission associated with the first message.

17. A non-transitory computer-readable medium comprising instructions that, when executed, configure a wireless device to:
send a physical random access channel (PRACH) transmission comprising a random access preamble associated with a first message of a two-step random access procedure; and
after transmission of the first message and based on the random access procedure being a two-step random access procedure, send a physical uplink shared channel (PUSCH) transmission comprising a transport block using a redundancy version set to zero.

18. The non-transitory computer-readable medium of claim 17, wherein the instructions, when executed, configure the wireless device to:
receive, from a base station, one or more configuration parameters indicating a redundancy version sequence.

19. The non-transitory computer-readable medium of claim 18, wherein the one or more configuration parameters further indicate:
one or more PRACH resources;
one or more uplink resources; and
one or more mappings between the one or more PRACH resources and the one or more uplink resources.

20. The non-transitory computer-readable medium of claim 17, wherein the two-step random access procedure comprises a contention-based random access procedure.

21. The non-transitory computer-readable medium of claim 17, wherein the first message comprises Msg A.

22. The non-transitory computer-readable medium of claim 17, wherein the instructions, when executed, configure the wireless device to:
  resend, based on a determination that a random access response associated with the transport block has not been received, the transport block with the redundancy version set to zero.

23. The non-transitory computer-readable medium of claim 22, wherein the instructions, when executed, configure the wireless device to:
  determine that the random access response associated with the transport block has not been received based on at least one of:
    not having received the random access response during a response window; or
    an expiration of a timer.

24. The non-transitory computer-readable medium of claim 17, wherein the PUSCH transmission comprises a retransmission of an earlier PUSCH transmission associated with the first message.

25. A method comprising:
  receiving, by a base station, a physical random access channel (PRACH) transmission comprising a random access preamble associated with a first message of a two-step random access procedure; and
  after receiving the first message, receiving a physical uplink shared channel (PUSCH) transmission comprising a transport block using a redundancy version set to zero, wherein the redundancy version being set to zero is based on the random access procedure being a two-step random procedure.

26. The method of claim 25, further comprising:
  sending, by the base station, one or more configuration parameters indicating a redundancy version sequence.

27. The method of claim 26, wherein the one or more configuration parameters further indicate:
  one or more PRACH resources;
  one or more uplink resources; and
  one or more mappings between the one or more PRACH resources and the one or more uplink resources.

28. The method of claim 25, wherein the first message comprises Msg A.

29. The method of claim 25, further comprising:
  sending, based on at least one of the PRACH transmission or the PUSCH transmission, a random access response.

30. The method of claim 29, further comprising:
  receiving a second PUSCH transmission comprising the transport block using the redundancy version set to zero.

* * * * *